(12) United States Patent
Hirukawa et al.

(10) Patent No.: US 6,236,698 B1
(45) Date of Patent: May 22, 2001

(54) NUCLEAR REACTOR POWER DISTRIBUTION MONITORING SYSTEM AND METHOD INCLUDING NUCLEAR REACTOR INSTRUMENTATION SYSTEM

(75) Inventors: Koji Hirukawa, Kanagawa-Ken; Shungo Sakurai; Takafumi Naka, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/271,350

(22) Filed: Mar. 17, 1999

(30) Foreign Application Priority Data

Mar. 17, 1998 (JP) .................................................. 10-067324

(51) Int. Cl.⁷ .......................... G21C 17/00; G21C 17/108
(52) U.S. Cl. ............................. 376/255; 376/254; 376/245
(58) Field of Search .................................... 376/245, 254, 376/255

(56) References Cited

U.S. PATENT DOCUMENTS 5,015,434  5/1991  Wimpee et al. ...................... 376/254
5,225,149 * 7/1993  Banda ................................... 376/255
5,473,644 * 12/1995  Yasuoka et al. ...................... 376/254

FOREIGN PATENT DOCUMENTS 6-289182  10/1994 (JP) .

* cited by examiner

Primary Examiner—Michael J. Carone
Assistant Examiner—Yongtack K. Mun
(74) Attorney, Agent, or Firm—Oblon, Spivak, McClelland, Maier & Neustadt, P.C.

(57) ABSTRACT

A nuclear reactor instrumentation system including a plurality of in core nuclear instrumentation assemblies arranged in a gap between a number of fuel assemblies charged in a reactor core. The income nuclear instrumentation assemblies each include a fixed type neutron detector assembly having a plurality of fixed type neutron detectors dispersively arranged in a core axial direction and a fixed type gamma thermometer assembly having a plurality of fixed type gamma ray heat detectors arranged at least in a same core axial direction as the fixed type neutron detectors. A power range detector signal processing device is operatively connected to the fixed type neutron detector assemblies through signal cables. A gamma thermometer signal processing device is operatively connected to the fixed type gamma thermometer assembly of the in core nuclear instrumentation assembly through a signal cable.

4 Claims, 27 Drawing Sheets

(CASE WHERE γ RAY HEAT DETECTOR IS NOT LOCATED ON CENTER OF NODE)

NUCLEAR REACTOR POWER DISTRIBUTION MONITORING SYSTEM AND METHOD INCLUDING NUCLEAR REACTOR INSTRUMENTATION SYSTEM

FIELD OF THE INVENTION

1. Background of the Invention

The present invention generally relates to a reactor power distribution monitor system which computes a core power distribution on the basis of a core present data of a reactor with the use of a physical model. In particular, the present invention relates to a reactor nuclear instrumentation system which can accurately compute a reactor core power distribution with the use of plurality of fixed type neutron detectors and fixed type γ-ray heat detector means which are arranged in a core axial direction and has high reliability, to a reactor power distribution monitor system including such reactor instrumentation system and to a reactor power distribution monitoring method.

DISCUSSION OF THE BACKGROUND

In a reactor, for example, in a boiling water reactor (BWR), a core performance such as a power distribution and a thermal state of a reactor core are monitored by means of a process control computer included in a reactor power distribution monitor system.

In order to monitor the aforesaid reactor power distribution and thermal state, there is a method of computing a core power distribution with the use of reactor core present data measuring means and a physical model (core three-dimensional nuclear hydrothermal computing code) stored in a process control computer on the basis of the measured reactor core present data and confirming whether a maximum linear heat generation ratio (MLHGR) or a minimum critical power ratio (MCPR) satisfies individual predetermined operation limit value. According to such a method, a reactor operation is carried out.

FIG. 26 and FIG. 27 show a general reactor power distribution monitor system of a boiling water type reactor. In the boiling water type reactor, a reactor pressure vessel 2 is housed in a reactor container 1, and a reactor core 3 is housed in the reactor pressure vessel 2. The reactor core 3 is constructed in a manner that a plurality of fuel assemblies 4 and control rods 5 and the like are mounted. An incore nuclear instrumented fuel assembly 6 is located on a position surrounded by the fuel assemblies 4 of the reactor core 3.

As shown in FIG. 27, a corner gap G formed by four fuel assemblies 4 is provided with an incore nuclear instrumented fuel assembly 6, and a nuclear instrumentation tube 7 is provided with a neutron detector 8 which is dispersively arranged at a plurality of portions in a core axial direction. The neutron detector 8 has a so-called fixed type (stationary or immovable) structure, and in the boiling water reactor, usually, four neutron detectors are dispersively arranged on an effective portion in a fuel axial direction at equal intervals.

Further, the nuclear instrumentation tube 7 is provided with a TIP (Traversing In-Core Probe: movable incore instrumentation) guide tube 9. One movable neutron detector (TIP) 10 is located so as to be movable in an axial direction. As shown in FIG. 26, there is provided a movable type neutron flux measuring system which continuously measures a neutron flux and is movable in an axial direction by means of a retrieval device (selector) 11, a TIP drive unit 12, a TIP drive control device and a TIP neutron flux signal processor 13 or the like. A reference numeral 14 denotes a penetration section, 15 denotes a valve mechanism and 16 denotes a shielding container. These neutron detectors 8 and 10 and their control device such as signal processors 13 and 17 (will be described later) are called as a reactor nuclear instrumentation system 24.

On the other hand, the fixed type (stationary or immovable) neutron detector (LPRM detector) 8 arranged in the reactor core generates an average signal (APRM signal) for each of some divided groups, and then monitors a power level of a power range of the reactor core 3. Further, the fixed type neutron detector 8 constitutes a reactor safety guard system which rapidly makes a scram-operation with respect to a reactor stop system (not shown) such as a control rod drive mechanism in order to prevent a breakdown of a fuel and a reactor when there occurs an abnormal transient phenomenon or accident such that a neutron flux rapidly increases.

By the way, in the fixed type neutron detector 8, a change in sensitivity happens in individual detectors by neutron heat. For this reason, in order to compare and correct the sensitivity of each neutron detector 8 every a predetermined period during operation, the TIP (movable neutron detector) 10 is actuated so as to obtain a continuous power distribution in a core axial direction, and the change in sensitivity of each neutron detector 8 is corrected by a gain adjusting function of a power range detector signal processing unit 17.

A neutron flux signal obtained by the TIP 10 is processed as a neutron flux signal corresponding to a core axial direction position by means of a TIP neutron flux signal processing unit 13 constituting a reactor nuclear instrumentation system 24. Further, in a reactor power distribution computing device 18 (which is usually built in one or plural of process control computers for monitoring an operation of an atomic power generation plant as a program), the neutron flux signal is read as a reference power distribution when computing a three-dimensional hydrothermal force. The reactor power distribution computing device 18 includes a power distribution computing module 19, a power distribution learning module 20 and an input-output unit 21.

Reading a control rod pattern obtained from a present data measuring device 22 which functions as reactor core present data measuring means, a core flow rate, a reactor doom pressure, a reactor heat power obtained from various core present data, and a process data such as a core inlet coolant temperature or the like, these data are processed by means of a present data processing unit 23, and then, are supplied to the reactor power distribution computing unit 18. The present data measuring device 22 is actually composed of a plurality of monitor equipments and is shown as one example of a measuring device for simplification although it is generally named as a device for collecting process data of various operation parameters in the reactor as shown in FIG. 26. Further, the present data processing unit 23 is composed of a process control computer or a part thereof, and a processed core present process data is supplied to the power distribution computing device 18. The power distribution computing module 19 computes a reactor core power distribution according to the three-dimensional nuclear hydrothermal computing code stored in the process control computer, and then, supplies the computed result to the power distribution learning module 20. The power distribution learning module learns on the basis of the reference power distribution, and then, correct the computed result, and thus, accurately computes a reactor power distribution in a power distribution predictive computation after that.

In the conventional incore nuclear instrumented fuel assembly 6, as shown in a perspective view partly in section of FIG. 28, a movable type γ-ray detector 10A may be used in place of the movable neutron detector 10. The movable type γ-ray detector 10A is movable in a core axial direction so as to continuously measure a γ-ray flux in the core axial direction. The γ-ray is generated in proportion to a fission rate in the reactor core 3, and therefore, by measuring a γ-ray flux, it is possible to measure a fission rate in the vicinity of the reactor core.

By using the movable type neutron detector 10 and the movable type γ-ray detector 10A, it is possible to compare and correct a dispersion on detection accuracy in each of the plurality of neutron detectors 8 arranged in the core axial direction and to continuously measure a power distribution in the core axial direction.

As described above, in the conventional reactor nuclear instrumentation system, continuous measurement of the axial direction power distribution of the reactor core 3 depends on the movable type neutron detector 10 and the movable type γ-ray detector 10A which are a movable type measuring device.

Further, there is a conventional reactor nuclear instrumentation system disclosed in Japanese Patent Laid-open Publication No. HEI 6-289182. In the reactor nuclear instrumentation system, a reactor core is provided with an incore nuclear instrumented fuel assembly. The incore nuclear instrumented fuel assembly is constructed in a manner that a fixed type neutron detector assembly and a fixed type gamma thermometer are housed in a nuclear instrumentation tube. The fixed type gamma thermometer is constructed in a manner that many γ-ray heat detectors are dispersively arranged in a core axial direction. These γ-ray heat detectors are arranged at wide intervals in the middle portion of the core axial direction, and are arranged at narrow intervals in an end portion of the core axial direction. The γ-ray heat detector situated on the uppermost end is arranged on a position within 15 cm from the upper end of a fuel effective portion in the core axial direction and measures a γ-ray flux.

In the conventional reactor nuclear instrumentation system, in order to accurately monitor a power distribution in the core axial direction, the movable neutron detector 10 or the movable γ-ray detector 10A is required. For this reason, in the case where only movable neutron detector has been used, there is a problem that it is difficult to monitor a power distribution in the core axial direction with a high accuracy.

In the movable neutron detector 10 or the movable γ-ray detector 10A, at least one neutron detector 10 or γ-ray detector 10A must be vertically moved over a range from an outside of the reactor pressure vessel 2 housing the reactor core 3 to the whole length (core axial length) of the reactor core 3 in the TIP guide tube 9 so as to monitor the power distribution. For this reason, this is a factor of making large a mechanical drive device for moving the neutron detector 10 and the γ-ray detector 10A, and its structure is made complicated, and as a result, there is a problem that a moving operation and maintenance are troublesome. In particular, there are required maintenance and management for mechanical drive devices such as the detector driving device for moving the neutron detector 10 and the γ-ray detector 10A, the retrieval device 11 for selecting the TIP guide tube 9, the valve mechanism 15, the shield container 16 or the like. Further, the movable type detectors 10 and 10A are activated, and for this reason, their maintenance work is a work having the possibility that an worker is exposed.

In view of the above problem, a skilled person is groping a method of monitoring a power distribution in a core axial direction without using a movable measuring device in the reactor nuclear instrumentation system.

The incore nuclear instrumented fuel assembly 6 used in the conventional reactor nuclear instrumentation system is usually provided with four movable neutron detectors 8 and one movable type neutron detector (TIP) 10 or the movable γ-ray detector 10A. Nowadays, a study is made such that a fixed type γ-ray detector in place of the TIP is arranged in the same manner as the fixed type neutron detector 8.

However, in the case where four fixed type γ-ray detectors are arranged in the core axial direction, it is impossible to measure a power on the upper portion and the lower portion of the reactor core 3. Further, in the case of extrapolating a power on the upper portion and the lower portion of the reactor core 3 from four measured data or in the case of interpolating it from four measured data, a behavior in a change of power distribution is different at each portion of the core axial direction. For this reason, a great measurement error is caused, and as a result, an accuracy becomes worse.

Moreover, in the fuel assembly 4 mounted in the reactor core 3 used in a boiling water reactor, in order to keep each interval between fuel rods with a predetermined distance, a plurality of fuel spacers are dispersively located in an axial direction of the fuel assembly 4. In a node where the fuel spacer dispersively exists in the axial direction of the reactor core 3, a neutron flux becomes low due to an elimination effect of a moderator by the fuel spacer, and for this reason, the following matter is anticipated. That is, its power distribution provides a concave power distribution such that a power locally becomes low. However, the three-dimensional nuclear hydrothermal model stored in the conventional process control computer does not deal with the power distribution as described above. For this reason, in the reactor power distribution computing device 18, an error in a power distribution computation in the core axial direction has been corrected by learning a value read by the movable type detector. If the movable detector is replaced with a fixed type detector, an information on correction is not obtained. Thus providing a problem that an error is caused in an evaluation of power on the node where the fuel spacer exists.

Accordingly, in the case where the reactor nuclear instrumentation system is provided with only fixed type measuring device, a measurement error becomes great in a power distribution of the core axial direction. For this reason, there is a need of previously having a freedom of restricting conditions on a reactor operation. As a result, a degree of freedom on a reactor operation is decreased, thus also providing problem of giving an influence to an available factor.

In order to improve an accuracy of measuring a power distribution of the core axial direction, it is considered that many fixed type γ-ray detectors are arranged in the core axial direction. In this case, a detector signal line is increased, and there is a restriction of the number of detector connecting cables which are capable of passing through the nuclear instrumentation tube 9 of the incore nuclear instrumented fuel assembly 6. For this reason, there is a limit to locate many γ-ray detectors.

As disclosed in Japanese Patent Laid-open Publication No. HEI 6-289182, it is considered that the reactor nuclear instrumentation system is provided with many γ-ray heat detectors. However, in the reactor nuclear instrumentation system, there is no knowledge enough to an analysis on a γ-ray heat contributing range and γ-ray heat, and at least one of γ-ray heat detectors located on the upper and lower ends is arranged on a position within a range of 15 cm from the upper and lower ends of a fuel effective portion of the core axial direction. For this reason, it is difficult to accurately detect a γ-ray heat on the upper and lower ends of a fuel effective portion of the core axial direction.

SUMMARY OF THE INVENTION

The present invention has been made in view of the problems mentioned above and an object of the present invention is to provide a reactor nuclear instrumentation system and a reactor power distribution monitor system, provided with the above instrumentation system, which can accurately and effectively compute and monitor a power distribution in a core axial direction with the use of only fixed type (immovable or stationary) measuring device without using a movable measuring device and also to provide a power distribution monitoring method.

Another object of the present invention is to provide a reactor power distribution monitor system which can dispense a movable measuring device and a mechanical drive device so as to achieve a simplification of its structure and dispense and reduce an exposure work by a worker, and to provide a power distribution monitoring method.

A further object of the present invention is to provide a reactor power distribution monitor system which can accurately and precisely compute a power distribution of a core axial direction in consideration of a fuel spacer with the use of a γ-ray heat detector which is less than the number of core axial direction nodes and is arranged in a core axial direction as a fixed type measuring device, and has a high reliability, and to provide a power distribution monitoring method.

These and other objects can be achieved according to the present invention by providing, in one aspect, a reactor nuclear instrumentation system comprising:

a plurality of incore nuclear instrumentation assemblies arranged in a gap between a number of fuel assemblies charged in a reactor core, the incore nuclear instrumentation assemblies including a fixed type neutron detector assembly comprising a plurality of fixed type neutron detectors dispersively arranged in a core axial direction and a fixed type gamma thermometer assembly comprising a plurality of fixed type γ-ray heat detectors arranged at least in a same core axial direction as the fixed type neutron detectors;

a power range detector signal processing device operatively connected to the fixed type neutron detector assemblies through signal cables; and a gamma thermometer signal processing device operatively connected to the fixed type gamma thermometer assemblies of the incore nuclear instrumentation assembly through signal cables.

In preferred embodiments of this aspect, the fixed type fixed type neutron detector assembly of the incore nuclear instrumentation assembly is constructed in a manner that N (number, integer) (N≧4) fixed neutron detectors are dispersively arranged in the core axial direction with a predetermined interval and the fixed type gamma thermometer assembly is constructed in a manner that (2N−1) fixed type γ-ray heat detectors are arranged in the core axial direction, N of the (2N−1) fixed type γ-ray heat detectors are arranged at the same core axial position as the fixed type neutron detectors and reminders (N−1) thereof are arranged at an intermediate position in the core axial direction between the fixed type neutron detectors.

The fixed type neutron detector assembly of the incore nuclear instrumentation assembly is constructed in a manner that N (number, integer) (N≧4) fixed neutron detectors are dispersively arranged in the core axial direction with a predetermined interval and the fixed type gamma thermometer assembly is constructed in a manner that 2N fixed type γ-ray heat detectors are arranged in the core axial direction, N of the 2N fixed type γ-ray heat detectors are arranged at the same core axial position as the fixed type neutron detectors, remainders (N−1) thereof are arranged at an intermediate position in the core axial direction between the fixed type neutron detectors, and further, a further remainder one thereof is arranged below the lowest fixed type neutron detector in a core axial fuel effective portion and at a position separating from a bottom end of the fuel effective portion with a distance of 15 cm or more.

The fixed type neutron detector assembly of the incore nuclear instrumentation assembly is constructed in a manner that N (number, integer) (N≧4) fixed neutron detectors are dispersively arranged in the core axial direction with a predetermined interval and the fixed type gamma thermometer assembly is constructed in a manner that (2N+1) fixed type γ-ray heat detectors are arranged in the core axial direction, N of the (2N+1) fixed type γ-ray heat detectors are arranged at the same core axial position as the fixed type neutron detectors, remainders (N−1) thereof are arranged at the core axial intermediate position of the fixed type neutron detector and a further remainder one thereof is arranged below the lowest fixed type neutron detector in a core axial fuel effective portion, and furthermore, the remainder thereof is arranged above the lowest fixed type neutron detector in a core axial fuel effective portion at a position separating respectively from a bottom end or top end of the fuel effective portion with a distance 15 cm or more.

One of the fixed type γ-ray heat detectors of the fixed type gamma thermometer assembly is arranged on a position L/4 above the lowest fixed type neutron detector in a case where an axial location distance of the neutron detectors is set as L.

Furthermore, in a case where the effective fuel portion of the reactor core is divided into several nodes in the core axial direction, each of core axial positions of the fixed type neutron detector and the fixed type γ-ray heat detector are coincident with a center of each of the nodes.

The fixed type neutron detectors constituting the fixed type neutron detector assembly is arranged so as to be calibrated respectively by the fixed type γ-ray heat detectors located on the same core axial position and each of the fixed type neutron detectors is calibrated so as to be coincident with a converted γ-ray heating value obtained from the γ-ray heat detector located on the same core axial position.

In another aspect, there is provided a reactor power distribution monitor system comprising:

a reactor power distribution computing device which computes a core power distribution through a neutron flux distribution computation by means of a three-dimensional nuclear thermal-hydraulics computing code which evaluates an influence on a node power by a fuel spacer on the basis of a core condition (present) data from a reactor core operating (present) status data measuring means; and a reactor nuclear instrumentation system which measures a core power distribution of a power range on the basis of an actually measured data from a fixed type detector located in the reactor core, the reactor power distribution computing device having a structure adapted to compute a node power by dividing the fuel in the reactor core into a plurality of nodes in a core axial direction and to carry out a power distribution computation in consideration of an influence by the fuel spacer to a node power with respect to a node having a fuel spacer.

In this aspect, the reactor power distribution computing device comprises: a power distribution computing module into which a core condition data is inputted from the operating status data measuring means and which computes as an incore neutron flux distribution, a power distribution, a degree of margin with respect to a thermal operating limit value in according with a three-dimensional nuclear thermal-hydraulics computing code in an evaluation of an influence of a node power by a fuel spacer; a power distribution adaption (learning) module into which a core power distribution computed result is inputted from the power distribution computing module and the adaption module obtains a core power distribution correction reflecting the computed result with reference to the actually measured data from the reactor nuclear instrumentation system; and an input/output device including a display device.

A contribution of γ-ray heating value from nodes (K−1) and (K+1) vertically adjacent to a core axial node K is added with a use of a weight correlation function in a case where the axial node for obtaining a γ-ray heating value of the detector of the fixed type gamma thermometer assembly is set as K, and a γ-ray heating value of each of the γ-ray heat detectors in the core axial position is calculated.

In a further aspect, there is provided a method of monitoring a reactor power distribution comprising the steps of:

inputting a core condition data from a core operating status data measuring means to a reactor power distribution computing device;

computing a core power distribution through a neutron flux distribution computation by means of a reactor power distribution computing device with a use of a three-dimensional nuclear thermal-hydraulics computing code in an evaluation of an influence of a node power by a fuel spacer;

carrying out a simulation computation of a gamma ray heating value from the computed core power distribution result;

computing a difference between the computed value and a measurement value of gamma ray heating value from the reactor nuclear instrumentation system as a difference correction for each measurement position by means of a power distribution adaption module;

calculating a difference correction of each axial node by interpolating and extrapolating the difference correction to an axial direction;

correcting the computed core power distribution or neutron flux distribution by proportional distribution to each of nodes around a nuclear instrumentation assembly so as to be adapted to the difference correction and computing; and monitoring the corrected core power distribution.

In this aspect, in a case of computing the core power distribution with the use of the three-dimensional nuclear thermal-hydraulics computing code, the core power distribution is computed from a node power in consideration of a local distortion of neutron flux by the fuel spacer located at an existing core axial node position.

Each of gamma ray heat detectors of the fixed type gamma thermometer assembly is arranged at least on the same core axial position as the fixed type neutron detectors which are dispersively arranged in the core axial direction and an output level adjustment of the fixed type neutron detector is carried out with a gamma ray heating converted from a read value of the gamma ray heat detector.

In a still further aspect, there is provided a method of monitoring a reactor power distribution comprising the steps of:

adding a contribution of γ-ray heating value from nodes (K−1) and (K+1) vertically adjacent to a core axial node K with a use of a weight correlation function in a case where the axial node for obtaining a γ-ray heating value of the detectors of the fixed type gamma thermometer assembly is set as K; and computing a γ-ray heating value of each of the γ-ray heat detectors in the core axial position.

According to the present invention in the above various aspect, as is evident from the above description, in the reactor nuclear instrumentation system according to the present invention, the reactor power distribution monitor system including such system and the reactor power distribution monitoring method, it is possible to dispense a movable measuring device such as the movable neutron detector or γ-ray heat detectors, and the axial power distribution can be effectively computed with high precision with the use of only fixed type (stationary or immovable) reactor nuclear instrumentation detector, and thus, it is possible to obtain a reactor core power distribution computing result which reflects an actually measured value with high reliability.

Moreover, in the reactor nuclear instrumentation system according to the present invention, the reactor power distribution monitor system including such system and the reactor power distribution monitoring method, the movable measuring device is unnecessary, and it is possible to save a large-sized mechanical drive device such as a tractor device, a drive device or the like. Therefore, a structural simplification can be achieved, and it is possible to reduce or dispense an exposure problem during maintenance work.

The incore nuclear instrumentation assembly (reactor power distribution measuring device) is composed of the fixed type (immovable) neutron detector assembly and the fixed type gamma thermometer assembly which are housed in the nuclear instrumentation assembly, i.e. tube. Thus, a movable measuring device such as the movable neutron detector or γ-ray heat detectors is unnecessary, and it is possible to save a large-sized mechanical drive device such as a tractor device, a drive device or the like. Further, it is possible to achieve a simplification of a structure and maintenance work.

Furthermore, the reactor power distribution measuring device does not require the movable measuring device and mechanical drive device such as a tractor device, a drive device or the like, and a structural simplification is achieved. The reactor power distribution monitor device and the movable parts are unnecessary. Therefore, maintenance work can be simplified. The fixed type gamma thermometer is employed, and hence, maintenance free can be achieved.

The γ-ray heat detector has the same number as the fixed type neutron detector N (number, integer), and is arranged in the same core axial direction, and (N−1) fixed type γ-ray heat (GT) detector is arranged at the intermediate position of the above N fixed type neutron detectors. Thus, it is possible to obtain many GT detector signals in the core axial direction and to further improve a core axial power distribution measurement precision.

Furthermore, it is possible to locate the γ-ray heat detector so as to substantially equally cover the fuel effective length and to reduce an extrapolation of the difference between the actually measured value and the computed value. Therefore, it is possible to precisely compute the node power in the vicinity of the lower end higher than the vicinity of the upper end of the fuel effective length from the measured result of the core power distribution.

In addition, each of the γ-ray heat detectors is arranged below and above the lowest fixed type neutron detector. Thus, it is possible to locate the γ-ray heat detector so as to substantially equally cover the fuel effective length, and to reduce an extrapolation of the difference between the actually measured value and the computed value. Therefore, it is possible to precisely compute the node power in the vicinity of the lower end higher than the vicinity of the upper end of the fuel effective length from the measured result of the core power distribution.

In further addition, the γ-ray heat detector arranged above the lowest fixed type neutron detector at a distance 0.25L. The position where the added fixed type γ-ray heat detector 35 is arranged is a position where the maximum peaking is easy to be generated in the core axial direction in the latest high burnup (combustion) of 8×8 fuel or high burnup of 9×9 fuel core. Therefore, it is possible to precisely monitor a power distribution at a core position where the maximum linear heat generation ratio is easy to be generated, and to improve a measurement precision. In particular, in the fixed type gamma thermometer assembly, in the case where the locating number of the gamma ray heat detector in the core axial direction is limited in a mechanical design, it is possible to improve a precision in the limited number, thus being optimal.

Furthermore, the fixed type neutron detector and the γ-ray heat detector are arranged on the node center divided in the fuel axial direction according to the three-dimensional nuclear thermal-hydraulics computing code used in the reactor power distribution computing device. Thus, it is possible to make same the weight of adjacent nodes with respect to all γ-ray heat detectors, so that the core power distribution computation can be simplified, and also, measurement precision can be improved.

In the case where the fixed type neutron detector is not situated at the center of node, a correction is made by interpolating a γ-ray heating value distribution of the reading value of the core axial adjacent node. Moreover, the γ-ray heat detector is a γ-ray source contributing to the detector position, that is, the power distribution advantageously contributes within a range of 15 cm. Thus, even if the γ-ray heat detector is situated on the center of the axial node with a height of 15 cm, the γ-ray heat detector receives the influence of power distribution of the upper and lower (vertical) adjacent nodes. The influence of power distribution from the adjacent nodes is attenuated in series by a function near to an exponential of the locating position z from the γ-ray heat detector. Therefore, in the case where the γ-ray heat detector is not situated at the center of axial node, there is a need of computing a reading value by an axial non-symmetrical weight distribution of the axial power distribution in the node having the γ-ray heat detector and the adjacent nodes. Conversely, in the case of converting the reading value of the γ-ray heat detector into a peripheral power distribution, interpolation or extrapolation is made in the axial direction so as to make the computation easy, and thus, the read value need to be computed.

Still furthermore, according to the present invention, a correction of the signal output of the fixed type neutron detector is directly carried out with the use of a γ-ray heating value computed from the γ-ray heat detector signal at the same level of the core axial direction. Thus, it is possible to precisely make a correction on the signal output of the fixed type neutron detector without using the power distribution computing device which includes the three-dimensional nuclear thermal-hydraulics simulation computing code at a high speed with high reliability.

A core power distribution computation (calculation) is carried out with the use of the three-dimensional thermal-hydraulics computing code which evaluates an influence on the node power by the fuel spacer, and the core power distribution computed in the core axial direction has a concave and convex from the initial stage. Thus, it is possible to solve the problem of a correction on excessive evaluation of the power peak and on the node power having the fuel spacer, so that the core power distribution can be precisely and accurately learned adapted) and corrected, and a core power distribution having high reliability can be obtained.

Still furthermore, according to the present invention, the power distribution computing module of the reactor power distribution computing device computes a core power distribution with the use of the three-dimensional thermal-hydraulics computing code which evaluates an influence on the node power by the fuel spacer. The power distribution adoption (learning) module compares the computed core power distribution result with the actually measured data from the reactor nuclear instrumentation system, and thereby, it is possible to precisely and effectively obtain a core power distribution reflecting the actually measured data.

In this aspect, in the case where the power distribution computing device computes a response of the γ-ray heat detector, a consideration is taken such that a range of gamma ray is longer a thermal neutron. Further, by taking not only the axial node having the γ-ray heat detector but also contribution by a γ-ray heating value of upper and lower nodes adjacent to each other into consideration, it is possible to improve a precision of power distribution by the minimum computation.

Furthermore, a core power distribution is computed on the basis of the core present data from the core present data measuring means with the use of the three-dimensional thermal-hydraulics computing code which evaluates an influence on the node power by the fuel spacer, and then, a simulation computation value of the γ-ray heating value is obtained from the core power distribution result according to the computing code. The computation value is compared with the measurement value of the γ-ray heating value from each measuring position of the reactor nuclear instrumentation system, and the computed core power distribution or neutron flux distribution is corrected on the basis of proportional distribution to each of nodes. Thus, it is possible to accurately compute a core power distribution which is corresponds to the measurement value and has a high reliability. The three-dimensional thermal-hydraulics computing code evaluates an influence on the node power by the fuel spacer, and has a concave and convex in a core axial power distribution by the fuel spacer at the first stage. Thus, it is possible to solve the problem of a correction on excessive valuation or on underestimation of the node power.

Still furthermore, according to the present invention, the output level adjustment of the fixed type neutron detector is carried out with a read value of gamma ray heat detector. Thus, it is possible to simply and easily correct a deterioration in neutron flux measurement sensitivity by the fixed type neutron detector in short time.

Still furthermore, in the case where the power distribution computing device computes a response of the γ-ray heat detector, a consideration is taken such that a range of gamma ray is longer a thermal neutron. Further, by taking not only the axial node having the γ-ray heat detector but also contribution by a γ-ray heating value of upper and lower nodes adjacent to each other into consideration, it is possible to improve a precision of power distribution by the minimum computation.

The nature and the further characteristic features of the present invention will be made clear from the following descriptions by way of the preferred embodiments with reference to the accompanying drawings.

DESCRIPTION OF THE PREFERRED EMBODIMENTS

The following are descriptions on a reactor nuclear instrumentation system and a reactor power distribution monitor system including the reactor nuclear instrumentation system according to the present invention. Embodiments will be described hereunder with reference to the accompanying drawings.

Figure 1:
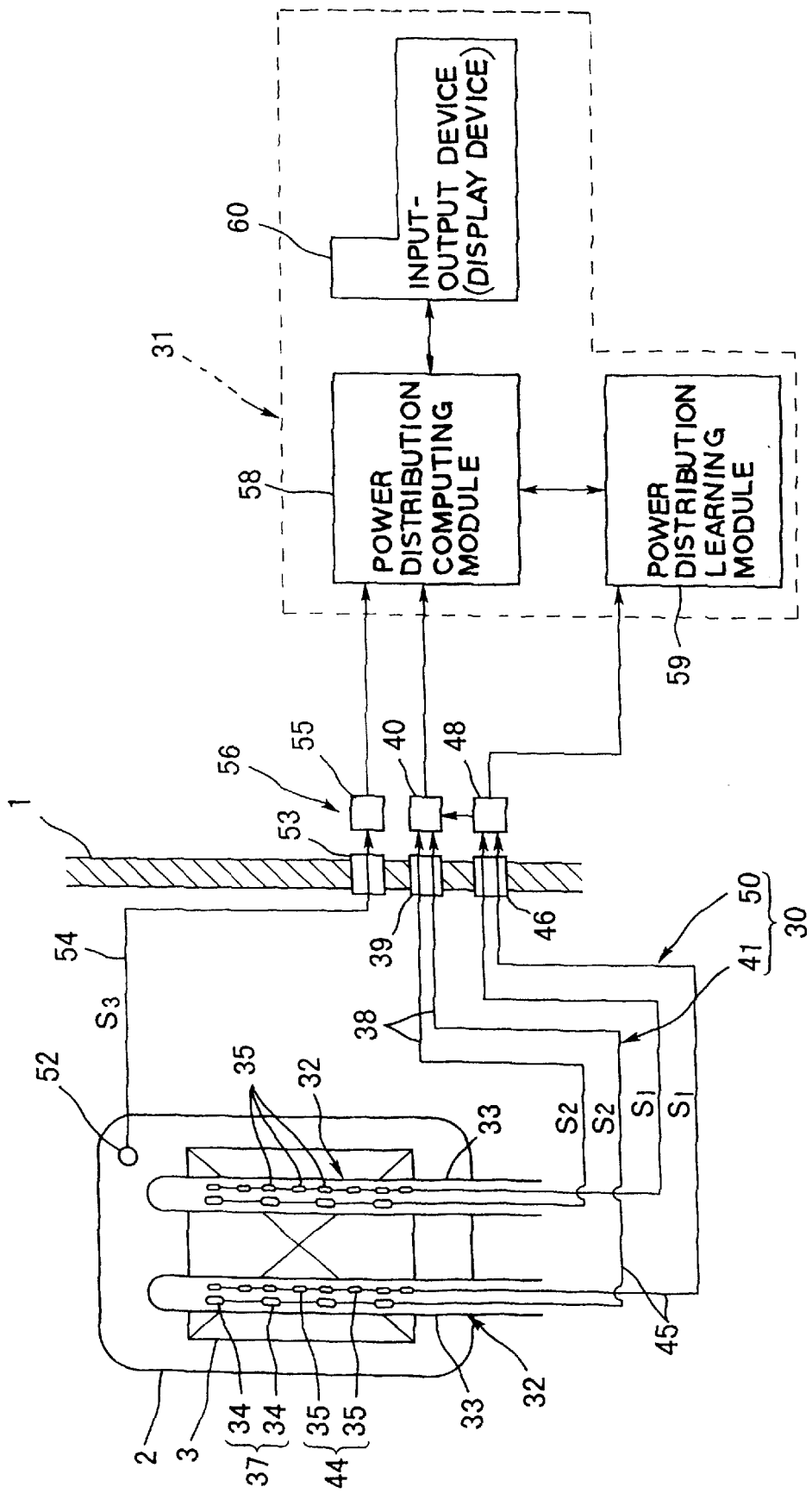
FIG. 1 is a block diagram schematically showing a configuration of a reactor power distribution monitor system according to an embodiment of the present invention.

FIG. 1 is a block diagram schematically showing a configuration of a reactor power distribution monitor system according to one embodiment of the present invention. The reactor power distribution monitor system is applied to a boiling water reactor (BWR) and includes a reactor nuclear instrumentation system 30 comprising a detector and a signal processing device and a reactor power distribution computing device 31 for computing a power distribution of a reactor core. The reactor power distribution computing device 31 is a part of a process control computer and monitors a reactor core performance.

Figure 2:
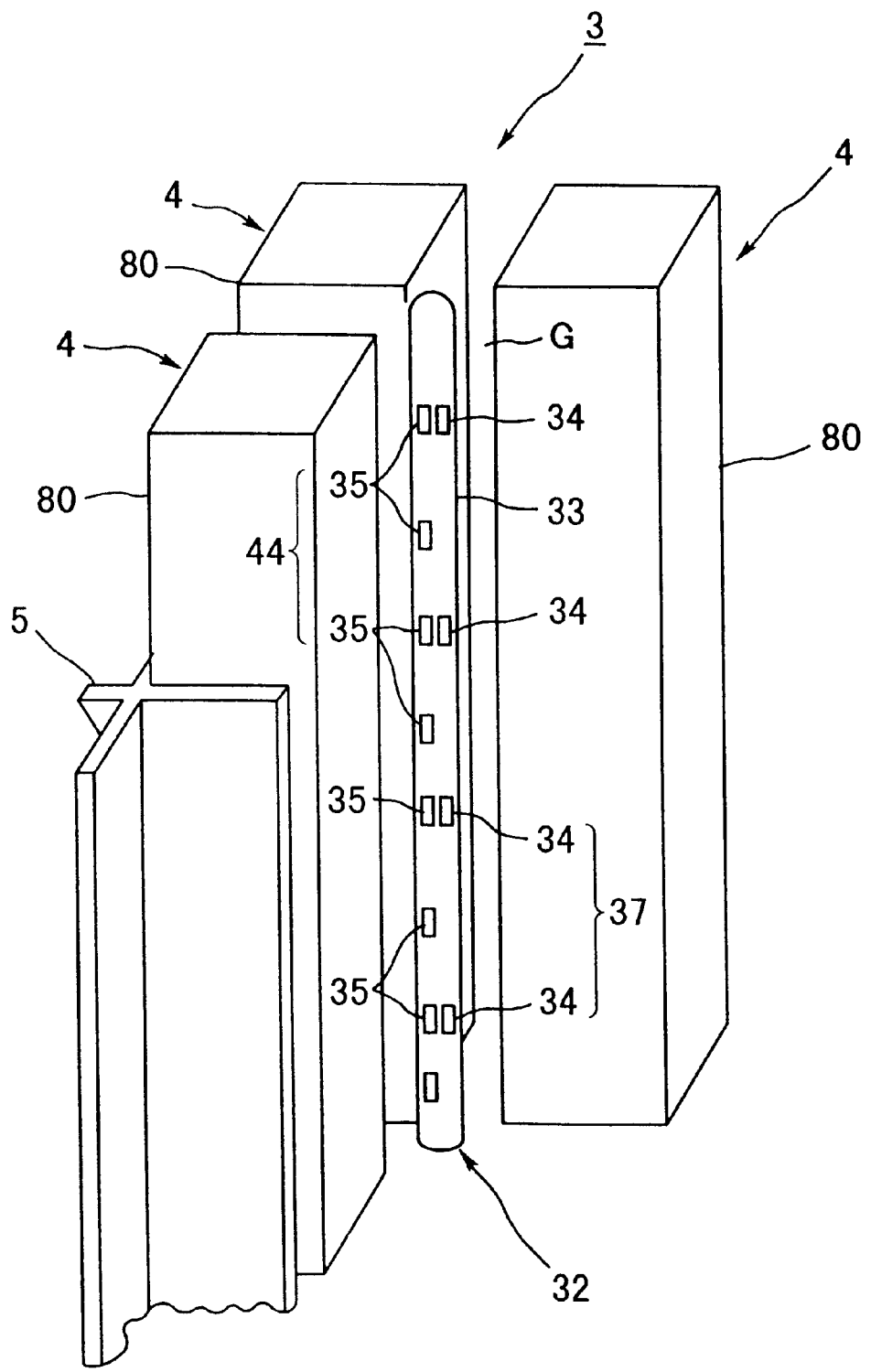
FIG. 2 is a view representing a first embodiment of a reactor nuclear instrumentation system according to the present invention and showing a perspective view partly in section showing a detector arrangement of a reactor power distribution measuring device included in the reactor nuclear instrumentation system.
Figure 3:
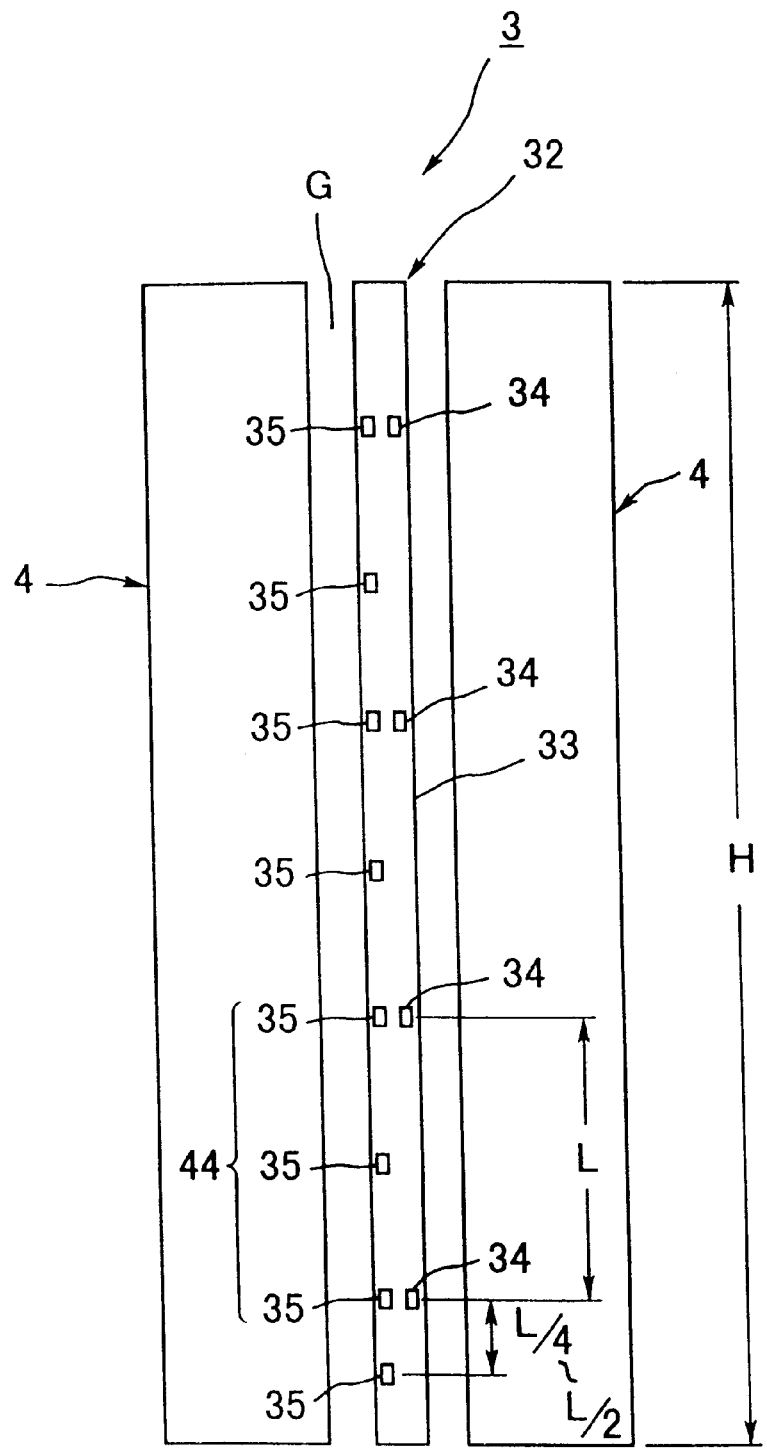
FIG. 3 is a front view partly in section showing a detector arrangement of the reactor power distribution measuring device shown in FIG. 2.

In the boiling water reactor, a reactor pressure vessel 2 is housed in a reactor container 1, and a reactor core 3 is housed in the reactor pressure vessel 2. The reactor core 3 is cooled by a coolant combining a moderator. The reactor core 3 is mounted with many fuel assemblies 4 as shown in FIG. 2 and FIG. 3. In these many fuel assemblies 4, four fuels assemblies constitutes one set, and a control rod 5 having a shape of cross in its cross section is mounted between one set of fuel assemblies 4 so as to be freely take in and out from a lower portion.

The reactor core 3 is constructed so that a plurality of sets of four fuel assemblies 4 are mounted therein. Further, the reactor core 3 is provided with a plurality of incore nuclear instrumented fuel assemblies 32 constituting a detector of the reactor nuclear instrumentation system. The incore nuclear instrumented fuel assemblies 32 are arranged at a position different from a position where the control rod 5 is arranged. Further, the incore nuclear instrumented fuel assembly 32 is arranged at a corner water gap G formed between four fuel assemblies 4, as shown in FIG. 2 and FIG. 3. Further, the incore nuclear instrumented fuel assembly 32 includes a thin and long tube-shaped nuclear instrumentation tube 33. The nuclear instrumentation tube 33 is dispersively provided with a plurality of neutron detectors 34 which function as a fixed type (stationary or immovable) neutron detecting means and a γ-ray heat detectors 35 which function as a fixed type γ-ray detecting means in an axial direction thereof.

In the nuclear instrumentation tube 33, a plurality of fixed type neutron detectors 34 are dispersively arranged as an LPRM detector at equal intervals in a core axial direction, and in this manner, a neutron detector assembly 37 is constructed. In a boiling water reactor, usually, four fixed type neutron detectors 34 are dispersively arranged at equal intervals in the core axial direction. Further, each of the neutron detectors 34 is electrically connected to a signal processing device 40 by means of a signal cable 38 penetrating through a penetration portion 39, and in this manner, a power range neutron flux measurement system 41 is constructed.

Further, in the nuclear instrumentation tube 33, a plurality of fixed type γ-ray heat detectors 35 are dispersively arranged in the core axial direction as a gamma thermometer in an arrangement of assembly (called merely gamma thermometer herein) and measures a gamma ray heat. The γ-ray heat detectors 35 has the same numbers as the fixed type neutron detectors 34 arranged in the core axial direction or more, for example, 8 in the core axial direction, and in this manner, a γ-ray heat detector assembly 44 is constructed as a gamma thermometer 44. Each of the γ-ray heat detectors 35 of the gamma thermometer 44 is electrically connected to a gamma thermometer signal processing device 48 by means of a signal cable 45 penetrating through a penetration portion 46, and in this manner, a gamma thermometer power distribution measurement system 50 is constructed.

The reactor nuclear instrumentation system 30 is composed of the power distribution neutron measurement system 41 and the gamma thermometer power distribution measurement system 50. A detector group of the reactor nuclear instrumentation system 30 is housed in the incore nuclear instrumentation assembly 32. The incore nuclear instrumentation assembly 32 measures a neutron flux and a γ-ray heat at a predetermined measuring point in the reactor core 3.

In the reactor nuclear instrumentation system 30, the movable neutron detector and the γ-ray detector are unnecessary, so that a mechanical drive device included in the conventional reactor nuclear instrumentation system can be omitted. Therefore, it is possible to simplify a structure of the reactor nuclear instrumentation system 30, and a driving part is dispensed in the reactor nuclear instrumentation system 30, so that maintenance free can be achieved, and also, an exposure work of a worker can be dispensed or greatly reduced.

The reactor pressure vessel 2 or a primary pipe system (not shown) is provided with a reactor core condition (present) data measuring device 52 which measures core process data such as a coolant core flow rate (or an approximate re-circulation flow rate), a core pressure and a coolant inlet temperature, a control rod position in a control rod drive device and the like. Although the reactor core operating status (present) data measuring device 52 is simply illustrated as one measuring device in FIG. 1, actually, it is reactor core operating status data measuring means which is composed of a plurality of measuring equipments for measuring or monitoring various reactor core process data.

The reactor core operating status data measuring device 52 is connected to a condition data processing device 55 via a signal cable 54 penetrating through a penetration portion 53, and in this manner, a process data measurement system 56 is constructed. The condition data processing device 55 of the process data measurement system 56 is not a exclusively independent device, but may be constructed as a process control computer or a part thereof. Thus, the process data measurement system 56 is included in the process control computer constituting the reactor core power distribution computing device 31. Further, the process data measurement system 56 may be constructed as a part of the reactor nuclear instrumentation system 30 in the light of a concept of a detector and a signal processing device.

Moreover, the process data measurement system 56, the power range neutron flux measurement system 41 and the gamma thermometer power distribution measurement 50 are electrically connected to the reactor power distribution computing device 31. Then, a signal processed by respective signal processing devices 40, 48 and 55 is inputted to a power distribution computing module 58 of the reactor power distribution computing device 31. The reactor power distribution computing device 31 is composed of: a power distribution computing module 58 which computes a neutron flux distribution, a power distribution, a margin of a thermal operation limit value or the like in a reactor core 3; a power distribution learning module 59 which is inputted with and corrects the computed result from the power distribution computing module and obtains a reactor core power distribution reflecting an actually measured process data; and an input-output device 60 including a display device.

The following signals are inputted to the reactor power distribution computing device 31. That is, the input signals includes a detection signal (γ-ray heat measurement signal) $S_1$ from the γ-ray heat detector 35 functioning as a gamma thermometer, a neutron flux detection signal $S_2$ from the neutron detector 34, and a reactor core present data detection signal $S_3$ from the reactor core present data measuring device 52.

The power distribution computing module 58 of the reactor power distribution computing device 31 processes the inputted reactor core present data detection signal $S_3$ according to a three-dimensional nuclear thermal-hydraulics computing code with the use of a physical model stored in the process control computer, and then, computes a neutron flux distribution, a power distribution, a margin of a thermal operation limit value or the like in a reactor core 3. The physical model is a spacer model taking an influence on an node power by the fuel spacer into consideration. A computation result computed by using the physical model is inputted to the power distribution adaption (learning) module 59 which functions as a power distribution correction module. The power distribution learning module 59 corrects a power distribution computation result based on the physical model with reference to the γ-ray heat measurement signal $S_1$, and then, returns it to the power distribution computing module 58. Subsequently, the module 58 makes an evaluation with respect to a reactor power distribution reflecting actually measured data and having high reliability and a thermal limit value.

By the way, as shown in FIG. 1 to FIG. 3, the incore nuclear instrumentation assembly 32 constitutes the reactor nuclear instrumentation system 30. The incore nuclear instrumentation assembly 32 is integrally arranged in the nuclear instrumentation tube 33 in a manner of combining a local power range monitor system (LPRM) 37 which is a neutron detector assembly functioning as a fixed type fission chamber (neutron detecting means), and the gamma thermometer 44 which is a γ-ray heat detector assembly functioning as a fixed type gamma ray detecting means. Further, the nuclear instrumentation tube 33 is arranged in a state of vertically extending in the core 3 of the reactor.

The LPRM 37 includes N (number, integer) (N≧4), for example, four fixed type neutron detectors 34 which are dispersively arranged at equal intervals in an axial direction, and the gamma thermometer 44 includes 8 or 9 gamma (γ) ray heat detectors 35 which are dispersively arranged in an axial direction. The neutron detectors 34 of the LPRM 37 and the gamma ray heat detectors 35 of the gamma thermometer 44 are housed in the nuclear instrumentation tube 33 while a coolant being guided so as to flow upwardly in the nuclear instrumentation tube 33.

In FIG. 2 and FIG. 3, there is shown an example of the gamma thermometer 44 which is constructed in a manner that eight γ-ray heat detectors 35 are arranged in a fuel effective portion H of the core axial direction. An arrangement interval of each γ-ray heat detector 35 in the core axial direction is determined taking an arrangement interval of each neutron detector 34 of the LPRM 37 in the core axial direction into consideration.

More specifically, if an axial distance between neutron detectors 34 of the LPRM 37 is set as L, in the gamma thermometer 44, four of the eight γ-ray heat detectors 35 are arranged at the same axial position as the fixed type neutron detector 34, three of them are arranged at an intermediate position of the neutron detector 34 at an interval L/2, and the lowest γ-ray heat detector 35 is arranged at a distance L/4 to L/2 below the lowest neutron detector 34 and in the fuel effective portion of 15 cm or more from the lower end of the fuel effective portion, and axial centers of these detectors are aligned with each other. In the case of locating the γ-ray heat detectors 35 above the uppermost neutron detector 34, the uppermost γ-ray heat detector 35 is arranged so as to be situated at a distance L/4 to L/2 above the lowest neutron detector 34 and in the fuel effective portion of 15 cm or more from the lower end of the fuel effective portion.

The lowest γ-ray heat detector 35 is arranged at a position near the lower end of the fuel effective portion as much as possible in a fuel effective length. In the case where the fuel effective length (371 cm at present) is divided into 24 nodes in a core axial direction, preferably, the γ-ray heat detector 35 is arranged so that its center is aligned with the axial center of the second core axial direction node from the bottom. When such an arrangement is made, in the γ-ray heat detector 35 of the gamma thermometer 44, it is possible to detect a γ-ray heat on a lower end side of the reactor core, and to measure the γ-ray heat on the lower end over a wider range of the fuel effective length in the core axial direction. This is because of preventing the following matter. That is, a power of the node on the lowest end is originally low due to a neutron leakage, and a sensitivity by the γ-ray heat detector 35 is low, and further, a contributing range of gamma ray to the γ-ray heat detector 35 is 15 cm or more as described later. For this reason, unless the γ-ray heat detector 35 is separated 15 cm or more from the lower end of the fuel effective length, other γ-ray heat detector 35 arranged at a core axial direction position measures a heating effect of γ-ray from the vertical direction in the axial direction. On the contrary, the lowest γ-ray heat detector 35 detects only γ-ray heat contribution from above. As a result, a correlation equation of power measurement is different.

In an axial directional design of a recent fuel assembly 4, there are many cases where a natural uranium blanket is used as the node on the lowest end. For this reason, even if the natural uranium blanket portion of a low power (output) is measured, the output signal of the gamma thermometer 44 is very low. Therefore, there is no means of interpolating and extrapolating a power distribution at a position below the lowest neutron detector 34.

Figure 4:
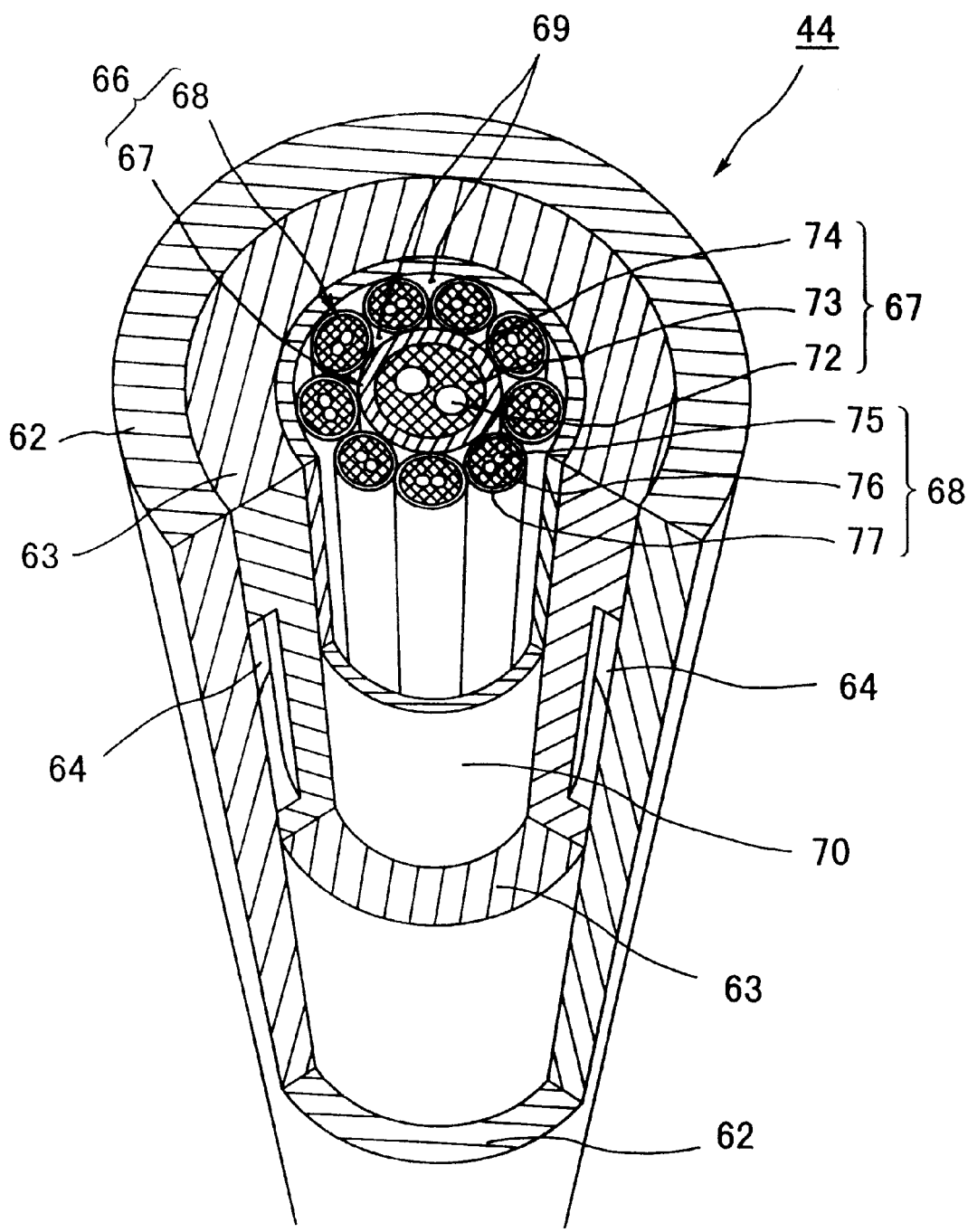
FIG. 4 is a perspective view partly in section showing a fixed type gamma thermometer included in a reactor power distribution measuring device shown in FIG. 2.
Figure 5:
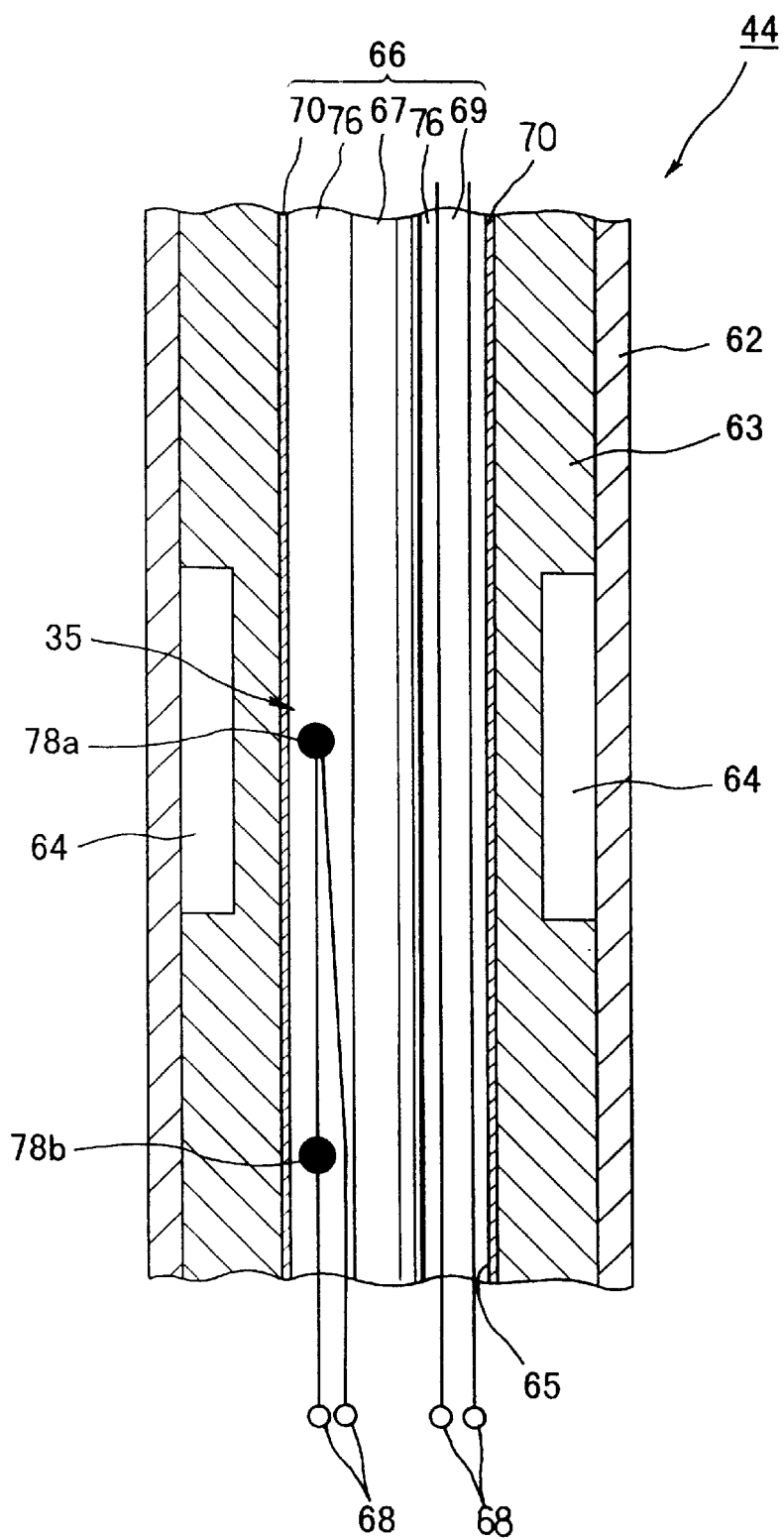
FIG. 5 is a partially sectional view showing a structure of the fixed type gamma thermometer shown in FIG. 4.

The gamma thermometer 44 has a long rod-shaped structure as shown in FIG. 4 and FIG. 5.

The gamma thermometer 44 is a thin and long rod-shaped assembly having a diameter of e.g., about 8 mm φ, and has a length of substantially covering a fuel effective length in a core axial direction.

In the gamma thermometer 44, a cover tube 62 formed of stainless steel is used as a metallic jacket, and a metallic long rod-shaped core tube 63 is housed in the cover tube 62. Further, the cover tube 62 and the core tube 63 are fastened, and then, are fixed to each other by means of shrinkage fit, cooling fit or the like. A sleeve or annular space portion 64 constituting an adiabatic portion is formed between the cover tube 62 and the core tube 63. A plurality of e.g., 8 or 9 annular space portions 64 are dispersively arranged at intervals in an axial direction. The annular space portion 64 is formed by cutting an outer surface of the core tube 63 along a circumferential direction. Then, a gas having a low heat conductivity, for example, an argon Ar gas is encapsulated in the annular space portion 64. The annular space portion 64 may be formed on the cover tube 62 side which is a jacket tube.

The γ-ray heat detector 35 is provided at a position where the annular space portion 64 is formed, and thus, a sensor section of the gamma thermometer 44 is constructed. The core tube 63 has an internal hole 65 which extends to an axial direction along the center thereof. In the internal hole 65, a mineral insulated (MI) cable sensor assembly 65 is fixed by means of brazing, caulking or the like.

The cable sensor assembly 66 is provided with a built-in heater 67 which functions as a correction rod-shaped exothermic body of the gamma thermometer 44 at the center thereof, and a differential type thermocouple 68 which functions a plurality of temperature sensors. The built-in heater 67 and the thermocouple 68 are hardened by an electric insulating layer or a metal/metal alloy filler 69, and then, are integrally housed in a metallic cladding tube 70. The metallic cladding tube 70 is closely abutted against others at both outer and inner surfaces thereof. The built-in heater 67 comprises a sheath heater and is integrally constructed in a manner that a heater wire 72 is coated with a metallic cladding tube 74 via an electric insulating layer 73. Further, the thermocouple 68 is integrally constructed in a manner that a thermocouple single wire 75 is coated with a metallic cladding tube 77 via an electric insulating layer 76.

The differential type thermocouple 68 located in the internal hold 65 of the core tube 63 is arranged so as to correspond to the annular space portion 64, and thus, the γ-ray heat detector 35 is constructed. As shown in FIG. 5, each thermocouple 68 is set in a manner that a high temperature side contact 78a is situated on the sensor section formed in the annular space portion 64, that is, on the center of the adiabatic portion in the axial direction, and a low temperature side contact 78b is situated at a downward position slightly separating from the adiabatic portion (the low temperature side contact 78b may be situated at an upward position slightly separating from the adiabatic portion). The thermocouple 68 is coaxially inserted around the built-in heater 67 by the same number as the γ-ray heat detector 35.

Figures 6A, 6B:
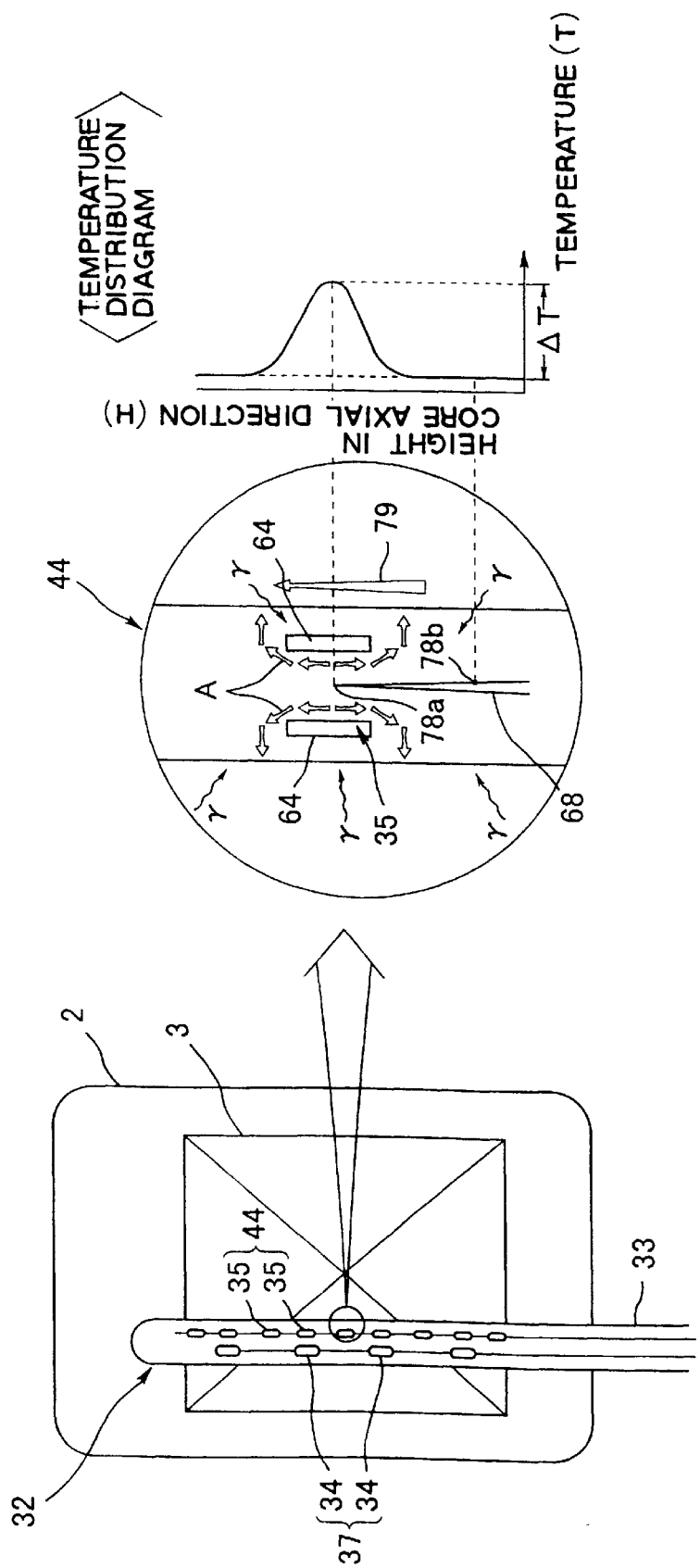
FIG. 6A is a view showing an arrangement of a reactor power distribution measurement detector included in the reactor nuclear instrumentation system according to the present invention.
FIG. 6B is a view to explain the principle of measuring a γ-ray heat of the fixed type gamma thermometer included in the reactor power distribution measurement detector, which further includes a chart showing a temperature distribution of γ-ray heat.

The gamma thermometer 44 is an incore power distribution detector (γ-ray heat detector) assembly, and the incore power distribution measuring principle is shown in FIG. 6A and FIG. 6B.

In a reactor such as a boiling water reactor or the like, a γ-ray is generated proportional to a fission yield of a nuclear fuel mounted in the reactor core 3 housed in the reactor pressure vessel 2. The generated γ-ray flux heats a structural element of the gamma thermometer 44, for example, the core tube 63. The heat energy is proportional to a γ-ray flux, and then, the γ-ray flux is proportional to a fission yield. In the annular space portion 64 of each γ-ray heat detector 35 which is a sensor section of the gamma thermometer 44, a performance of eliminating a heat by a diametrical coolant is worse due to a heat resistance of the annular space portion 64. For this reason, there is generated a heat flux as shown by an arrow A, which makes a detour in an axial direction, and as a result, a temperature difference is caused. So, the high temperature side contact 78a and the low temperature side contact 78b of the differential type thermocouple 68 are arranged as shown in FIG. 5, and it is possible to detect the temperature difference by a voltage signal. The temperature difference is proportional to the γ-ray heat, and therefore, it is possible to obtain a γ-ray heat which is proportional to a local fission yield from the voltage signal of the differential type thermocouple 68. This is the measuring principle of the gamma thermometer 44.

On the other hand, in the fuel assembly 4, as shown in FIG. 2, a fuel bundle (not shown) bundling up many fuel rods (not shown) is housed in a rectangular and cylindrical channel box 80. The fuel bundle is constructed in a manner that many fuel rods are bundled by a fuel spacer 81 (see SP position of FIG. 7) so as to provide a square lattice arrangement. The fuel spacer 81 holds a clearance between fuel rods. For example, seven fuel spacers 81 is dispersively arranged in the channel box 80 along an axial direction of the fuel bundle.

The fuel assembly 4 is mounted in the reactor core 3 in a state that its upper and lower ends are tightly fixed by an upper tie-plate and a lower tie-plate, respectively. Each fuel rod housed in the fuel assembly 4 is fixed in a manner that a fuel sintering pellet is filled in a fuel cladding tube made of a zirconium alloy, and upper and lower ends of the fuel cladding tube are deposited by an end plug. For example, an uranium oxide fuel or a uranium/plutonium mixed oxide (MOX) fuel is used as the fuel sintering pellet.

In a boiling water reactor, a great many of fuel assemblies 4 are mounted in the reactor core 3, and each fuel assembly 4 is formed with a coolant passage outside and inside the channel box 80. Many fuel assemblies 4 are mounted in the reactor core 3 in a state of standing together in the large number, and a computation of power distribution of the reactor core is carried out by means of the reactor power distribution computing device 31 according to a three-dimensional nuclear thermal-hydraulics simulation computation (three-dimensional nuclear hydrothermal computing code) stored in the process control computer. The three-dimensional nuclear thermal-hydraulics computing code has a spacer model.

The reactor power distribution computing device 31 is also called as a reactor core power distribution computing device or as a reactor core performance monitor and is one of functions stored in the process control computer of the reactor. In the reactor power distribution computing device 31, the following information is inputted to the power distribution computing module 58. That is, the information includes a control rod pattern obtained from the reactor core present data measuring device 52, a core flow rate, a reactor doom pressure (internal pressure of reactor pressure vessel), and various parameters such as a reactor heat power and a detection signal of a core inlet coolant temperature obtained from the reactor core condition (present) data. In concrete, the reactor core present data signal $S_3$ from the condition data processing device 55, the neutron flux signal $S_2$ from the signal processing device 40 and the γ-ray heat signal $S_1$ from the gamma thermometer signal processing device 48 are respectively inputted to the power distribution computing module 58 as a measured data.

Meanwhile, the power distribution computing module 58 of the reactor power distribution computing device 31 has a built-in three-dimensional nuclear thermal-hydraulics computing code which is a physical model. Then, an input signal is computed and processed with the use of the three-dimensional nuclear thermal-hydraulics computing code, and thus, an incore power distribution is obtained by computation (calculation). In such three-dimensional nuclear thermal-hydraulics computing code, an influence on an node power by the fuel spacer 81 is previously evaluated and is stored in the process control computer as a spacer model.

In the fuel assembly 4, the fuel rods are bundled up, and then, 7 to 8 fuel spacers 81 are dispersively arranged in an axial direction so as to keep predetermined interval between fuel rods. The arrangement effect of the fuel spacers 81 has not been considered in the conventional three-dimensional nuclear thermal-hydraulics computing code. The fuel spacer 81 is mainly made of a zirconium alloy having a low neutron absorption. It is found that a cooling water which is a moderator is locally reduced due to an existence of the fuel spacer 81, and for this reason, a thermal neutron flux is decreased. Also, the fuel spacer 81 has an effect of absorbing a neutron although the effect is slight, and therefore, this effect should not be disregarded.

Incidentally, in the case of computing a power distribution of the fuel assembly 4, frequently, the computation is carried out after the conventional fuel assembly is divided into 24 nodes in the axial direction. Although it is general that the number of nodes thus divided is 24, the fuel assembly may be divided into any of a range from 12 nodes to 26 nodes in accordance with a size of a reactor core. A node power is lowered due to an existence of the fuel spacer as described above, and it is found that there is an error of about 0.05 (i.e., 5% of node average power) at the maximum in a state standardized so that an average power of each node in the axial direction of the reactor core 3 becomes 1.0, depending upon an axial direction position and a diametrical direction in the reactor core 3.

However, in the conventional movable neutron flux measuring device (TIP), all of power distribution of 24 nodes in the core axial direction is read, and then, the whole node power is computed as a reference measurement signal according to the three-dimensional nuclear thermal-hydraulics computing code of the reactor power distribution computing device 31. Then, in the power distribution learning module which corrects the computed result, a node power including the fuel spacer is corrected, and as a result, the fuel spacer effect in the axial direction is accurately read (captured).

A power distribution of an axial direction of the reactor core 3 is computed according to the three-dimensional nuclear hydrothermal computing code on the basis of all nodes, for example, an axial measurement data less than 24 nodes and not the whole core axial direction node, and then, the computed result is learnt and corrected. In this case, however, if a gamma ray heat of the γ-ray heat detector portion corresponding to each position of the nuclear instrumentation tube 33 is computed on the basis of the power distribution result computed according to the three-dimensional nuclear thermal-hydraulics computing code having no spacer model, a learning error is caused in the node having the spacer, and then, the influence is given to other nodes.

Figure 11:
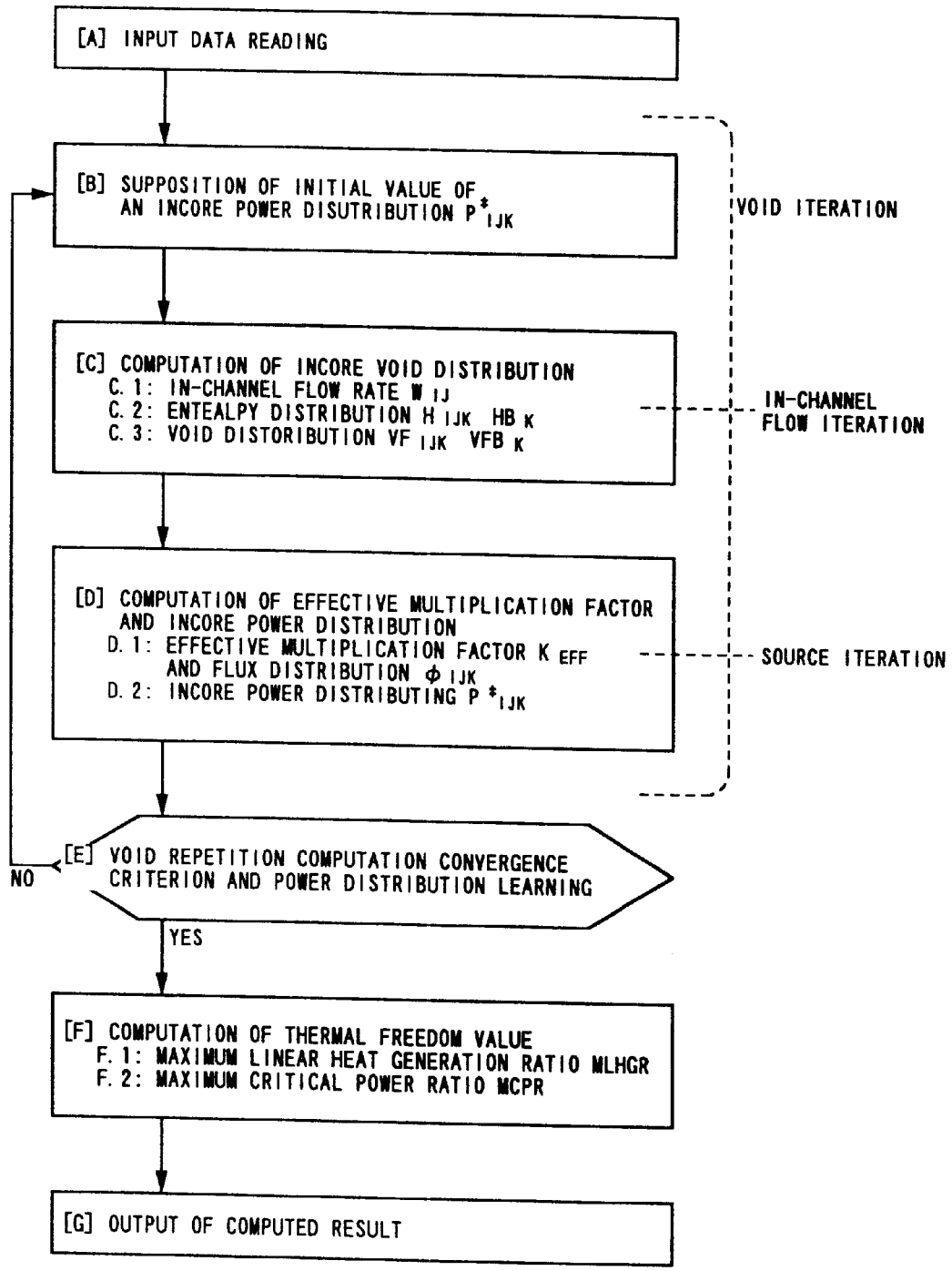
FIG. 11 is a flowchart showing a case where the reactor nuclear instrumentation system of the present invention is applied to a three-dimensional nuclear thermal-hydraulics computing code (example of correction one group code) of a boiling water reactor.

Next, to give an example of a physical model of a three-dimensional nuclear thermal-hydraulics simulation computing code which is employed in a boiling water reactor, a reactor power computation will be explained with reference to a flowchart shown in FIG. 11. In this case, a three-dimensional nuclear thermal-hydraulics computing code is generally called as correction group will be explained below.

[A] Input Data Reading:

Data required for computation, that is, the whole reactor core coolant flow rate, a control rod pattern, the whole reactor core generated power level, a power distribution (primary approximation) of the previous computation, a combustion distribution, LPRM and GT actually measured values, are inputted to the three-dimensional nuclear thermal-hydraulics computing code. The coolant flow rate is a reactor core operating status (present) data, and for this reason, some of process data are obtained from the operating status data measuring device 52, and then, are computed by means of the process data measurement system 56. The LPRM and GT actually measured values are inputted from each neutron detector 34 of the LPRM 37 and the γ-ray heat detector 35 of the gamma thermometer (GT) 44. The power distribution (primary approximation) of the previous computation and a combustion distribution are previous data stored in the reactor power distribution computing device.

[B] Supposition of the Initial Value of Incore Power Distribution $P^*_{ijk}$:

Usually, an incore (in-channel) power distribution or the like is supposed as the initial value required for a repeating computation called as Void Iteration, and then, the supposed value is set as a temporary incore power distribution $P^*_{ijk}$ for the following computation to advance the following computation. In this case, subscripts i and j are indicative of fuel assembly 4 position in the reactor core 3 and the subscript k is indicative of a reactor core axial position.

[C] Computation of Incore Void Distribution:

In order to compute an incore void axial distribution $VF_{ijk}$ of each fuel assembly 4 in the reactor core 3 and a reactor core average void axial distribution $VFB_k$ of a bypass range, required for an effective multiplication factor (constant) and an incore power distribution computation which will be described in the next item [D], the incore void axial distribution $VF_{ijk}$ of each fuel assembly 4 and the reactor core average void axial distribution $VFB_k$ are computed according to the following procedures.

(1) Computation of Each Fuel Assembly In-channel Flow Rate $W_{ij}$:

A coolant flowing into the reactor core 3 is divided into an in-channel (incore) flow flowing in each fuel assembly 4 and a bypass range flow in each fuel assembly 4 at a the reactor core bottom portion, and then, these in-channel flow and bypass range flow again join together at a reactor core top portion outlet. Therefore, a distribution computation need to be carried out so that each pressure loss of the in-channel flow rate $W_{ij}$ and the bypass range flow rate BPF of each fuel assembly 4 becomes equal when these flows pass through respective channels in the reactor core 3.

Moreover, there are a kind of fuel assembly 4 (e.g., 8×8 fuel or 9×9 fuel) and a kind of an orifice (e.g., peripheral orifice and center orifice) as a factor of giving a great influence to the distribution of the incore flow rate. For this reason, a coefficient of pressure loss for each axial portion of a hydrothermal characteristic representative fuel assembly channel and fuel assembly 4 is inputted every kind of the fuel assembly in the reactor core 3 and every kind of the orifice. The coefficient of pressure loss uses the result previously computed according to a reactor core hydrothermal analysis code every kind of the fuel assembly in the reactor core 3 and every kind of the orifice. The computation of the in-channel flow rate distribution is carried out according to a repeating computation because a pressure loss of each fuel assembly 4 depends upon a power distribution and a void distribution. In this case, the void distribution in fuel channel (channel box) gives a great influence to the computation of pressure loss.

A pressure loss of the fuel assembly is classified into four, that is, a friction pressure loss, a local pressure loss, a position pressure loss and an acceleration pressure loss. In order to compute the pressure loss, a known two-phase flow pressure loss equation is used such that an equation used in a usual single-phase flow is multiplied by a two-phase flow friction resistance magnification.

(2) Computation of Each Fuel Assembly Incore Enthalpy Axial Distribution $H_{ijk}$ and Bypass Range Core Average Enthalpy Axial Distribution $HB_k$:

In this enthalpy axial distribution computation, each fuel assembly incore (in-channel) enthalpy axial distribution $H_{ijk}$ and the bypass range core average enthalpy axial distribution $HB_k$ are computed by using the temporary incore power distribution $P^*_{ijk}$ used as the initial value, the in-channel flow rate $W_{ij}$ of each fuel assembly 4 computed in the following item [D], and the inputted bypass range flow rate BPF.

There is already a heat generated by a nuclear fission in the fuel rod as a factor of increasing an enthalpy of each fuel assembly in-channel node, and besides, there are gamma heat in the fuel rod, a neutron moderation of the coolant, gamma heat, and a heat transfer effect to the bypass range via a fuel channel. Considering these factors, an enthalpy of each fuel assembly In-channel node is computed.

The enthalpy computation is carried out for each fuel assembly channel with the use of an inputted core inlet coolant enthalpy, an incore power distribution $P^*_{ijk}$ and the in-channel flow rate $W_{ij}$ successively over a range from the bottom to the top portion of the reactor core.

Supposed that a bypass flow is sufficiently and uniformly mixed in the bottom portion of the reactor core, in the bypass range enthalpy axial distribution, an average distribution of the reactor core is used. The factors of increasing an enthalpy of each bypass range node include a heat generated by a nuclear fission in the fuel rod, and besides, gamma heat in the fuel rod, a coolant in the bypass range, contribution by a neutron moderation-absorption of the control rod and gamma heat, and a heat transfer effect to the bypass range from a fuel channel, and a heat transfer effect from the bypass range to the outside of the reactor core. Considering these factors, an enthalpy of the bypass range core average enthalpy axial distribution $HB_k$ is computed.

The computation is carried out successively over a range from the bottom portion to the top portion of the reactor core with the use of the following mathematical equation as the inputted reactor core inlet coolant enthalpy, the bypass flow rate BPF and the reactor core axial power distribution $P^*_k$.

[Mathematical expression 1]

$$\left( \sum_i \sum_j P^r_{ijk} \right)$$

(3) Computation of Each Fuel Assembly In-channel Void Rate Axial Distribution $VF_{ijk}$ and Reactor Core Average Void Axial Distribution $VFB_k$ of Bypass Range:

Based on each fuel assembly in-channel (incore) enthalpy axial distribution $H_{ijk}$ and the bypass range core average enthalpy axial distribution $HB_k$ computed in the above item [C], the fuel assembly in-channel void axial distribution $VF_{ijk}$ and the reactor core average void axial distribution $VFB_k$ of a bypass range are computed. In order to compute a void content (amount or rate) from a coolant enthalpy, there is the following equation (1) as a method of computing a void content of a sub-cool range.

[Mathematical expression 2]

$$\text{Quality: } X_{ijk} = (H_{ijk} - h_{sat})/(h_g - h_{sat}) \quad (1)$$

In place of the above equation (1), the following equation (3) is computed on the basis of a liquid enthalpy $HL_{ijk}$.

[Mathematical expression 3]

$$\text{Flow Quality: } XF_{ijk} = (H_{ijk} - HL_{ijk})/(h_g - HL_{ijk}) \quad (2)$$

Then, a flow quality $XF_{ijk}$ is computed with the use of an equation in which a drift flux model is applied to an expression of relation of the flow quality $XF_{ijk}$ and the void content. In this case, $h_{sat}$ represents an enthalpy of saturated water, and $h_g$ represents an enthalpy of saturated steam.

The reactor core average void rate axial distribution $VFB_k$ of a bypass range and an outlet void content $VFB_{ex}$ are computed from the bypass range core average enthalpy axial distribution $HB_k$, and the computing method is the same as the In-channel case.

[D] Computation of Effective Multiplication Factor and Incore Power Distribution:

This item [D] is a so-called nuclear computation section, and a nuclear constant of each node of the reactor core 3 is computed with the use of the incore in-channel void rate axial distribution $VF_{ijk}$ and the bypass range void axial distribution $VFB_k$ computed in the above item [C], and then, an effective multiplication factor $k_{eff}$ and an incore power distribution $P_{ijk}$ are computed. A power $P_{ijk}$ of each node is computed according to a nuclear fission by a neutron in each node. Therefore, in order to compute the incore power distribution $P_{ijk}$, a neutron flux distribution $\phi_{ijk}$ in the reactor core 3 must be computed.

Now, assuming that the neutron flux $\phi$ is divided into three groups, that is, a fast neutron flux $\phi_1$, an intermediate neutron flux $\phi_2$ and a thermal neutron flux $\phi_3$ according to an energy of neutron flux $\phi$, these three groups, that is, neutron flux $\phi_1$, $\phi_2$ and $\phi_3$ are obtained by solving the following diffusion equations (3), (4) and (5).

[Mathematical expression 4]

$$-D_1 \nabla^2 \phi_1 + \sum_1 \phi_1 = \frac{1}{k_{eff}} \left( \nu_1 \sum_{f1} \phi_1 + \nu_2 \sum_{f2} \phi_2 + \nu_3 \sum_{f3} \phi_3 \right) \quad (3)$$

$$-D_2 \nabla^2 \phi_2 + \Sigma_2 \phi_2 = \Sigma_{s/1} \phi_1 \quad (4)$$

$$-D_3 \nabla^2 \phi_3 + \Sigma_3 \phi_3 = \Sigma_{s/2} \phi_2 \quad (5)$$

where,
$D_g$: diffusion coefficient of energy g-group
$\Sigma_g$: eliminated cross section
$\Sigma_{s/g}$: moderating cross section
$\Sigma_{fg}$: fission cross section
$\nu_g$: number of neutrons generated per fission
In this case, g is a suffix of 1, 2 and 3

In order to solve the above diffusion equation, assuming that a buckling (see the following mathematical expression 5) of neutron flux of each energy group is equal, the above equations of energy three-group such as fast, intermediate and slow neutron fluxes are summarized to the diffusion equation of the fast neutron group, and then, only fast neutron flux distribution $\phi_{lijk}$ is computed.

[Mathematical expression 5]

$$B_g^2 \left( = -\frac{\nabla^2 \phi_g}{\phi_g} \right)$$

The incore power distribution $P_{ijk}$ is computed by adding an effect by the intermediate neutron flux $\phi_2$ and the thermal neutron flux $\phi_s$ to a nuclear fission by the fast neutron flux distribution $\phi_{lijk}$ thus obtained.

(1) Computation of Effective Multiplication Factor $k_{eff}$ and Incore Fast Neutron Flux Distribution $\phi_{lijk}$:

Assuming that a buckling $B^2_g$ of neutron flux of each energy group is equal, the fast neutron flux $\phi_1$ is distributed in the reactor core according to the following equations (6) and (7) which modifies the diffusion equations

[Mathematical expression 6]

$$\nabla^2 \phi_1 + B^2 \phi_1 = 0 \qquad (6)$$

where,
[Mathematical expression 7]

$$B^2 = \frac{\left(\frac{k^\infty}{k_{eff}}\right) - 1}{M^2 - \frac{A^\infty}{K_{eff}}} \qquad (7)$$

$k^\infty$: infinite multiplication factor of each point of reactor core
$M^2$: neutron migration area
$A^\infty$: correction term for diffusion of fast neutron and thermal neutron In order to solve a numerical value of the above equation, the above equation is transformed into the following difference equation (8).

[Mathematical expression 8]

$$\frac{1}{\Delta X^2}\{\phi_{i+1,j,k} + \phi_{i-1,j,k} + \phi_{i,j+1,k} + \phi_{i,j-1,k} - 4\phi_{i,j,k}\} + \qquad (8)$$

$$\frac{1}{\Delta Z^2}\{\phi_{i,j,K+1} + \phi_{i,j,k-1} - 2\phi_{i,j,k}\} + B^2_{i,j,k}\phi_{i,j,k} = 0$$

where,
$\Delta X$: length (about 15 cm) of X direction and Y direction of each node
$\Delta Z$: length (about 15 cm) of Z direction, that is, axial direction of each node

[Mathematical expression 9]

$$B^2_{ijk} = \frac{\left(\frac{k^\infty_{ijk}}{k_{eff}}\right) - 1}{M^2_{ijk} - \frac{A^\infty_{ijk}}{K_{eff}}} \qquad (9)$$

In the above equation (9), for simplification, the fast neutron flux $\phi_{lijk}$ of node (i, j, k) is represented as $\phi_{ijk}$. The above difference equation is prepared for each node of the reactor core 3, and then, is transformed into a simultaneous equation, and thus, the equation is solved so as to obtain a fast neutron flux distribution $\phi_{ijk}$ of each node of the reactor core. The fast neutron flux distribution $\phi_{ijk}$ is obtained by carrying out a repetition computation and making a numerical solution. The repetition computation is carried out at the same time with repetition computation of the fast neutron flux and the effective multiplication factor $K_{eff}$, and is called as Source Iteration.

The solution of the difference equation is as described above. Before obtaining the solution of the difference equation, there is a need of computing nuclear constants $k^\infty_{ijk}$, $M^\infty_{ijk}$, and $A^\infty_{ijk}$ of each node included in the difference equation and a boundary conditions contacting with an outer surface of the reactor core. In particular, the nuclear constant greatly varies due to a void content in the node and the boundary, and for this reason, the nuclear constant is newly computed every Void Iteration.

A channel void content of each fuel assembly is computed with the use of the In-channel void content (In-channel void rate axial distribution $VF_{ijk}$ and the bypass range void (void rate axial distribution) $VFB_k$ computed in the above item [C](3). A moderator relative history density $U_{ijk}$ defined in the following equation (10) is computed, and then, nuclear constants $k^\infty_{ijk}$, $M^2_{ijk}$, and $A^\infty_{ijk}$ of each node are computed by a fitting equation using these as parameters.

[Mathematical expression 10]

$$U_{ijk} = 1 - [FwVF_{ijk} + (1 - Fw)VFB_k] \cdot \left(1 - \frac{\rho_g}{\rho_{sat}}\right) \qquad (10)$$

where,
Fw: ratio of In-channel active coolant channel area to the whole coolant channel area In the case of computing nuclear constants $k^\infty_{ijk}$, $M^2_{ijk}$, and $A^\infty_{ijk}$ of each node, in addition to the moderator relative history density $U_{ijk}$, a moderator relative history density $UH_{ijk}$, a burn-up $E_{ijk}$, a presence of control rod $C_{ijk}$ and the like are used as parameters, and then, these effects are taken into consideration as the necessity arises. A great influence is given to the nuclear constant depending upon condition that the moderator is burnt up to the burn-up $E_{ijk}$ how void history, and for this reason, the moderator relative history density $UH_{ijk}$ is defined by the following equation (11) using introduced parameters.

[Mathematical expression 11]

$$UH_{ijk} = \int_0^{Eijk} U_{ijk}(E) dE \bigg/ \int_0^{Eijk} dE \qquad (11)$$

In this case, the power $P^*_{ijk}$ supposed in the above item [B] is used in the computation of the nuclear constant $k^\infty_{ijk}$ so as to make a Doppler correction, and also, an average xenon of the node is computed so as to make a xenon correction.

A coefficient required for the computation of the above fitting equation is inputted as a library data with the use of the result computed every kind of fuel assembly and every parameter according to the fuel assembly nuclear hydrothermal computing code.

(2) Computation of Reactor Core Power Distribution $P_{ijk}$:

A power distribution $P_{ijk}$ is computed with the use of the incore fast neutron flux distribution $\phi_{ijk}$ computed in the above item [D](1). By using the conditions supposed in the above item [D](1), a power $P_{ijk}$ of each node (i, j, k) is expressed by the following equation (12).

[Mathematical expression 12]

$$P_{ijk} = \frac{k^\infty_{ijk} \sum_{lijk} \phi_{ijk}}{\overline{v}_{ijk}} \qquad (12)$$

where,
$\Sigma_{lijk}$: eliminated cross section of fast neutron flux group
$\overline{v}_{ijk}$: number of average neutron generated per fission of the whole neutron group

[External Character 1]
$\Sigma_{lijk}$ and $\overline{v}_{ijk}$ are computed by a fitting equation using the moderate relative density $U_{ijk}$ and by a fitting equation using the burn-up $E_{ijk}$ as parameter, respectively. A coefficient used in these fitting equations is computed in the same manner as the nuclear constant computed in the above item [D](1). Therefore, first, $\Sigma_{lijk}$ and $\overline{v}_{ijk}$ required for computing the incore power distribution $P_{ijk}$ are computed by the fitting equation, and then, the incore power distribution $P_{ijk}$ is computed by the above equation (12) with the use of $k^\infty_{ijk}$ and $\phi_{ijk}$ computed in the above item [D](1).

[E] Void Repetition Computation Convergence Criterion and Power Distribution Learning:

This item [E] is a so-called Void iteration convergence criterion. More specifically, a comparison is made between the incore power distribution $P^*_{ijk}$ supposed in the above item [B] and the power distribution $P_{ijk}$ computed in the above item [D](2). The comparison is carried out with respect to all nodes in the reactor core, and if the comparative result is coincident, the Void Iteration converges. If the comparative result is not coincident, the computation sequence returns to the above item [B], and then, the power distribution $P^*_{ijk}$ is again supposed and corrected, and thus, the computation stated in the items [B] to [E] is repeated until the comparative result is coincident. In the convergence criterion, a comparison of effective multiplication factor of the whole reactor core is carried out at the same time with the comparison of power distribution.

By the way, in the case of learning a power distribution, in the Void Iteration, further, a comparison is carried out between a γ-ray heat (actually measured heating value) from the gamma thermometer (GT) 44 and a γ-ray heat (computed heating value) from the computed power distribution $P_{ijk}$, and then, the difference between heating value is computed as a ratio. The difference of ratio is interpolated and extrapolated with respect to the axial node having no GT detector 35, and then, is computed as a difference data (actually measured value)/(computed value) between a reactor core coordinate position having each GT 44 and 24 axial modes for a γ-ray heat computation of GT 44 of a nuclear instrumentation coordinate to which the actually measured value is applicable on the basis of a symmetry of the reactor core although there is no GT 44.

Figure 10:
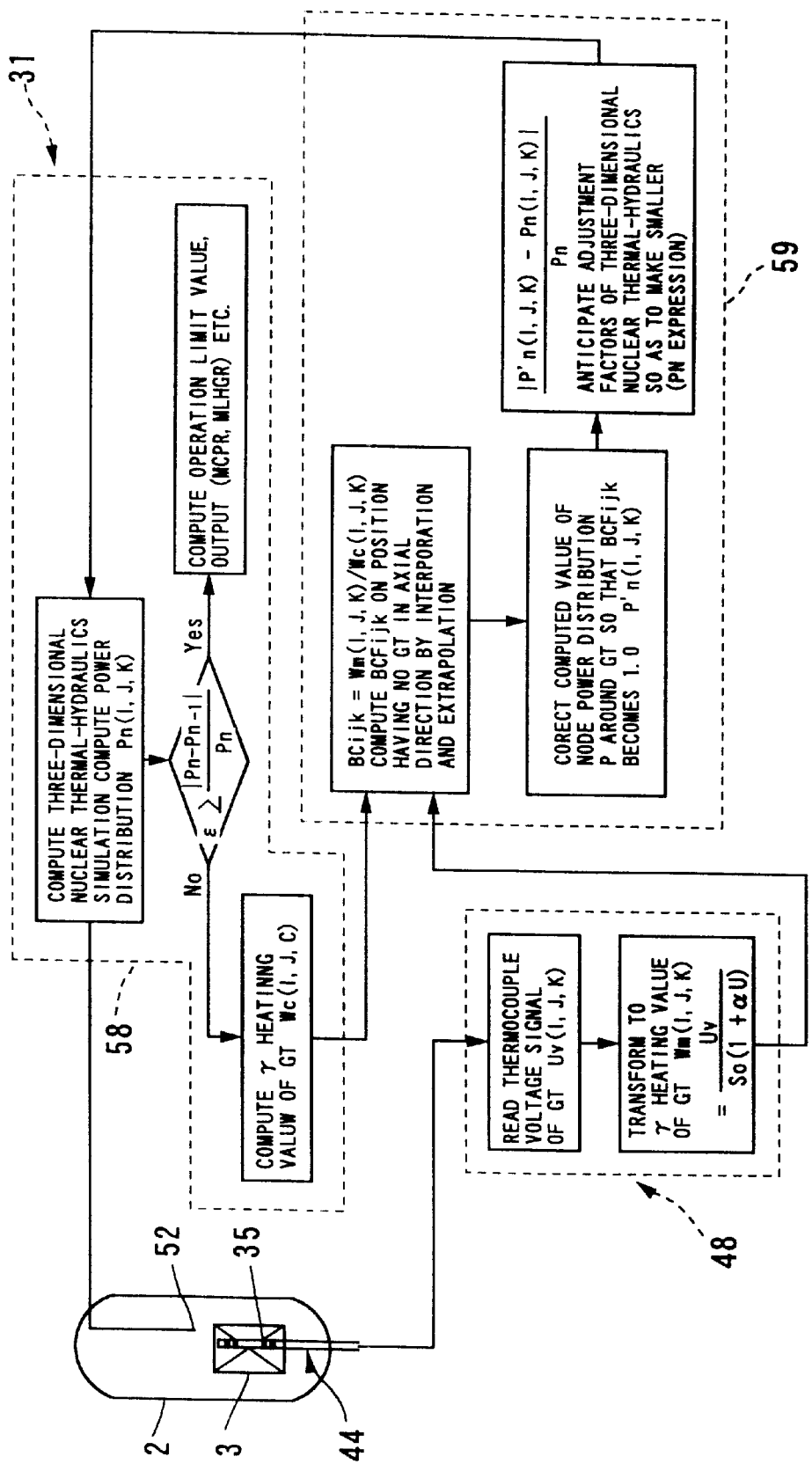
FIG. 10 is a view showing a reactor core power distribution computation and a learning flow of a power distribution computing module and a power distribution correcting module included in a reactor power distribution computing device of the reactor power distribution monitor system according to the present invention.

The difference data is $BCF_{ijk}$ shown in FIG. 10. A computation value of the node power distribution around the GT 44 is corrected so as to be adapted to the $BCF_{ijk}$, and Void Iteration is repeated so that the γ-ray computed heating value of GT 44 is coincident with the actually measured value.

In the case where the Void Iteration converges, and the γ-ray computed heating value of GT 44 is coincident with the actually measured value, and further, the computed power distribution $P^*_{ijk}$ is coincident with the previous repeated power distribution, the computation sequence proceeds to a computation of a thermal margin value in the reactor core 3 which will be described in the following item [F]. If coincidence is not obtained, the computation sequence returns to the item [B], and then, the power distribution $P^*_{ijk}$ is again supposed and corrected, and thus, the computation stated in the items [B] to [E] is repeated until the comparative result is coincident.

[F] Computation of Thermal Margin Value

In the item [F], a thermal margin value of each node of the reactor core 3 is computed with the use of the numerical solution converged in the Void Iteration. However, the solution obtained from the Void Iteration is an average value of each node. In the case of computing a thermal margin value, there is a need of carrying out a computation relative to the maximum generating power fuel rod. Then, the power $P_{ijk}$ of each node computed in the above item [D](2) is divided by the number of fuel rods of node, and then, is multiplied by a local power keeping coefficient, and thus, a power of the maximum power generating fuel rod of each node is first computed. The following computation of thermal margin value is carried out with respect to the fuel rod generating the maximum power.

The void content and burn-up of the node gives a great influence to the local power keeping coefficient required for the computation of the thermal margin value, in addition to the presence of a control rod inserted adjacent to or in the vicinity of the node. In the present computing code, these three variables are used as a parameter, and the local power keeping coefficient is computed by a fitting equation for each node. A coefficient required for the fitting equation is computed with the use of the result previously computed every fuel assembly 4 and every each parameter according to the fuel assembly nuclear characteristic computing code, and thus, is inputted to the present computing code as a library data.

(1) Computation of Maximum Linear Heating Generation Ratio $LHGR_{ijk}$:

The maximum linear heat generation ratio $LHGR_{ijk}$ of each node (i, j, k) is obtained by dividing it by an axial unit node length $\Delta Z$ because a power of the maximum power generation fuel rod of each node has been already computed.

The maximum linear heat generation ratio of the whole node of the reactor core is set as the whole reactor core maximum linear heat generation ratio MLHGR.

(2) Computation of Minimum Critical Power Ratio MCPR:

A critical power ratio CPR is defined by the following equation (13).

[Mathematical expression 13]

$$CPR = CP/ABP \ldots (13)$$

where,
CP: critical power
ABP: actual power of fuel assembly

A critical power CP is a power which is anticipated that the fuel assembly 4 of a computing target generates transition boiling, and is obtained from a GEXL correlation equation based on an experiment simulating a shape of an actual fuel rod.

A critical power ratio CPR is an index indicative of a thermal freedom until the fuel assembly 4 of a computing target generates transition boiling. In the present (condition) computing code, the critical power ratio CPR is computed for each fuel assembly 4, and the minimum of the computed ratios is set as a minimum critical power ration MCPR.

[G] Output of Computed Result:

In this item [G], the computed result is outputted as the necessity arises.

By carrying out the repetition computation as described above, an axial power distribution of each fuel assembly is obtained. This is a typical method for obtaining the axial power distribution of each fuel assembly. In fact, a secondary correction model is introduced into the method, and it is general that a design is made in order to improve an accuracy of the power distribution and the effective multiplication factor. However, the explanation is not a subject matter of the present invention and it is hence omitted.

A reactor power distribution computing method is applicable to the method mentioned hereinbefore, and has the following features as described below. More specifically, a fuel spacer effect should be taken into consideration in parameters of nuclear constants $k^\infty_{ijk}$, $M^2_{ijk}$ and $A^\infty_{ijk}$ of core axial node having the fuel spacer 85.

For example, in a state that the control rod is not inserted, $k^\infty_{ijk}$ is obtained by the following equation (14).

[Mathematical expression 14]

$$k^\infty_{ijk,UN} = (1 + f(IFT, Exp., UH) + \Delta f1(IFT, Exp., U, UH)) *$$
$$(1 + \Delta f2(IFT, Exp., UH, P)) *$$
$$(1 + \Delta f3(IFT, Exp., U, UH, P)) \quad (14)$$

where,
IFT: type of design of fuel cross section
Exp: node burn-up
UH: node history relative water density
U: node instantaneous relative water density
P: node power
f (IFT, Exp, UH):
(infinite multiplication factor having Xe to base power)−1.0
Δf1 (IFT, Exp, UH):
effect by difference between node history relative water density UH and instantaneous relative water density U
Δf2 (IFT, Exp, UH):
Doppler effect correction by difference from temperature in base output
Δf3 (IFT, Exp, UH): effect by Xe, Sm Thus, the infinite multiplication factor is obtained. However, in this case, conventionally, the effect by the fuel spacer 81 has not been taken into consideration with respect to values of the node history relative water density UH and the instantaneous relative water density U.

On the other hand, the moderator relative density $U_{ijk}$ is defined by the following equation (10).

[Mathematical expression 15]

$$U_{ijk} = 1 - (FwVF_{ijk} + (1 - Fw)VFB_k) \cdot \left(1 - \frac{\rho_g}{\rho_{sat}}\right) \quad (10)$$

In each fuel spacer 81, a spacer portion is additionally computed from the In-channel passage void $VF_{ijk}$ in the case of disregarding the fuel spacer, and then, a new moderator relative density $U_{ijk,sp}$ is computed by the following equation (10A).

[Mathematical expression 16]

$$U_{ijk,sp} = 1 - Fw*S_{sp} + Fw*S_{sp}\frac{\rho_{sp}}{\rho_{sat}} - \quad (10A)$$
$$(Fw(1 - S_{sp})VF_{ijk} + (1 - Fw)VFB_k) \cdot \left(1 - \frac{\rho_g}{\rho_{sat}}\right)$$

where,
$S_{sp}$: spacer occupied area ratio of in-channel (active coolant) passage
$\rho_{sp}$: equivalent water density of fuel spacer The moderator (water) relative density $U_{ijk,sp}$ defined in the above equation (10A) is stored as a history relative water density UH for each spacer position of each fuel assembly 4, and an infinite multiplication factor of the node having the fuel spacer 81 is computed in the following manner.

For example, in a state that the control rod 5 is not inserted into the reactor core 3, an average infinite multiplication factor $k^\infty_{ijk}$ of the node having the fuel spacer shown in the above equation (14) is expressed as below by a load average of $k^\infty_{ijk}$,UN in the case of disregarding the spacer into consideration and the infinite multiplication factor $k^\infty_{ijk}$,UN, SP (however, U and UH is replaced with USP and UHSP taking the fuel spacer into consideration) taking a fuel spacer defined in the same manner into consideration, and adjustment factors $(C_0+C_1U+C_2U^2)$. In this case, $C_0$, $C_1$ and $C_2$ are each a constant different from a fuel type. Namely, the above equation (14) is rewritten into the following equation (14A).

[Mathematical expression 17]

$$[(1-V_s)*k^\infty_{ijk,UN}+V_s*k^\infty_{ijk,UN,sp}]*[C_0+C_1U+C_2U^2] \quad (14A)$$

where,
$V_s$: weight coefficient taking an axial volume rate of the node having the fuel spacer 81 into consideration In the same manner, infinite multiplication factors $M^2_{ijk}$ and $A^\infty_{ijk}$ of the node having the fuel spacer are respectively defined by the following load average of the moderator relative density $U_{ijk}$ in the case of disregarding the fuel spacer and the moderator relative density $U_{ijk,sp}$ in the case of taking the fuel spacer into consideration.

[Mathematical expression 18]

$$(1-V_s)*M^2_{ijk,UN}+V_s*M^2_{ijk,UN,sp} \quad (15)$$

$$(1-V_s)*A^\infty_{ijk,UN}+V_s*A^\infty_{ijk,UN,sp} \quad (16)$$

The state that the control rod 5 is inserted into the reactor core 3 is a method for preparing a data library used conventionally, and the method is readily carried out by using a ratio to a state that the control rod 5 is not inserted.

By defining in the manner as described above, it is possible to correct a library data such as the infinite multiplication factor of the node having the fuel spacer 81, migration area or the like, and a neutron flux can be accurately computed in the node having the fuel spacer 81.

According to this definition, a node power is obtained by the same equation as the above equation (12) with respect to the node having the fuel spacer 81.

[Mathematical expression 19]

$$P_{ijk,*} = \frac{k*\infty_{ijk}\sum *1_{ijk} \phi_{ijk}}{\overline{V}*_{ijk}} \quad (12A)$$

In this case, in order to take the spacer effect into consideration, a symbol, to which a mark * is given as an additional character, is indicative that the parameter in the case of having a spacer is obtained by being subjected to a load average process to compute a node average parameter. The computing method is the same as the equations (14A), (15) and (16).

According to the above explanation, the correction first group diffusion equation is obtained on the assumption that buckling of neutron flux $\phi_1$, $\phi_2$ and $\phi_3$ of each energy group is equal. Even in the case of considering an influence caused by the fact that the thermal neutron distribution of the core axial node diverges from a basic mode by a spectrum mismatch effect between the node and the node adjacent thereto, the aforesaid concept for obtaining the diffusion equation may be adaptable. Further, without using the correction first group diffusion equation, in the case of using a three-group diffusion equation, each of the constants $D_g$, $\Sigma_g$, $v_g \Sigma_{fg}$, and $\Sigma_{slg}$ can be generally expressed as shown below by a load average of a value in the case of taking the fuel spacer into consideration and a value which does not take it into consideration, and by adjustment factors (14B) and (14C). In this case, there is shown an example of a nuclear constant in the case where the control rod is not inserted.

[Mathematical expression 20]

$$X^*_{gijk,UN} = [(1 - V_{sxg}) * X_{gijk,UN} + V_{sxg} X_{gijk,UN}] * [ \quad (14B)$$
$$C_{0xg} + C_{1xg}U + C_{2xg}U^2]$$

[Mathematical expression 21]

$$X_{gijk,UN} = f_{xg}(IFT, EXP., UH) + \Delta f_{1xg}(IFT, EXP., U, UH) + \quad (14C)$$
$$\Delta f_{2xg}(IFT, EXP., UH, P) + \Delta f_{3xg}(IFT, EXP., U, UH, P)$$

where, $X_g$: nuclear constant X of g-group (one of $D_g$, $\Sigma_g$, $\nu_g \Sigma_{fg}$, and $\Sigma_{slg}$)

$X^*_g$: node average nuclear constant in the case of considering effect by a g-group spacer $f_{xg}$(IFT, EXP, UH):
  equilibrium Xe to base power, value of nuclear constant $X_g$ $\Delta f_{1xg}$ (IFT, EXP, U, UH):
  effect by difference between history relative water density and instantaneous relative water density $\Delta f_{2xg}$ (IFT, EXP, UH, P):
  Doppler effect correction by difference from temperature in base power $\Delta f_{3xg}$ (IFT, EXP, U, UH, P): effect by Xe, Sn $V_{sxg}$: weight coefficient taking an axial volume rate in the node having the spacer of g-group nuclear constant X into consideration $C_{0xg}$, $C_{1xg}$, $C_{2xg}$: adjustment factor of g-group nuclear constant determined every fuel type Therefore, this spacer model is generally applicable in addition to a correction first group code.

Next, the following is a description on an operation by the neutron flux distribution monitor system and reactor core power distribution computing method.

According to the above first embodiment, in the reactor power distribution computing device 31, various core present data such as control rod pattern obtained from the present data measuring device 52 of the reactor core 3, core flow rate, reactor doom pressure, core inlet coolant temperature are collected to the present (condition) data processing device (including the process control computer) 55, and then, a reactor thermal power (output) or the like is computed. The reactor core present (operating status) data measuring device 52 is actually composed of a plurality of monitor equipments and is the general term of a device for collecting process data of various operation parameter of the reactor and is expressed as one measuring equipment for simplification. Further, The process data processed by the present data processing device 55 is transferred to the three-dimensional nuclear thermal-hydraulics computing code of the reactor core power distribution computing device 31 (used as part of the process control computer or as an exclusive computer independently located) as various required data. The three-dimensional nuclear thermal-hydraulics computing code computes an incore power distribution with the use of these process data and the reactor core nuclear instrumentation data $S_1$ and $S_2$.

In the reactor core power distribution computation, a correction spacer nuclear constant parameter is held with respect to a node having the fuel spacer 81, in addition to the nuclear constant parameter which does not take the fuel spacer 81 into consideration as conventionally. Further, in the history relative water density of the fuel spacer portion, the equation (10A) is integrated as the equation (11) so that the moderator relative history density $UH_{ijk,sp}$ is held. For example, as shown in the above equations (14A), (15) and (16), in the node having the fuel spacer 81, the effect by the fuel spacer 81 is taken into consideration, and then, in accordance with the necessity, a parameter reflecting as a function of a burn-up, history relative water density and instantaneous relative water density is subjected to a load average process so as to obtain a node average value. Whereby a solution of correction first group difference equation is obtained, and in first group node average neutron flux computing process, an effect of lowering first group neutron flux by the fuel spacer effect is reflected.

Further, in order to obtain a node average power from first group neutron flux $\phi_1$, contribution by second and third group neutron fluxes $\phi_2$ and $\phi_3$ need to be reflected. In this case, also, in the node having the fuel spacer 81, the equation (12A) is used in place of the equation (12), and therefore, in the effect by the spacer 81 to the first group neutron flux $\phi_1$, a diffusion coefficient is large in the first group. Because of this reason, the contribution by the spacer effect is not so large. The effect obtained by the fact that the third group neutron flux $\phi_s$, of the energy group lowers is taken into consideration. Furthermore, in the equation (12A), $\Sigma^*_{iijk}$ includes the spacer effect by the fuel spacer 81 by load average, but may be used as $\Sigma_{ijk}$ which does not take the spacer effect into consideration for simplification.

As a result, it is possible to accurately reflect node power lowering on the spacer portion which has not been taken into consideration in the conventional power distribution computing method, with respect to the node having the fuel spacer 81.

Moreover, in this first embodiment, it is possible to learn and correct the axial power distribution with the use of the LPRM detectors which are less then 24, four or more measurement data, and the three-dimensional nuclear thermal-hydraulics computing code evaluating an influence on the node power by the fuel spacer.

The actual thermocouple output signal $S_1$ of the gamma thermometer 44 is converted from a voltage into a gamma ray heating value by means of the gamma thermometer signal processing device 48, and then, is inputted to the reactor power distribution computing device 31. In the reactor power distribution computing device 31, a correction in difference between a simulation computation value of the γ-ray heating value obtained from the reactor core power distribution computed by the three-dimensional nuclear thermal-hydraulics computing module 58 and the actually measured γ-ray heating value is computed as a ratio by means of the power distribution correcting (learning) module 59. Further, in the power distribution learning (adaption) module 59, a numerical difference ratio limited to the axial direction, that is, a ratio of the computed γ-ray heating value and the actually measured γ-ray heating value is set as a correction data of the γ-ray heating value difference correction of the total core axial node by interpolating and extrapolating the ratio data to each axial node by a straight line or a quadratic curve.

Moreover, a learning correction of the power distribution learning module 59 of the reactor power distribution computing device 31 will be described below with reference to a flowchart of FIG. 10.

The power distribution computing module 58 of the reactor power distribution computing device 31 is built in the process computer and computes an incore power distribution according to the aforesaid method with the use of the three-dimensional nuclear thermal-hydraulics computing code which takes an influence on the node power by the fuel spacer into consideration.

A γ-ray heat computation value $Wc_{k,m}$ on the γ-ray heat detector 35 position is computed by the following equation (17) on the basis of a power of a node corresponding to a height position of the γ-ray heat detector of four fuel assemblies 4 located around the γ-ray heat detector 35 and a power of a vertical node adjacent to the node.

[Mathematical expression 22]

$$W_{Ck,m} = \frac{1}{4} \times \sum_{n=1}^{4} \{c_{k-1 \to k,m,n} \Delta P_{k-1,m,n} + c_{k,m,n} P_{k,m,n} + c_{k+1 \to k,m,n} \Delta P_{k+1,m,n}\} \quad (17)$$

where,
- $Wc_{k,m}$: computation value of γ-ray heating value (read value) of the GT sensor located on the axial center of k node situated at the nuclear instrumentation tube position m
- $P_{k,m,n}$: axial k node average power of the fuel assembly n in four fuel assemblies around the nuclear instrumentation tube position m
- $\Delta P_{k-1}$: $P_{k-1} - P_k$
- $\Delta P_{k+1}$: $P_{k+1} - P_k$
- c: correlation function from node power to γ-ray heating value
- m: nuclear instrumentation tube position
- n: four assemblies located around the nuclear instrumentation tube An actually measured value of the γ-ray heating value $Wm_{k,m}$ at γ-ray heating value measurement points k and m is inputted to the power distribution learning module 59, and then, the above γ-ray heating value $Wc_{k,m}$ is compared with a γ-ray heating value measurement value $Wm_{k,m}$, and thus, a correction coefficient $BCF_{k,m}$ is computed by the following equation (18).

[Mathematical expression 23]

$$BCF_{k,m} = Wm_{k,m}/Wc_{k,m} \quad (18)$$

A γ-ray heating value correction coefficient $BCF_{k,m}$ is an index indicative of a difference (error) between the actually measured value of the γ-ray heating value and the γ-ray heat computation value according to the physical model. The γ-ray heating value is proportional to a power of fuels around the γ-ray heat detector 35, and for this reason, a power distribution computation value $P_{k,m,n}$ is corrected by the following equation (19) with the use of the correction coefficient $BCF_{k,m}$, whereby it becomes possible to obtain a power distribution which eliminates an error by the physical model and has high reliability. In this case, $Pa_{k,m,n}$ shows a node power at the corrected γ-ray heating value measurement points k and m.

[Mathematical expression 24]

$$Pa_{k,m,n} = BCF_{k,m} \times P_{k,m,n} \quad (19)$$

By the way, the γ-ray heat detector 35 of the gamma thermometer 44 is located continuously in only core axial direction, and at the node position having no γ-ray heat detector 35, it is impossible to compute the correction coefficient $BCF_{k,m}$. For this reason, in other core axial nodes, the correction coefficient $BCF_{k,m}$ obtained at measurement points k and m is computed by interpolating and extrapolating it to a straight line or a quadratic curve, and then, the total node power $Pa_{k,m,n}$ of axial direction is computed with the use of the correction coefficient $BCF_{k,m}$. Moreover, the fuel assembly having the gamma thermometer 44 in the core diametrical direction position is learned and corrected with the use of a signal from the gamma thermometer 44 on the identical position on the basis of symmetry of the reactor core. In this case, a subscript k shows a core axial node, and subscripts m and n merely show a coordinate of reactor core based on the relationship between the fuel assembly 4 and nuclear instrumentation tube. The coordinate makes it possible to replace with the coordinate i and j of reactor core of the fuel assembly 4 used in the above equations (1) to (16).

Furthermore, there is the following method as a method for correcting the power distribution computed by the physical model which refers to the actually measured value of the γ-ray heating value.

The neutron flux $\phi_{k,m,n}$ obtained via the void repetition computation of the equation (8) is corrected with the use of the correction coefficient $BCF_{k,m}$, and then, a correction neutron flux $\phi a_{k,m,n}$ is computed by the following equation (20).

[Mathematical expression 25]

$$\phi a_{k,m,n} = BCF_{k,m} \times GF_{k,m} \cdot \phi_{k,m,n} \quad (20)$$

In this case, $GF_{k,m}$ is previously computed according to a lattice computation in an equation of transformation from the γ-ray heating value into a neutron flux.

In the case of substituting the correction neutron flux $\phi_{k,m,n}$ for the equation (8), it is a matter of course that the above equation (8) is not satisfied. Then, in the following equation (8A) and the equation (8), $(B^2_{i,j,k} + \Delta B^2_{i,j,k}$ is obtained by correcting buckling $B^2_{i,j,k}$ of neutron flux of each energy group and satisfying the equation (8). In this case, $\Delta B^2_{i,j,k}$ is indicative of a correction of buckling $B^2_{i,j,k}$ of neutron flux when the correction neutron flux $\phi a_{i,j,k}$ satisfies the equation (8).

[Mathematical expression 26]

$$\frac{1}{\Delta X^2}\{\phi_{i+1,j,k} + \phi_{i-1,j,k} + \phi_{i,j+1,k} + \phi_{i,j-1,k} - 4\phi_{i,j,k}\} + \frac{1}{\Delta Z^2}\{\phi_{i,j,K+1} + \phi_{i,j,k-1} - 2\phi_{i,j,k}\} + (B^2_{i,j,k} + \Delta B^2_{i,j,k})\phi_{i,j,k} = 0 \quad (8A)$$

In the axial position having no γ-ray heat detector 35, it is possible to obtain the correction neutron flux $\phi a_{k,m,n}$ of the total reactor core axial node, that is, the incore neutron flux distribution the correction neutron flux $\phi_{i,j,k}$ computed with the use of the correction coefficient $BCF_{k,m}$ obtained by interpolating and extrapolating it with a straight line or a quadratic curve in the axial direction. Thus, in the core diametrical direction, it is possible to compute a correction of buckling $\Delta B^2_{i,j,k}$ with respect to all of core axial nodes based on symmetry of the reactor core.

The power distribution computed in the above manner is displayed by means of a display device of the input/output device 60 as shown in FIG. 1.

As described above, in the power distribution computing module 58 including the three-dimensional nuclear thermal-hydraulics computing code as the physical model, in order that the power of each core axial node of four assemblies 4 around the nuclear instrumentation tube 33 is adapt to the node power correction previously computed, the correction is distributed to the peripheral nodes on the basis of the computed result at the same proportional distribution, and then, the corresponding power adjustment factors or first group neutron flux adjustment factors of each of nodes are anticipated, and thus, returned to the power distribution computing module 58 including the three-dimensional nuclear hydrothermal computing code. The three-dimensional nuclear thermal-hydraulics repetition computation and repetition computation of learning correction are carried out, and finally, if the difference between the previous (n−1) node power Pn−1 of each core axial node and the node power Pn of the present (n) computed is smaller than a fixed value, the repetition computation converges. Then, a computation of operation limit value is carried out, and the computation is completed. The flow is shown in FIG. 10.

Figure 7:
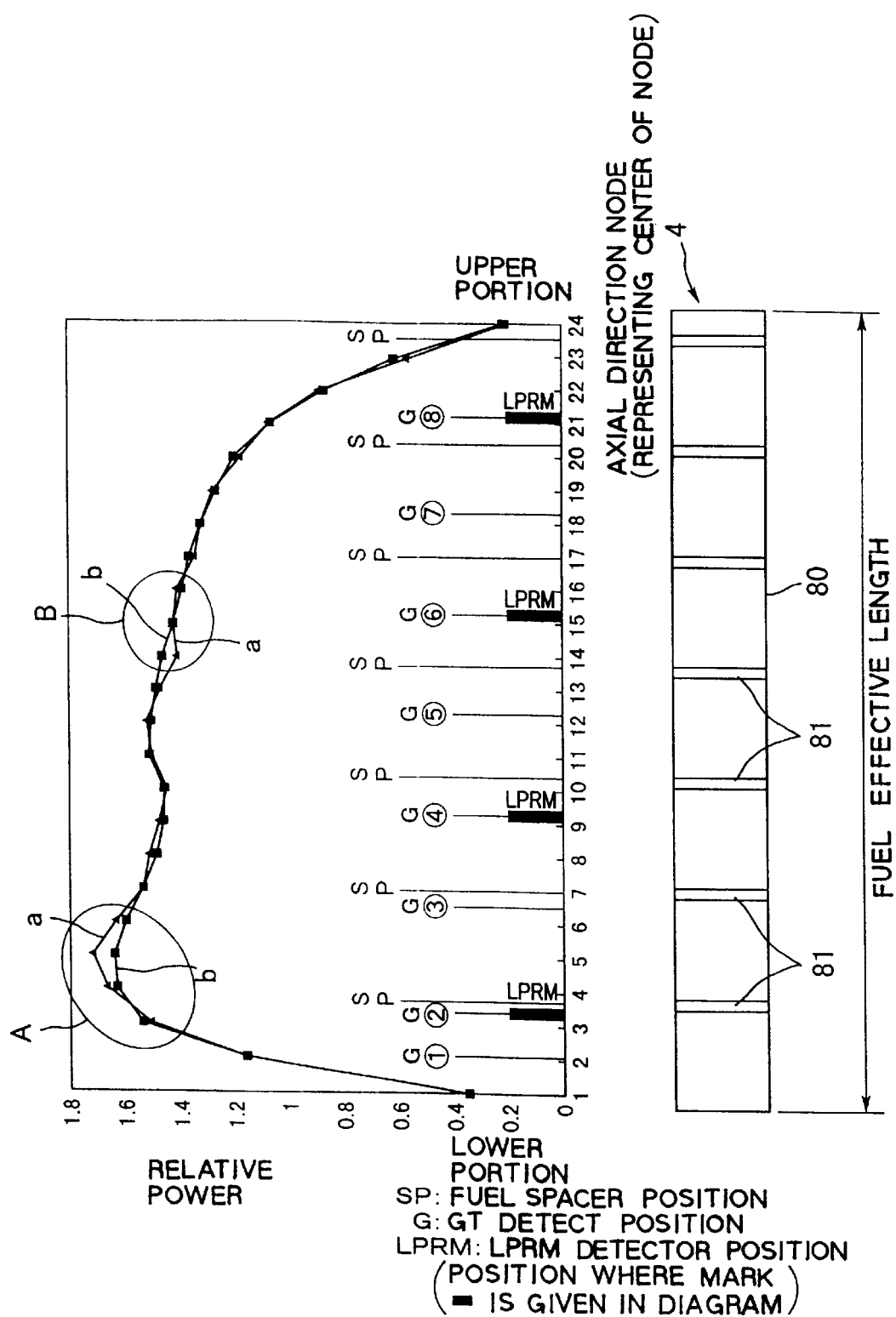
FIG. 7 is a comparative characteristic curve diagram of a core axial direction power distribution of a reactor and is a comparative view of an axial direction power distribution of a fuel assembly showing a learned and correct result obtained by a gamma thermometer in the case of using a three-dimensional nuclear thermal-hydraulics computing code having a spacer model which is employed in one embodiment of the reactor nuclear instrumentation system according to the present invention, and in the case of using a conventional three-dimensional nuclear thermal-hydraulics computing code having no spacer model.

In FIG. 7, a curved line a (shown by a mark ▲) is a power distribution computed result of the fuel assembly 4 in the case of taking a local distortion of neutron flux due to the fuel spacer portion into consideration in the three-dimensional nuclear thermal-hydraulics simulation computing code. A curved line b (shown by a mark ■) is a power distribution computed result of the fuel assembly 4 in the case where a local distortion of neutron flux due to the fuel spacer 81 is not taken into consideration. In FIG. 7, these curved lines a and b shows a corrected result so that a position where the GT signal is obtained is coincident with the GT signal.

Figure 8:
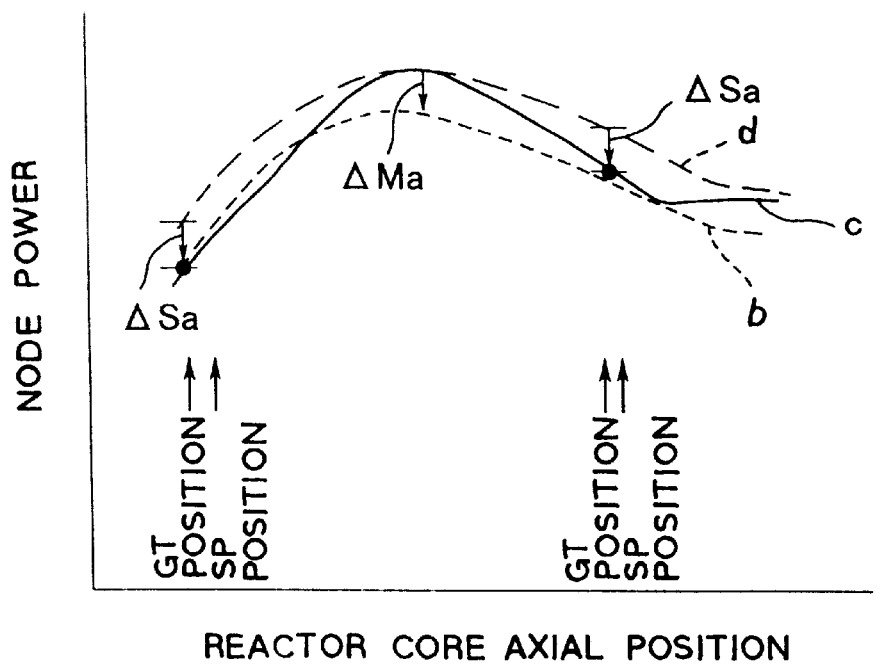
FIG. 8 is a view showing an enlarged portion A of FIG. 7, and a view to explain an excessively correction effect in learning and correcting in the case of having no spacer model.

A portion A of FIG. 7 is enlarged in FIG. 8, and is shown by a broken line b. On the other hand, in FIG. 8, there is shown a true value by a solid curved line c based on measurement point data of the gamma thermometer (GT).

A broken line d of FIG. 8 shows a node power curve before correction. The node power curve d before correction has been computed according to the three-dimensional nuclear thermal-hydraulics computing code which does not take the fuel spacer into consideration. Then, when the node power curve d before correction is corrected on the basis of the GT measurement point data, in the case where there is the output signal of the gamma thermometer (GT) 44 in the node having the fuel spacer SP, the power is corrected to a minus side larger than the case where the neutron flux distortion at the GT position of the node power curve d before correction is not taken into consideration, and then, a power of up and down (vertical) nodes adjacent to the node is corrected to a minus side with the same proportional distribution.

The node power correction is made with the proportional distribution between nodes around the nuclear instrumentation tube, a learning correction ΔS is large. In the case where there is a power peak between GT positions, the node having no fuel spacer SP has no GT measurement data at the peal position although the node power is high, and for this reason, the peak position become an maximum correction ΔMa. Therefore, the node power after correction is shown by the curved line d, and then, there is a problem that the node power peak value is evaluated smaller.

On the other hand, as shown in a portion B of FIG. 7, in the case where there is a measurement data of the gamma thermometer (GT) 44 in the core axial node having no fuel spacer SP and there is no measurement data of the gamma thermometer (GT) 44 in the core axial node having the fuel spacer SP, the learning correction is small, and the power of the node having the fuel spacer SP is excessively evaluated because a local distortion of neutron flux is not taken into consideration.

On the contrary, in the case where the three-dimensional nuclear thermal-hydraulics computing code evaluates an influence on the node power by the fuel spacer SP, like the present invention, as shown by the curved line a of FIG. 7, the power distribution by the fuel spacer SP has a concave and convex portion in the axial direction from first. Therefore, no excessive correction is made even if the correction is interpolated and extrapolated in the axial direction.

Figure 9:
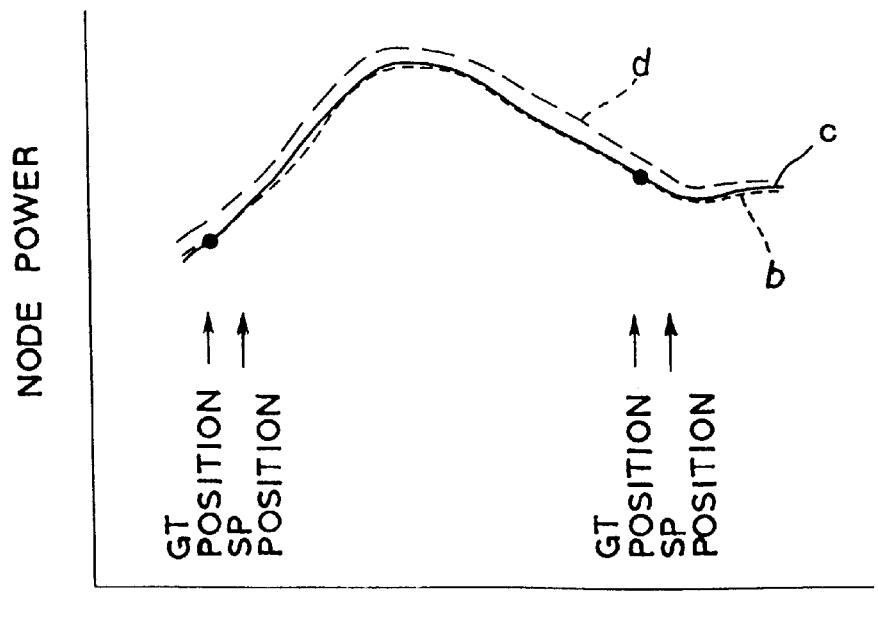
FIG. 9 is a view showing an enlarged portion A of FIG. 7, and a view to explain a learning and correcting effect in the case of having a spacer model.

That is, as shown in FIG. 7, the γ-ray heating value of the GT detector 35 at the nuclear instrumentation tube position is coincident with a node power around the GT detector 35 converted by a correlation relation (in this case, its details are omitted) between a γ-ray heating value and a node power. As seen from the core power distribution learned and computed by the three-dimensional nuclear thermal-hydraulics computing code and from the effect described in FIG. 7 to FIG. 9, in the power distribution computing method of taking the fuel spacer 81 into consideration, it is possible to make a learning correction with high precision on the basis of the measurement data of each GT detector 35 of the less axial GT 44, and it is found that the reactor power distribution can be effectively obtained with high precision.

Next, the following is a description on a reactor nuclear instrumentation system according to a second embodiment of the present invention.

Figure 12:
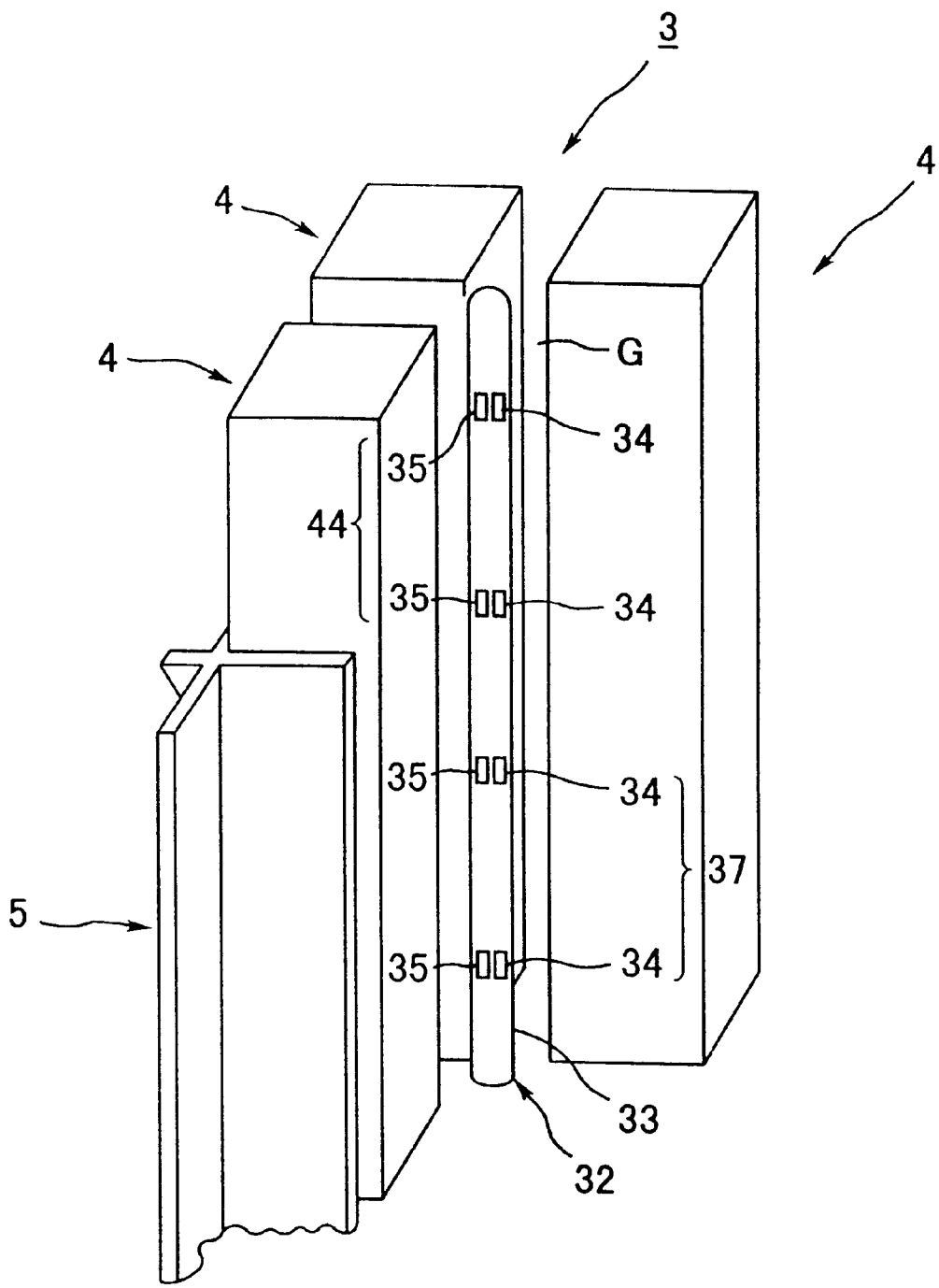
FIG. 12 is a view showing a second embodiment of a reactor nuclear instrumentation system according to the present invention, including a perspective view partly in section showing a detector arrangement of a reactor power distribution measuring device (incore nuclear instrumentation assembly)
Figure 13:
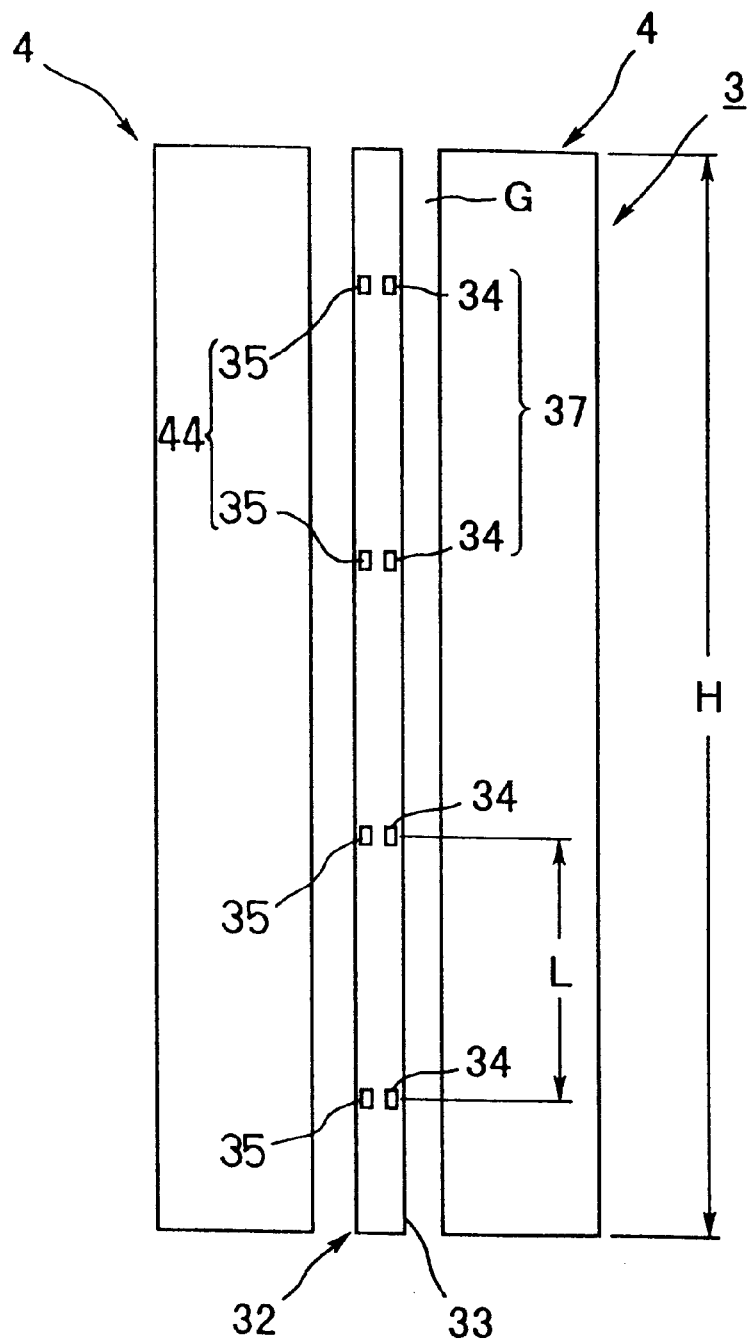
FIG. 13 is a front view partly in section showing a detector arrangement of the reactor power distribution measuring device shown in FIG. 12.

In the reactor nuclear instrumentation system according to this second embodiment, the reactor core 3 is provided with a plurality of incore nuclear instrumentation assemblies 32 which constitute a reactor power detecting device in a core diametrical direction. As shown in FIG. 12 and FIG. 13, the incore nuclear instrumentation assembly 32 includes a nuclear instrumentation tube 33 mounted between four fuel assemblies 4. The nuclear instrumentation tube 33 is provided integrally with a neutron detector assembly 37 which functions as a fixed type LPRM, and a fixed type gamma thermometer 44.

In the neutron detector assembly (LPRM) 37, N (number, integer) fixed type (stationary or immovable) neutron detectors 34 are dispersively arranged at equal intervals in a core axial direction. The fixed type neutron detector 35, for example, four are arranged. On the other hand, in the gamma thermometer 44, a plurality of fixed type γ-ray heat detectors 34, and N γ-ray heat detectors 34, for example, four are arranged in the same axial direction as the fixed type neutron detector 35.

FIG. 12 and FIG. 13 show an arrangement such that the γ-ray heat detectors 35 of the gamma thermometer 44 are dispersively arranged in the same axial direction as the fixed type neutron detector 34 of the N fixed type LPRM 37. In the incore nuclear instrumentation assembly 32, gain adjustment of the neutron flux detector 34 of the fixed type LPRM 37 is directly compared and corrected with the use of a measurement value of the γ-ray heat detectors 35 of the gamma thermometer 44 which are arranged in the same axial direction so as to correspond to a reactor nuclear instrumentation system 30.

The reactor nuclear instrumentation system 30 and the reactor power distribution computing device 31 has the same configuration as the reactor power distribution monitor system shown in FIG. 1, and therefore, the explanation of the overlapping portion is omitted.

In the incore nuclear instrumentation assembly which is a detector of the reactor nuclear instrumentation system shown in FIG. 12 and FIG. 13, the number (N: integer) of γ-ray heat detectors 34 of the gamma thermometer 44 in the core axial direction is the same number (N) as the fixed type neutron detector 34 located in the core axial direction, and is arranged in the same core axial direction.

As shown in FIG. 1, the LPRM detection signal $S_2$ of the fixed type neutron detector (LPRM detector) 34 is processed by means of the power range detector signal processing device 40. The signal processing device 40 includes a pre-amplifier, a high pressure source, a pulse height discrimination circuit, a gain adjuster circuit or the like, and their details are omitted. In the power range detector signal processing device 40, a plurality of LPRM detection signals $S_2$ is made average so as to prepare a power range average output signal (APRM signal). If the APRM signal level exceeds a predetermined value, a trip signal for scramming the reactor is supplied to a logic circuit of a safety guard system. The safety guard system makes a decision whether a state when the plurality of APRM output the trip signal is an operating state required for scramming, according to a predetermined logical decision, and then, scrams the reactor.

The power range neutron detector (LPRM detector) 34 of the reactor core 3 is an ionization chamber type detector, and a fission material (uranium) is applied to an inner surface of an outer wall of the neutron detector 34. A high voltage is applied between the outer wall and the central electrode. In the neutron detector 34, an inert gas Ar is encapsulated as an ionization gas. In the ionization chamber type neutron detector 34, succeeding electron circuits such as an amplifier, a pulse height discriminator filter vary in its characteristic with time, and a so-called drift phenomenon happens. Further, detection sensitivity varies depending upon a change of uranium U-235 applied onto the inner surface of the outer wall of the neutron detector 34. Taking these factors into consideration, the LPRM signal used as the APRM signal need to be used as the APRM signal after being properly corrected.

On the other hand, a measurement signal (mV signal) $S_1$ of a differential type thermocouple 68 constituting the γ-ray heat detectors 35 of the gamma thermometer 44 is converted from an analog signal into a digital signal by means of an A/D converter processor (not shown), and thereafter, is amplified in digital form. For this reason, the output signal $S_1$ of the differential type thermocouple 68 has no change in a heat field, and then, almost no drift phenomenon happens.

In the reactor nuclear instrumentation system, the γ-ray heat detectors 35 of the gamma thermometer 44, that is, a gamma thermometer (GT) detecting portion is located on the same position as the neutron detector 34 of the fixed type LPRM 37. Thus, there is no need of obtaining a signal of the LPRM detector position by moving it like the movable type neutron detector (TIP).

In the reactor nuclear instrumentation system of this second embodiment, a calibration of the signal output of the fixed type neutron detector 34 is directly carried out with the use of the γ-ray heating value computed from the detection signal from the γ-ray heat detector 35 situated at the same level in the axial direction, whereby it becomes possible to make a calibration at a high speed and with high reliability without using the power distribution computing device which is mounted with the three-dimensional nuclear hydrothermal simulation computing code.

In the incore nuclear instrumentation assembly 32, the GT detecting portion signal $S_1$ located at the same position as the LPRM detector 34 is directly and electronically retrieved, and thereby, it is possible to measure a γ-ray heating value by electronic data reading and conversion to γ-ray heating value. Therefore, it is possible to carry out a calibration of the LPRM detector 34 for a very short time (e.g., 5 to 10 minutes), and at one time per day or one time per time.

In this case, when the signal level $S_2$ of the LPRM detector is calibrated as a γ-ray heating value of the gamma thermometer (GT) 44, the LPRM input signal of the APRM is proportional to a local power, and it is possible to provide an excellent local average power which does not depend upon the result computed by the physical model of the three-dimensional nuclear thermal-hydraulics simulation computing code included in the process control computer.

The γ-ray heating value of the gamma thermometer (GT) 44 is substantially proportional to a node average power around the GT, and a local power distribution of the fuel assembly corner fuel rod on the nuclear instrumentation 33 side does not so depend upon the computed result as compared with the case of the LPRM detector 34.

In the case of calibrating the LPRM signal at short intervals, a change in an uranium isotope of the LPRM detector 34 and in a local power distribution of a cross section of the fuel assembly 4 is supposed as zero. Further, the LPRM detection signal level is calibrated to a value approximate to the node average power around the LPRM detector 34. Thus, even if the signal level generated by the LPRM detector 34 contains a weight of the local power of the fuel assembly cross section, when the node power varies, the LPRM signal is proportional to the change, and then, changes. Therefore, as compared with the case of calibrating the LPRM signal via a predictive LPRM signal based on the computed result by the three-dimensional nuclear hydrothermal simulation model as the conventional reactor nuclear instrumentation system, reliability is high, and it is possible to readily calibrate the LPRM detector signal $S_2$ even when the reactor power distribution computing device 31 is temporarily fault or is during maintenance.

In particular, the power range detector processing device 40 is a device constituting the safety guard system, and also, the gamma thermometer signal processing device 48 is composed of a digital circuit which has a simple software and includes a microprocessor having a reliability more than a process computer. Therefore, the present invention has a higher reliability as compared with the case of depending upon the computed result of the reactor power distribution computing device 31 which has a physical model and repeats convergence computation with the use of many stored data.

In the reactor nuclear instrumentation system, the GT 44 is fixed and arranged in the reactor core 3. A part of the GT detectors has the same number as the LPRM detector 34 in the core axial direction and is arranged in the identical core axial direction. Thus, in order to calibrate the LPRM detector 34, the GT detector is a GT measurement system which is composed of the minimum numbers. The three-dimensional nuclear thermal-hydraulics simulation computing code has an efficient accuracy. Even if the GT detector portion is a little in the core axial direction and learning (adaption) data point is a little, if the spacer model is sufficiently taken into consideration in the three-dimensional nuclear thermal-hydraulics simulation, it is possible to dispense the number of the GT detector portion, that is, the number of the located γ-ray heat detectors 35 as the reactor nuclear instrumentation system.

By the reactor nuclear instrumentation system, no mechanical movement as the TIP need to be carried out in order to scan all GT detector 35 of the reactor core 3, so that a γ-ray heating value approximate to the node power in the vicinity of the LPRM detector position can be computed for a very short time (about 5 to 10 minutes). In the case of carrying out a power level adjustment (gain adjustment) of the fixed type neutron detector 34 by a reading value of the γ-ray heat detector 35 having no drift, the adjustment is made without using the core axial power distribution computed result by the process control computer. Thus, it is possible to calibrate a change in sensitivity due to drift of each power range local power detector (LPRM detector) constituting a part of the safety guard system with high reliability.

Therefore, it is possible to dispense the movable neutron flux measuring device or a γ-ray flux measuring device which has been conventionally required for calibrating the LPRM detector. The gamma thermometer 44 is a fixed type, and the number of γ-ray heat detectors 35 is the same as the number of LPRM detectors 34, and thus, the GT measurement system can be composed of the minimum components.

In the reactor nuclear instrumentation system of this second embodiment, the γ-ray heat detectors 35 has the same number as the fixed type neutron detector 34 in the axial direction and is arranged in the identical axial direction. In the case of carrying out a power level adjustment (gain adjustment) of the fixed type neutron detector 34 by a reading value of the γ-ray heat detector 35 having no drift, when the LPRM detector 34 is shifted from the node center axial directional position, the adjustment is made without using axial interpolation and extrapolation by a straight line or a quadratic line of the core axial power distribution computed result by the process control computer. Thus, it is possible to calibrate a change in sensitivity due to drift of each power range local power detector (LPRM detector) constituting a part of the safety guard system with high reliability.

Usually, an ionization chamber type detector is used as the power range neutron detector (LPRM detector) 34 of the reactor core 3, and a fission material (uranium) is applied to an inner surface of an outer wall of the neutron detector 34. A high voltage is applied between the outer wall and the central electrode. In the neutron detector 34, an inert gas Ar is encapsulated as an ionization gas. In the ionization chamber type neutron detector 34, succeeding electron circuits such as an amplifier, a pulse height discriminator filter vary in its characteristic with time, and a so-called drift phenomenon happens. Further, detection sensitivity varies depending upon a change of uranium U-235 applied onto the inner surface of the outer wall of the neutron detector 34. In order to correct a change in neutron detection sensitivity, the change has been conventionally calibrated by means of the TIP device. However, the TIP device requires a mechanical drive mechanism for moving the movable type neutron detector to a core axial direction. On the contrary, in the present second embodiment, the TIP device is unnecessary, and the fixed GT detector 35 is arranged at the same position as the LPRM detector 34. Thus, it is possible to directly obtain a signal at the axial direction position of the LPRM detector 34 without interpolation and extrapolation.

The output signal of the LPRM detector 34 is mainly a detection signal in accordance with a thermal neutron flux in a corner gap of the fuel assembly 4. Thus, the signal level relates not only to the average node power of four fuel assemblies 4 around the node, but also to local power peaking of the corner fuel rod of the fuel assembly on the corner gap side of the nuclear instrumentation tube 33 which strongly contributes to a thermal neutron flux level of the corner gap. The local power peaking varies with the combustion of fuel, and in the case of calibrating the LPRM detector 34 by means of the conventional TIP device, the calibration is carried out at a rate of one time for one month, and correction is made taking a deterioration (change) of the neutron detector 34 into consideration.

The fixed type gamma thermometer (GT) 44 is fixed in the reactor core, no mechanical movement as the TIP need to be carried out in order to scan all GT detector 35 of the reactor core 3 (requiring about one hour to two hours), and thereby, it is possible to measure a γ-ray heating value by electronic data reading and conversion to γ-ray heating value. Therefore, it is possible to carry out a calibration of the LPRM detector 34 for a very short time (e.g., 5 to 10 minutes), and at one time per day or one time per time.

In the case of calibrating the LPRM detector 34, when converting the signal level of the LPRM detector 34 into a γ-ray heating value of the GT 44, an input signal of the safety guard system of the reactor is proportional to a local power, and it is possible to provide an excellent local average power which does not depend upon the result computed by the physical model of the three-dimensional nuclear thermal-hydraulics simulation computing code included in the process control computer. In this case, the γ-ray heating value of the fixed type gamma thermometer (GT) 44 is substantially proportional to a node average power around the GT, and a local power distribution of the fuel assembly corner fuel rod on the nuclear instrumentation 33 side does not so depend upon the computed result as compared with the case of the LPRM detector 34. Thus, it is possible to carry out calibration in proportion to the local power of the fuel assembly 4 around the GT 44 with high precision.

Figure 14:
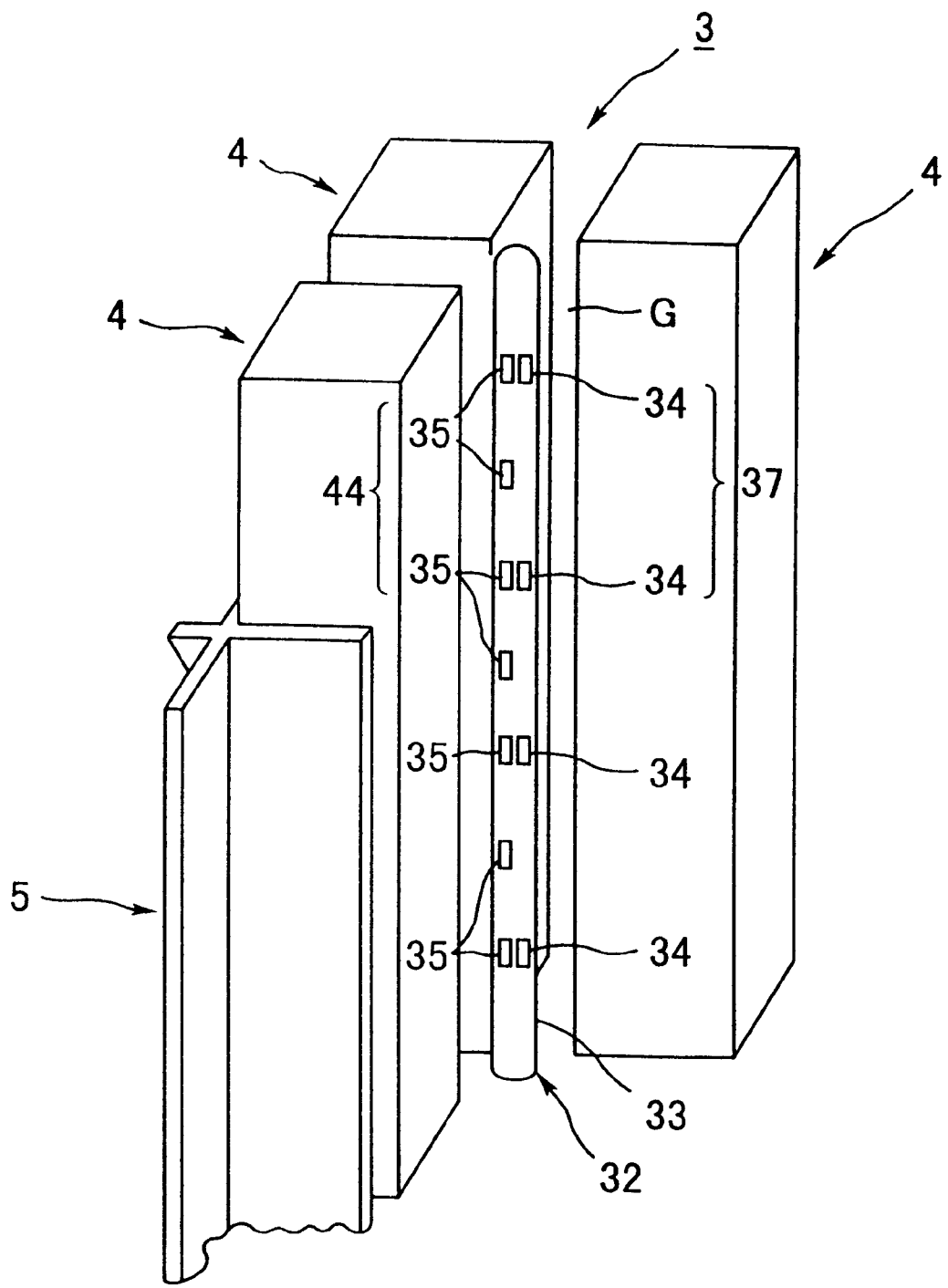
FIG. 14 is a view showing a third embodiment of a reactor nuclear instrumentation system according to the present invention, including a perspective view partly in section showing a detector arrangement of a reactor power distribution measuring device.
Figure 15:
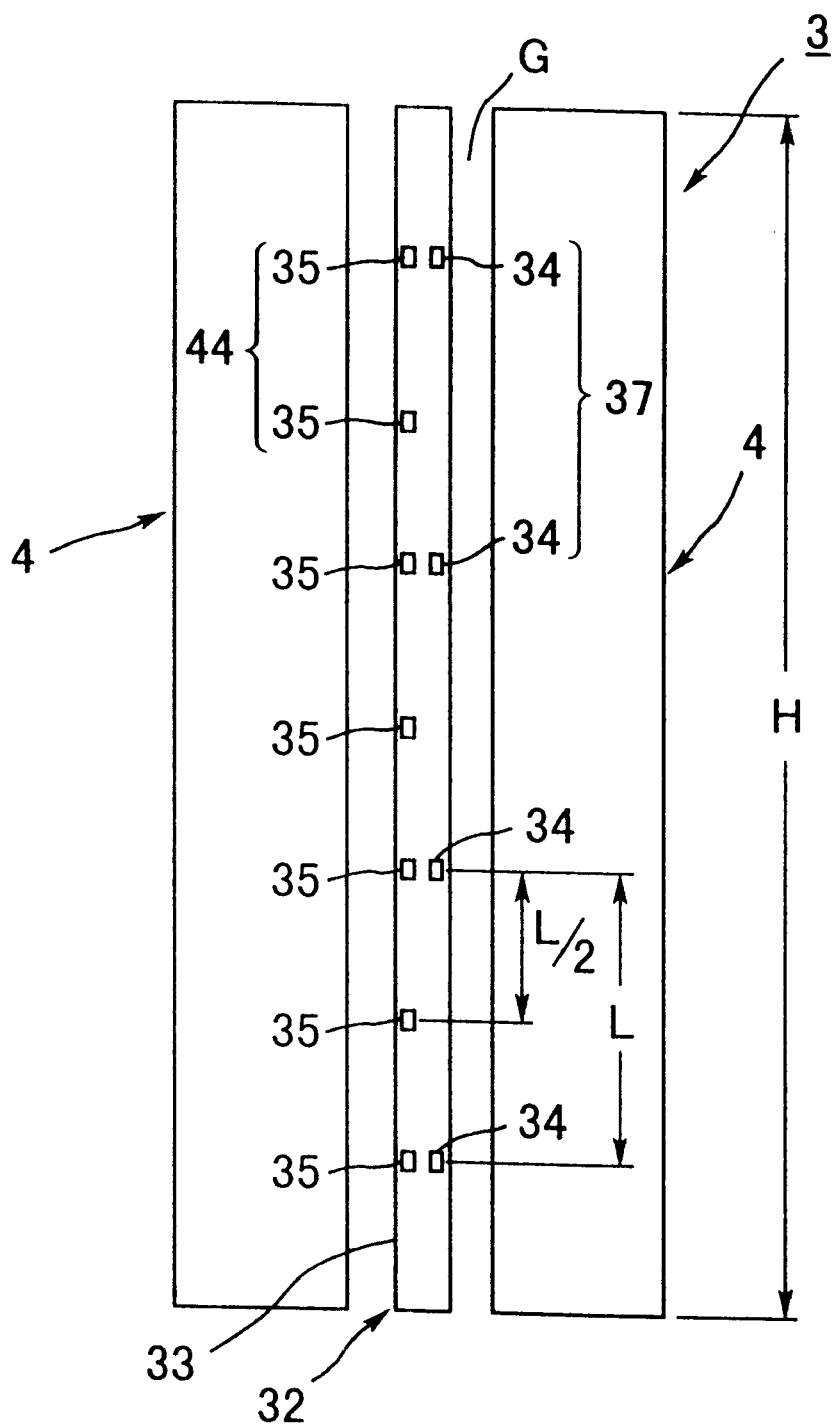
FIG. 15 is a front view partly in section showing a detector arrangement of the reactor power distribution measuring device shown in FIG. 14.

FIG. 14 and FIG. 15 show a reactor nuclear instrumentation system and a reactor power distribution monitor system including the same system according to a third embodiment of the present invention.

The reactor power distribution monitor system of this third embodiment has the same configuration as the reactor power distribution monitor system shown in FIG. 1 and includes a reactor nuclear instrumentation system 30 and a reactor power distribution computing device 31.

The reactor power distribution monitor system of this embodiment relates to an improvement in the incore nuclear instrumentation assembly 32 which functions as a reactor power detecting device constituting the reactor nuclear instrumentation system 30. The incore nuclear instrumentation assembly 32 is composed of a plurality of fixed type neutron detector assemblies (LPRM) 37 and fixed type gamma thermometers 44 which are mounted in the reactor core 3 and is housed in a nuclear instrumentation tube 33.

The fixed type neutron detector assembly (LPRM) 37 is constructed in a manner that N (number, integer) (N≧4) fixed type neutron detectors 34 are dispersively arranged at a predetermined distance L in a core axial direction. On the other hand, the fixed type gamma thermometer 44 is constructed in a manner that (2N−1) fixed type γ-ray heat detectors 35 are arranged in the core axial direction. N (number, integer) detectors of the γ-ray heat detectors 35 are arranged in the same core axial direction as the fixed type neutron detector 34, and the remainder (N−1) are arranged with a distance L/2 at the intermediate position in the core axial direction of the fixed type neutron detector 34.

The reactor nuclear instrumentation system shown in FIG. 14 and FIG. 15 shows the case where a locating number of the fixed type neutron detector 35 constituting the fixed type LPRM 37 is four.

For example, in a boiling water reactor mainly used nowadays, an effective length of a core axial direction is about 146 inches (3708 mm). The reactor core is divided into 8 equal parts, and the LPRM detector 34 and the γ-ray heat detector 35 are arranged. In this case, a distance L/2 of the core axial direction is about 18 inches (457 mm).

In the above manner, the γ-ray heat detector 35 which is a GT detector portion, is arranged at equal intervals L/2, and the γ-ray heat detectors 35 covers a lower end to an upper end of the effective length of the core axial direction, whereby it becomes possible to secure a computing precision of the three-dimensional nuclear thermal-hydraulics simulation computing code by making a learning correction over the whole core axial direction. Therefore, it is possible to finely make a learning correction in the core axial direction as compared with the case of the above second embodiment, so that a computing precision of the three-dimensional nuclear thermal-hydraulics simulation computing code can be secured.

In the reactor nuclear instrumentation system of this third embodiment, the fixed type γ-ray heat detector 35 has the same number as the fixed type neutron detector 34, and is arranged in the same axial direction as the fixed type neutron detector 34. Further, (N–1) fixed type γ-ray heat detector 35 is arranged at the intermediate position of the N fixed type neutron detector 34, and thereby, many γ-ray heat detectors 35 are arranged in the core axial direction so as to obtain the GT detector signal. Therefore, it is possible to improve an axial power distribution measurement precision as compared with the reactor nuclear instrumentation system shown in the second embodiment.

Figure 16:
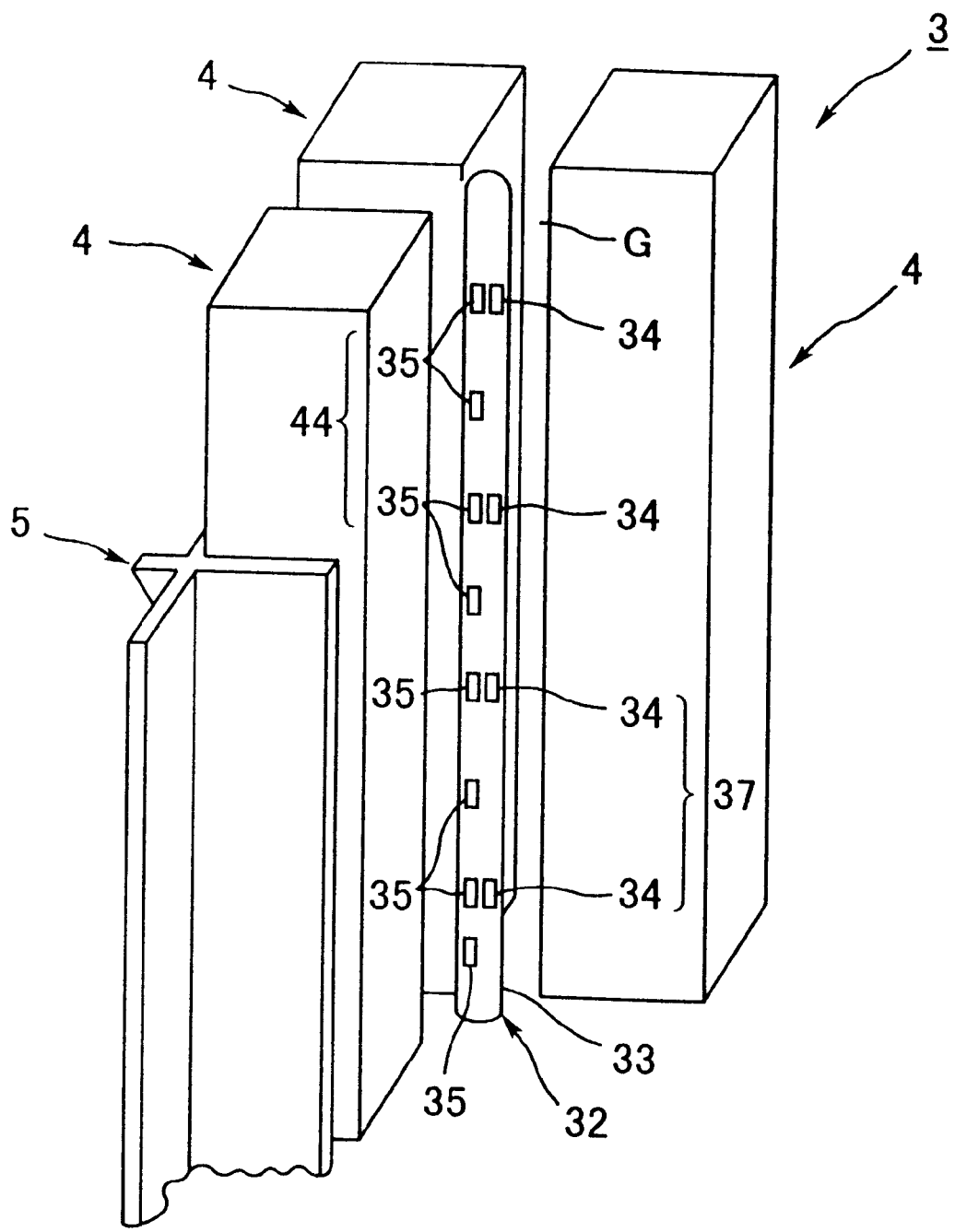
FIG. 16 is a view showing a fourth embodiment of a reactor nuclear instrumentation system according to the present invention, including a perspective view partly in section showing a detector arrangement of a reactor power distribution measuring device.
Figure 17:
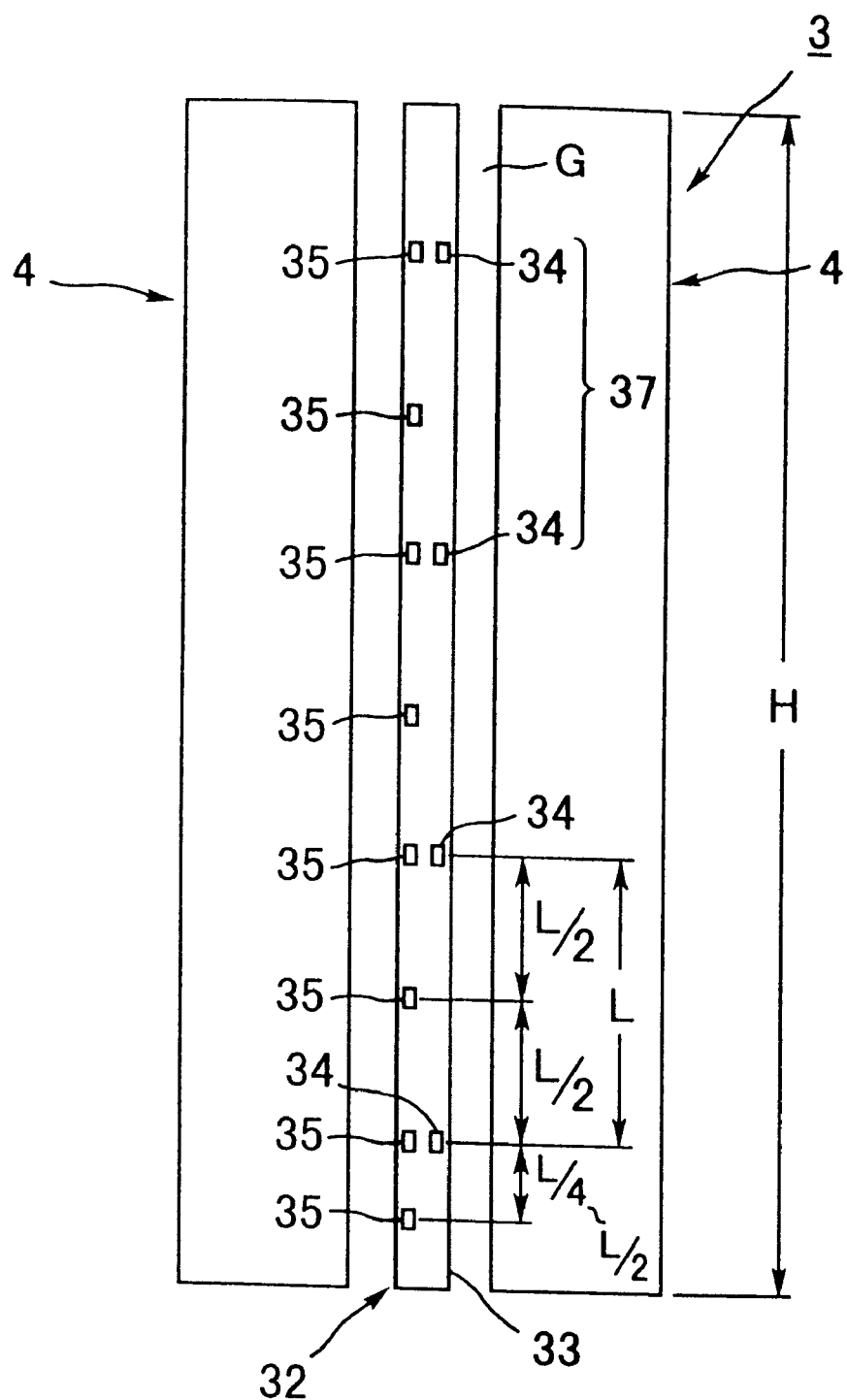
FIG. 17 is a front view partly in section showing a detector arrangement of the reactor power distribution measuring device shown in FIG. 16.

FIG. 16 and FIG. 17 show a reactor power distribution monitor system according to a fourth embodiment of the present invention.

The reactor power distribution monitor system of this fourth embodiment has the same configuration as the reactor power distribution monitor system shown in FIG. 1 and includes a reactor nuclear instrumentation system 30 and a reactor power distribution computing device 31.

The reactor power distribution monitor system relates to an improvement in the incore nuclear instrumentation assembly 32 which functions as a reactor power detecting device constituting the reactor nuclear instrumentation system 30. In the incore nuclear instrumentation assembly 32, a fixed type neutron detector assemblies (LPRM) 37 and a fixed type gamma thermometers 44 are housed in a nuclear instrumentation tube 33, and are formed into a rod-like structure.

The neutron detector assembly 32 is constructed in a manner that N (N≧4) fixed type neutron detectors (LPRM detector) 34 are dispersively arranged at a predetermined distance L in a core axial direction. On the other hand, the fixed type gamma thermometer 44 is constructed in a manner that N detector of 2N fixed type γ-ray heat detectors 35 are arranged in the core axial direction. N detectors of the γ-ray heat detectors 35 are arranged in the same core axial direction as the fixed type neutron detector 34, and the remainder (N–1) are arranged with a distance L/2 at the intermediate position in the core axial direction of the fixed type neutron detector 34. The last one of detectors is arranged at a position separating from a distance L/2 to L/4 below the lowest position of the fixed type neutron detector 34. The lowest γ-ray heat detectors 35 is arranged in the fuel effective length in the core axial direction.

The reactor nuclear instrumentation system shown in FIG. 16 and FIG. 17 shows the case where a locating number of the fixed type neutron detector 35 constituting the fixed type LPRM 37 is four. In a boiling water type reactor (BWR) mainly used nowadays, the reactor core 3 is divided into 8 equal parts, and the LPRM detector 34 and the γ-ray heat detector 35 are arranged. In this case, a distance L/2 of the core axial direction is about 18 inches (457 mm).

According to the correction first group three-dimensional nuclear thermal-hydraulics simulation computing code in the process control computer using a diffusion equation, a computing precision of the nodes on the uppermost and lower ends in the core axial direction is liable to become worse due to an influence by neutron leakage. For this reason, in the core lower end side, computation must be carried out with high precision even if there is the possibility of an error of computation. However, in the BWR, a void is not so generated in the core lower end side, and the reactor power is easy to become high in its characteristic. Therefore, in the core lower portion, the fixed type γ-ray heat detector 35 is actually interpolated rather than by extrapolating the difference between the GT measurement signal and the detection signal, and therefore, excellent learning is carried out with high precision. Thus, as described in this fourth embodiment, it is preferable that in the core lower end side, the fixed type γ-ray heat detector 35 is arranged further below the lowest neutron detector 34 in a range from L/4 to L/2.

The position where the fixed type γ-ray heat detector 35 is located on the lowest end, that is, a distance below the fixed type neutron detector 34, is natural uranium blanket range per up and down (vertical) nodes (occasionally, 2 nodes on the upper end side) in a design of an axial direction of the latest BWR fuel assembly. Thus, the reactor power on upper and lower ends is low, and there is no need of measuring the upper and lower ends in its precision. For this reason, it is preferable that the axial center of the fixed type γ-ray heat detector (GT detector) 35 is set above 1 node (about 15 cm) or more from the lower end of the fuel effective length.

Moreover, it is found that the GT detector 35 responses an average power in a vertical range of 15 cm in the core axial direction. In the case where the locating number N of the fixed type γ-ray heat detectors 35 is N=4, it is preferable that the lowest GT detector 35 is located at the intermediate point L/4 (about 9 inches) between the lowest neutron detector 34 and the lower end of the fuel effective length.

If the GT detector 35 is located within 15 cm from the lower end of the fuel effective length in the axial direction, a correlation equation between the GT detector and the node power around the GT as GT reading value must be prepared, or the following matter must be accepted. That is, a slightly measurement error is caused between the computation result of the GT reading value and the GT measurement signal from the lowest GT detector 35.

In the reactor nuclear instrumentation system of this fourth embodiment, in addition to an axial arrangement of the γ-ray heat detector 35 of the reactor nuclear instrumentation system of the third embodiment, the γ-ray heat detector 35 is arranged below the lowest neutron detector 34. Thus, the fixed type γ-ray heat detectors 35 is arranged so as to substantially equally cover the fuel effective length, so that the extrapolation can be reduced. Therefore, it is possible to compute a node power in the vicinity of the lower end higher than the upper end of the fuel effective length from the measurement result of the reactor core power distribution with high precision.

Figure 18:
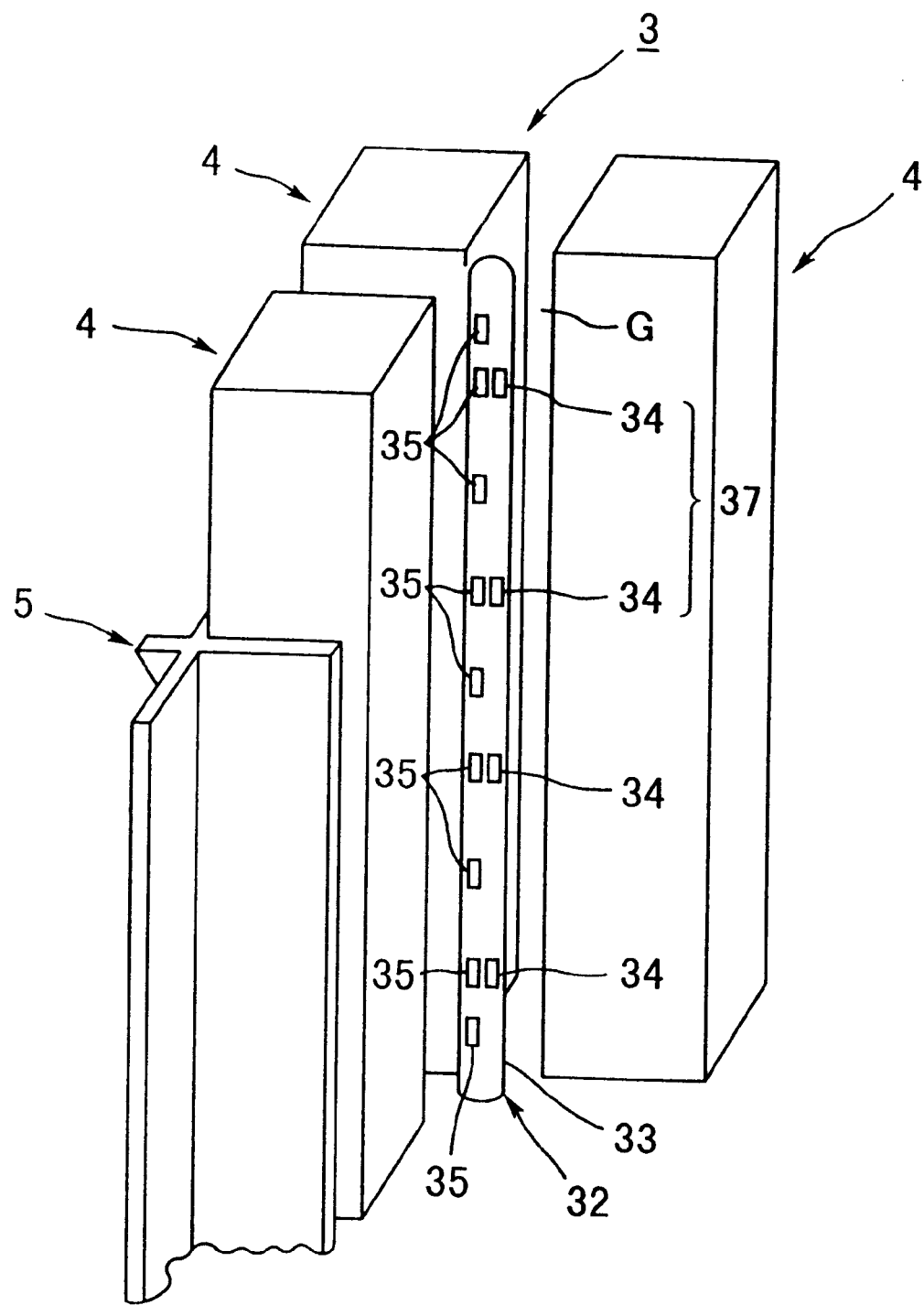
FIG. 18 is a view showing a fifth embodiment of a reactor nuclear instrumentation system according to the present invention, and a perspective view partly in section showing a detector arrangement of a reactor power distribution measuring device.
Figure 19:
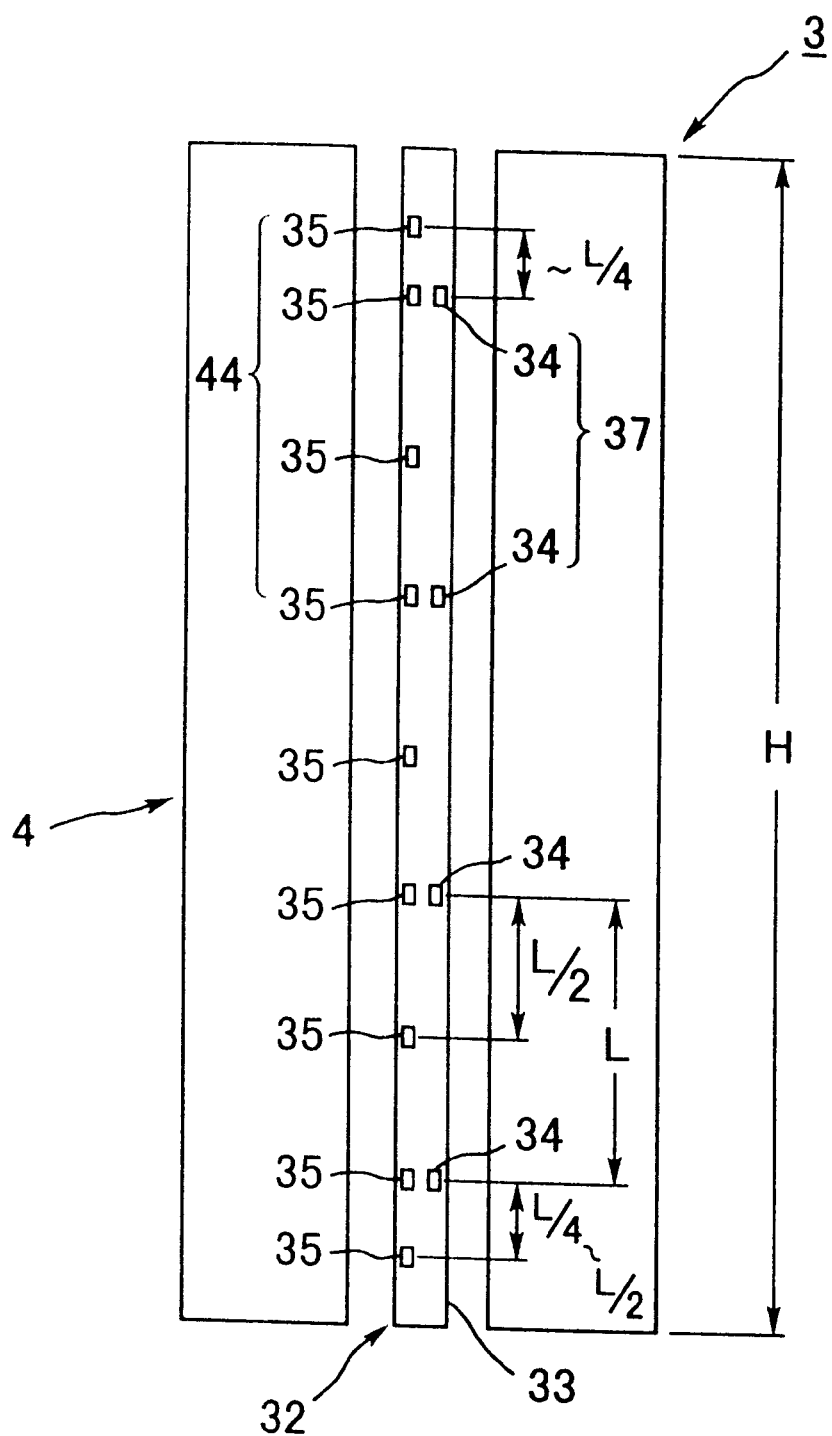
FIG. 19 is a front view partly in section showing a detector arrangement of the reactor power distribution measuring device shown in FIG. 18.

FIG. 18 and FIG. 19 show a reactor power distribution monitor system according to a fifth embodiment of the present invention.

The reactor power distribution monitor system of this fifth embodiment has the same configuration as the reactor power distribution monitor system shown in FIG. 1, and includes a reactor nuclear instrumentation system 30 and a reactor power distribution computing device 31.

The reactor power distribution monitor system relates to an improvement in the incore nuclear instrumentation assembly 32 which functions as a reactor power detecting device constituting the reactor nuclear instrumentation system 30. In the incore nuclear instrumentation assembly 32 is formed into a long rod-shaped structure, and a fixed type neutron detector assemblies (LPRM) 37 and a fixed type gamma thermometers 44 are integrally housed in a nuclear instrumentation tube 33.

The fixed type neutron detector assembly (LPRM) 37 is constructed in a manner that N (N≧4) fixed type neutron detectors (LPRM detector) 34 are dispersively arranged at a predetermined distance L in a core axial direction of the nuclear instrumentation tube 33. On the other hand, the fixed type gamma thermometer 44 is constructed in a manner that (2N+1) fixed type γ-ray heat detectors 35 are arranged in the core axial direction. N detectors of the (2N+1) γ-ray heat detectors 35 are arranged in the same core axial direction as the fixed type neutron detector 34, and the remainder (N−1) are arranged at the axial intermediate position. Further, the remainder, that is, two detectors are arranged below and above the lowest and uppermost fixed type neutron detectors 34. The lowest fixed type γ-ray heat detector 35 is arranged below a distance L/4 to L/2 from the lowest neutron detector 34 in the fuel effective length of the core axial direction, and on the other hand, the uppermost fixed type γ-ray heat detector 35 is arranged above a predetermined distance, that is, a distance L/4 from the uppermost neutron detector 34 in the fuel effective length of the core axial direction.

The reactor nuclear instrumentation system shown in FIG. 18 and FIG. 19 shows the case where the locating number N of the fixed type neutron detector 34 is four. In this case, a distance L/2 of the reactor core axial direction is about 18 inches (457 mm), for example. In the reactor nuclear instrumentation system, further, one fixed type γ-ray heat detectors 35 is added to the case where the locating number 2N of the fixed type γ-ray heat detectors 35 in the reactor nuclear instrumentation system of the fourth embodiment. The added fixed type γ-ray heat detector 35 is arranged at a position further above the lowest fixed type neutron detector 34 in the axial direction within the fuel effective length.

As described above, the fixed type γ-ray heat detectors 35 is arranged at a position further above the lowest fixed type neutron detector 34 in the axial direction within the fuel effective length, and thus, it is possible to reduce an extrapolation of an error between the core axial power distribution measurement value and the computed value by the simulation (process control computer) in the vicinity of the uppermost end of the fuel effective length, so that a precision of the axial power distribution on the upper end portion of the reactor core can be improved. In the conventional neutron detector which measures a thermal neutron flux, the upper end of the nuclear instrumentation tube 33 has a plunger structure which is inserted into a hole portion formed on the lower surface of the upper lattice plate. The plunger structure is different from most of parts of the nuclear instrumentation tube 33 of the reactor core. For this reason, in the γ-ray heat detector 35, a γ-ray transmission is great although having thermal neutron distortion and is hard to be affected by a structure of the nuclear instrumentation tube. Therefore, the γ-ray heat detectors 35 is arranged at a position further above the lowest fixed type neutron detector 34 in the axial direction within the fuel effective length, and thereby, it is possible to preferably measure the core axial power distribution in detail and to improve a learning precision of the three-dimensional nuclear thermal-hydraulics simulator in the process control computer.

Furthermore, it is preferable that the position for locating the uppermost γ-ray heat detectors 35 is below 15 cm or more from the upper end of the fuel effective length on the basis of the same reason as mentioned above.

In the reactor nuclear instrumentation system of this embodiment, in addition to the axial arrangement of the γ-ray heat detectors 35 of the reactor nuclear instrumentation system of the third embodiment, the γ-ray heat detectors 35 is arranged above the uppermost fixed type neutron detector 34 and below the lowest fixed type neutron detector 34. Thus, the fixed type γ-ray heat detectors 35 is arranged so as to substantially equally cover the fuel effective length, so that the extrapolation can be reduced. Therefore, it is possible to compute a node power in the vicinity of the lower end higher than the upper end of the fuel effective length from the measurement result of the reactor core power distribution with high precision.

Figure 20:
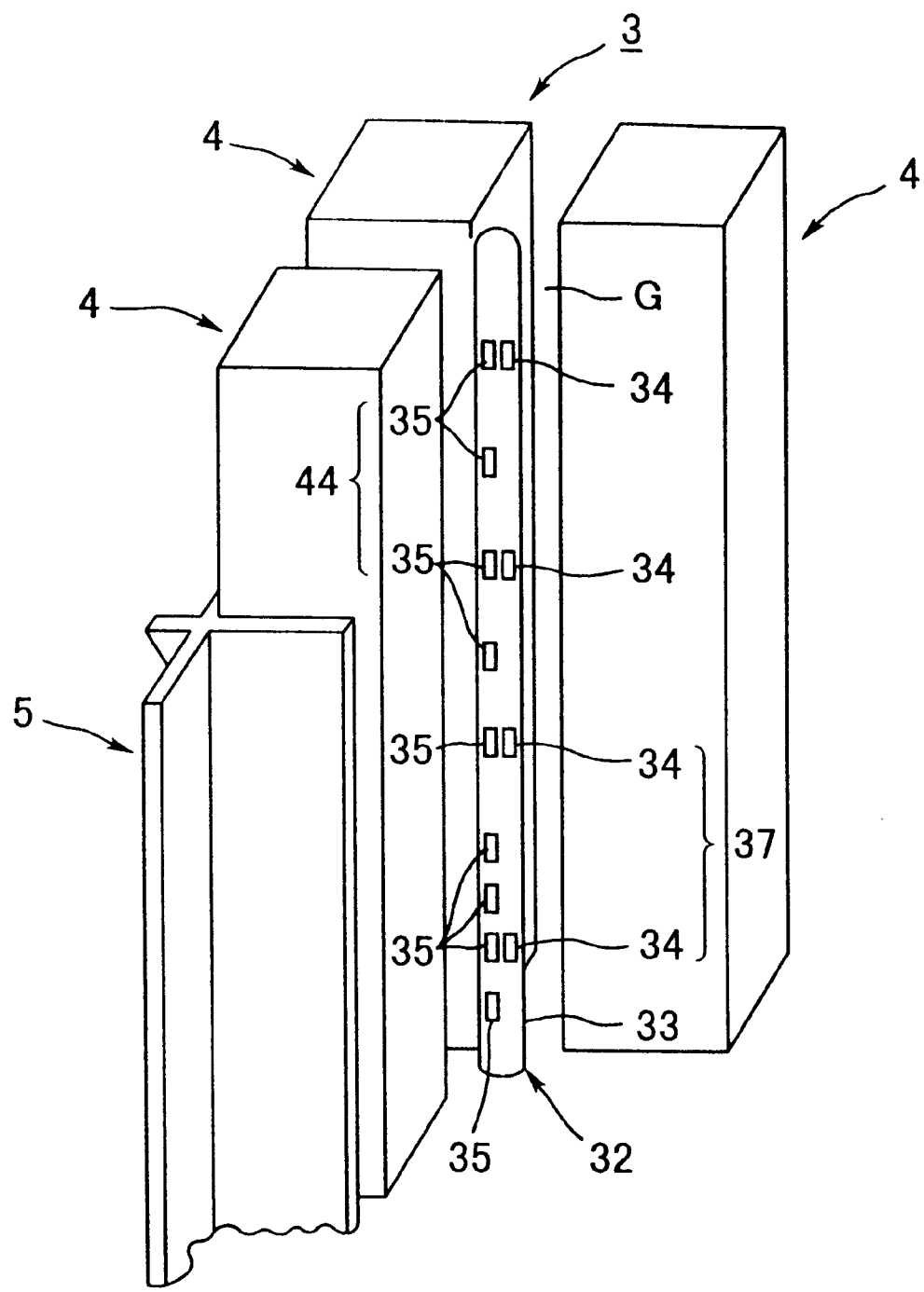
FIG. 20 is a view showing a sixth embodiment of a reactor nuclear instrumentation system according to the present invention, which is a perspective view partly in section showing a detector arrangement of a reactor power distribution measuring device.
Figure 21:
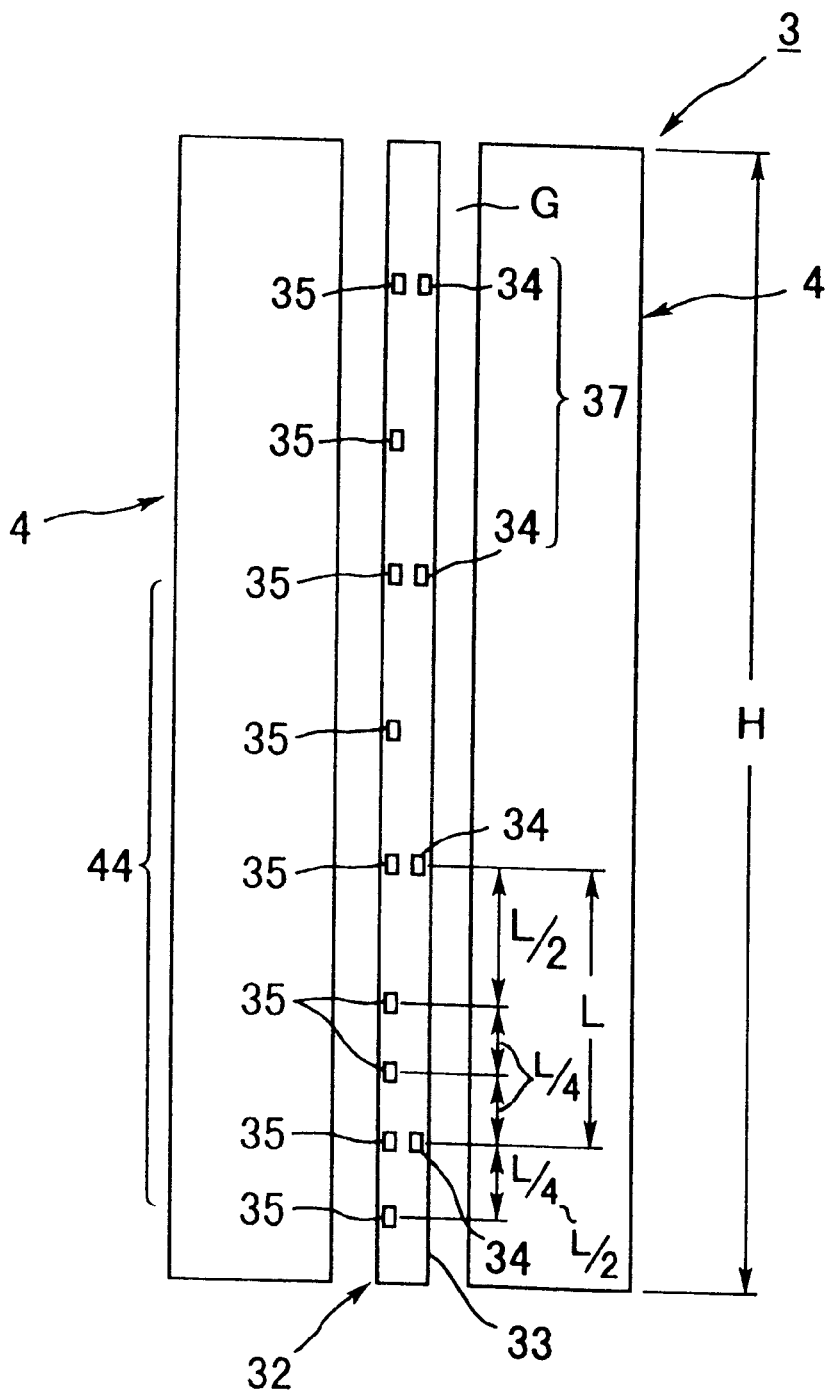
FIG. 21 is a front view partly in section showing a detector arrangement of the reactor power distribution measuring device shown in FIG. 20.

FIG. 20 and FIG. 21 show a reactor power distribution monitor system according to a sixth embodiment of the present invention.

The reactor power distribution monitor system of this sixth embodiment has the same configuration as the reactor power distribution monitor system shown in FIG. 1, and includes a reactor nuclear instrumentation system 30 and a reactor power distribution computing device 31.

The reactor power distribution monitor system relates to an improvement in the incore nuclear instrumentation assembly 32 which functions as a reactor power detecting device constituting the reactor nuclear instrumentation system 30. In the incore nuclear instrumentation assembly 32 is formed into a rod-shaped structure, and a fixed type neutron detector assemblies (LPRM) 37 and a fixed type gamma thermometers 44 are integrally housed in a nuclear instrumentation tube 33.

In the incore nuclear instrumentation assembly 32 constituting the reactor nuclear instrumentation system 30, the fixed type γ-ray heat detector (GT detector) 35, which is arranged above the lowest fixed type neutron detector 34 at a distance L/4, is added to the incore nuclear instrumentation assembly of the third to fifth embodiments. In this case, the distance L is an interval in the axial direction of the fixed type neutron detector 34. FIG. 20 and FIG. 21 show the case where the locating number N of the fixed type neutron detector 34 is four.

In a boiling water type reactor (BWR), it is general that the core has an effective length of 144 or 146 inches in a core axial direction. In the case, of dividing the core axial direction length into 24 node equal parts, a node, in which the maximum linear heat generation ratio is easy to be generated during an operation in the axial power distribution of the fuel assembly 4, is 4 nodes to 6 nodes from the bottom. In particular, in the first half of reactor operating cycle, a lower power peak operation is allowed within a range of operating limit value of the maximum linear heat generation ratio as much as possible, and in the end of operating cycle, the core axial or upper peak power distribution is made. In a core reaction effective operating method (BSO operation), the maximum linear heat generation ration is easy to be generated in the 4 nodes to 6 nodes from the bottom at the initial period to the intermediate period of operating cycle. In order to precisely evaluate a degree of freedom with respect to the maximum linear heat generation ration, the γ-ray heat detectors 35 is arranged in the vicinity of the node, and thereby, it is possible to make a learning correction on the basis of the measurement value at the vicinity of the maximum peak portion of the core axial power distribution, and to improve measurement precision.

In the reactor nuclear instrumentation system of this sixth embodiment, a plurality of fixed type γ-ray heat detectors 35 in the incore nuclear instrumentation assembly 32 are additionally arranged above the lowest fixed type neutron detector 34 at a distance L/4, in addition to the locating position of the fixed type γ-ray heat detectors 35 included in the reactor nuclear instrumentation system shown in the third to fifth embodiments. The position where the added fixed type γ-ray heat detector 35 is arranged is a position where the maximum peaking is easy to be generated in the core axial direction in the latest high burnup (combustion) 8×8 fuel or high burnup 9×9 fuel core. Therefore, it is possible to precisely monitor a power distribution at a core position where the maximum linear heat generation ratio is easy to be generated and to improve a measurement precision. In particular, in the fixed type gamma thermometer 44, in the case where the locating number of the gamma ray heat detector in the core axial direction is limited in a mechanical design, it is possible to improve a precision in the limited number, thus being optimal.

Next, the following is a description on a reactor power distribution monitor system according to a seventh embodiment of the present invention.

The reactor power distribution monitor system of this seventh embodiment relates to improvement of an arrangement of a fixed type neutron detector and a fixed type γ-ray heat detector in the incore nuclear instrumentation assembly 32 constituting the reactor nuclear instrumentation system. The reactor power distribution monitor system has the same configuration as the reactor power distribution monitor system shown in FIG. 1 and its details are omitted herein.

The reactor power distribution monitor system has the same configuration as that of each former embodiment, that is, the fixed type neutron detector assembly (LPRM) 37 and the fixed type gamma thermometer 44 are integrally housed in the incore nuclear instrumentation assembly 32 constituting the reactor nuclear instrumentation system. The core axial position of the fixed type neutron detector 35 of the neutron detector assembly (LPRM) 37 is coincident with the center of the nodes divided in the fuel axial direction, which is used in the reactor power distribution computing device 31, and further, the core axial position of the γ-ray heat detector 35 is also coincident with the center of node.

In the reactor nuclear instrumentation system of this seventh embodiment, in the case where the power distribution computing device 31 computes a response of the γ-ray heat detector, a consideration is taken such that a range of gamma ray is longer a thermal neutron. Further, by taking not only the axial node having the γ-ray heat detector 35 but also contribution by a γ-ray heating value of up and down nodes adjacent to each other into consideration, it is possible to improve a precision of power distribution by the minimum computation.

A γ-ray generated by a fission reaction has a range longer than a thermal neutron, and for this reason, the γ-ray heat detector 35 need to be arranged in a fuel effective length of the core axial direction and at a position separating from the fuel effective end with 15 cm in the core axial direction.

Figure 22:
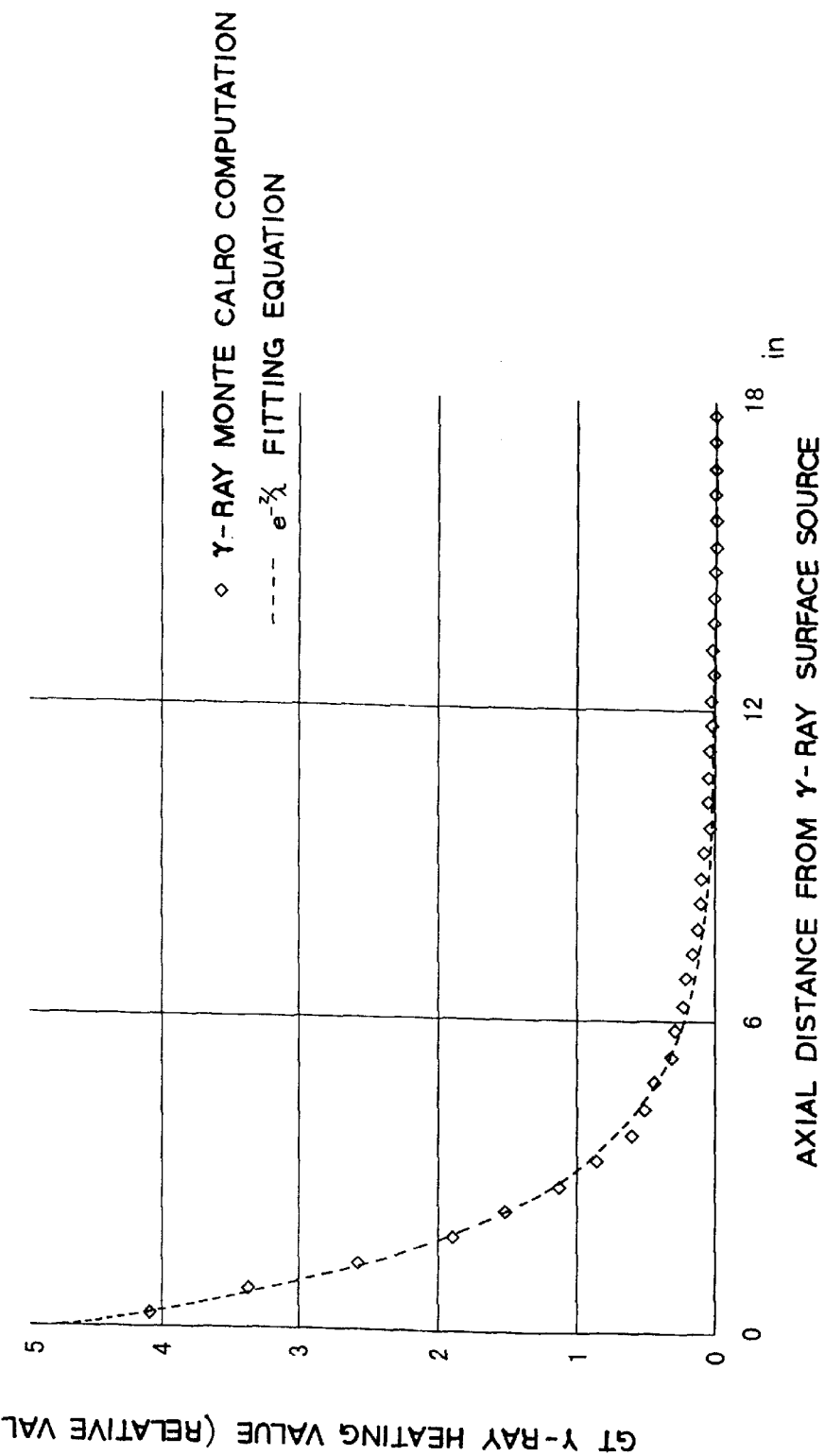
FIG. 22 is a view to explain a distance effect from a γ-ray surface source of γ-ray heat to the gamma thermometer assembly (GT) included in the reactor nuclear instrumentation system according to the present invention.

Referring now to FIG. 22, FIG. 22 is a chart showing a distribution of detected sensitivity in the case where the origin takes a surface γ-ray source (γ-ray surface source) which distributes in the fuel cross section, and a γ-ray heat detector is located in an axial direction (X-axis) of the nuclear instrumentation tube 33. As seen from the detected sensitivity distribution result, the γ-ray heating value is reduced in accordance with an axial distance from the γ-ray surface source. However, the γ-ray heat contributes to the fixed type gamma thermometer (GT) 44 by 6 inches (15 cm) or more in the axial distance, and for this reason, in order to improve a computation precision of the GT 44 reading value, there is a need of taking a power distribution within 23 cm in axial distance into consideration. Therefore, in the case where there is a difference in power between the node having the γ-ray heat detector 35 and the adjacent axial nodes, it is found that an influence is given to a reading value of the γ-ray heat detector 35. Taking a change in the core axial power distribution into consideration, a γ-ray heating value is integrated in the core axial direction as the following equation (21), and then, is obtained therefrom.

[Mathematical expression 27]

$$W(z) = \int_0^{Zmax} dz' R(z') P(z') \frac{e^{-|z-z'|/\lambda}}{2\lambda} \quad (21)$$

where,
W(z): γ-ray heating value at a z position in an axial direction
P(z): node core power density
R(z): correlation equation from power density to γ-ray heating value
λ: γ-ray transport mean free path of core axial direction (obtained by gamma ray Monte Calro computation as shown in FIG. 22)

In this case, a computation of an actual γ-ray heating value to the fixed type gamma thermometer (GT) 44 is carried out by a fuel assembly nuclear characteristic computing code and a γ-ray transport computation. The γ-ray heating value is computed by supposing a uniform γ-ray source distribution in the core axial direction, that is, a uniform axial power distribution, and based on this, when the above equation (21) is again defined, the γ-ray heating value is expressed by the following equation (22).

[Mathematical expression 28]

$$W(z) = R^*(z)P(z) + \int_0^{Zmax} dz' R(z')(P(z') - P(z)) \frac{e^{-|z-z'|/\lambda}}{2\lambda} \quad (22)$$

$$R^*(z) = \int_0^{zmax} dz' R(z') \frac{e^{-|z-z'|/\lambda}}{2\lambda}$$

As seen from FIG. 22, the γ-ray heating value may disregard the contribution from about 23 cm or more in the core axial direction. In a general BWR, the reactor core 3 is divided into, for example, 24 nodes, and one node is substantially 6 inches (15 cm). Thus, in order to detect a γ-ray heating value, it is sufficient to considering nodes directly adjacent to each other and adjacent nodes far from one adjacent node.

Figure 23:
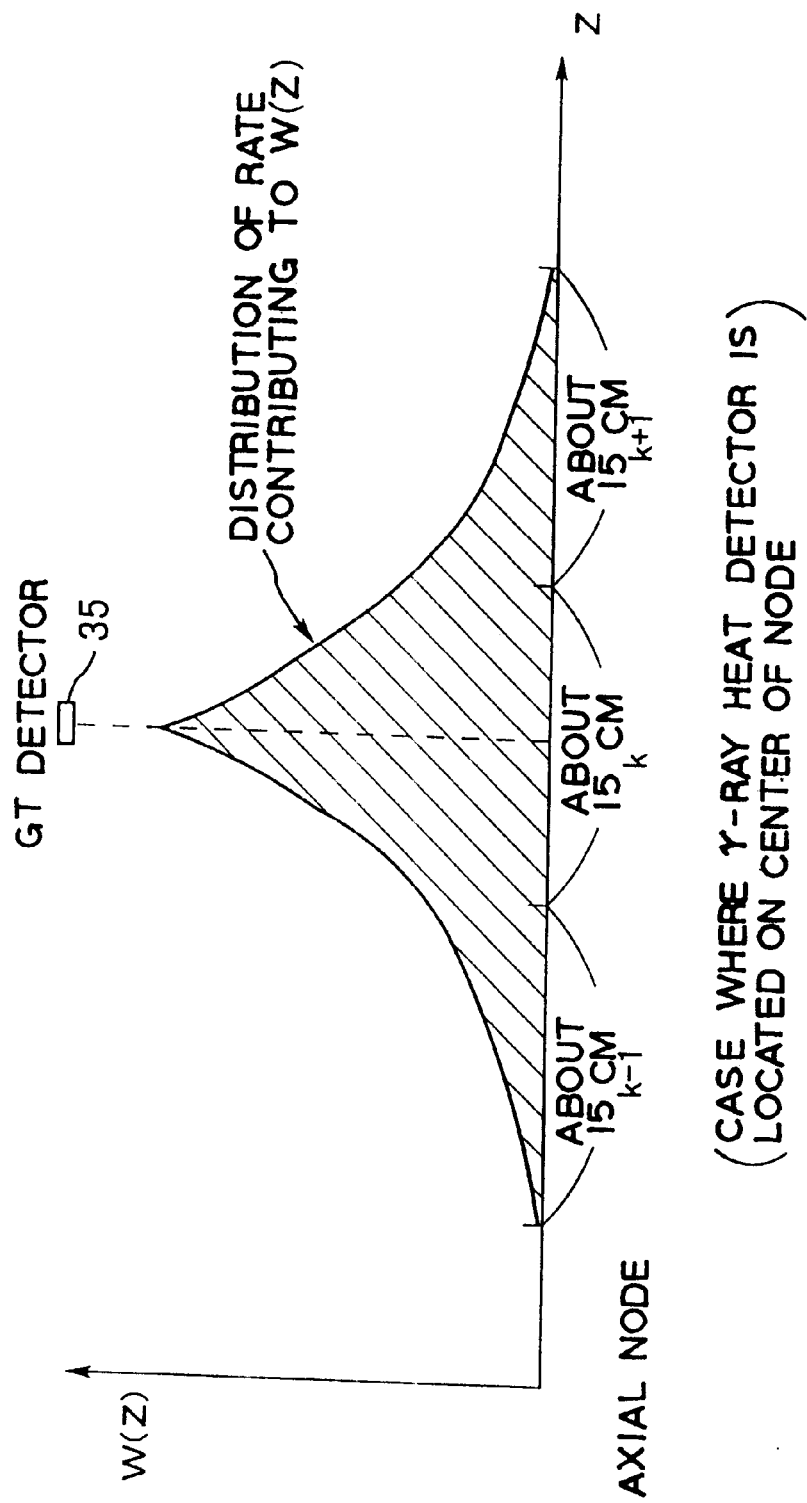
FIG. 23 is a view to explain a contribution ratio of γ-ray heating value (node power) from adjacent node in the case where a γ-ray heat detector (GT detector) of the gamma thermometer assembly is located on the center of node.

If the fixed type γ-ray heat detector 35 is situated at the center of the axial node of the reactor core 3, as shown in FIG. 23, the axial node having the γ-ray heat detector 35 of the GT sensor portion and upper and lower (vertical) nodes adjacent to each other merely be taken into consideration, and an integration range is made to have the same length, and thus, a relative equation becomes simple. The above equation (17) is an example of this case.

Figure 24:
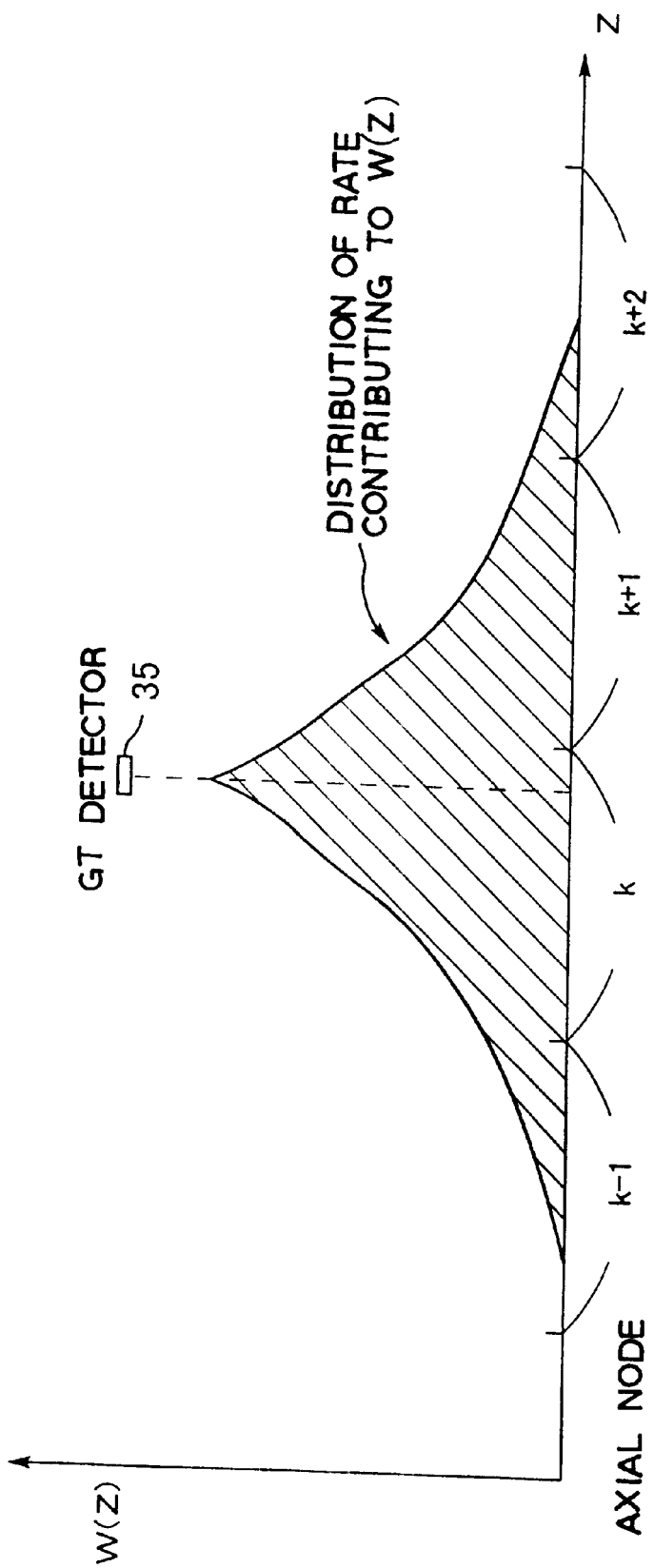
FIG. 24 is a view to explain a contribution ratio of γ-ray heating value (node power) from adjacent node in the case where a γ-ray heat detector of the gamma thermometer assembly is not located on the center of node.
Figure 25:
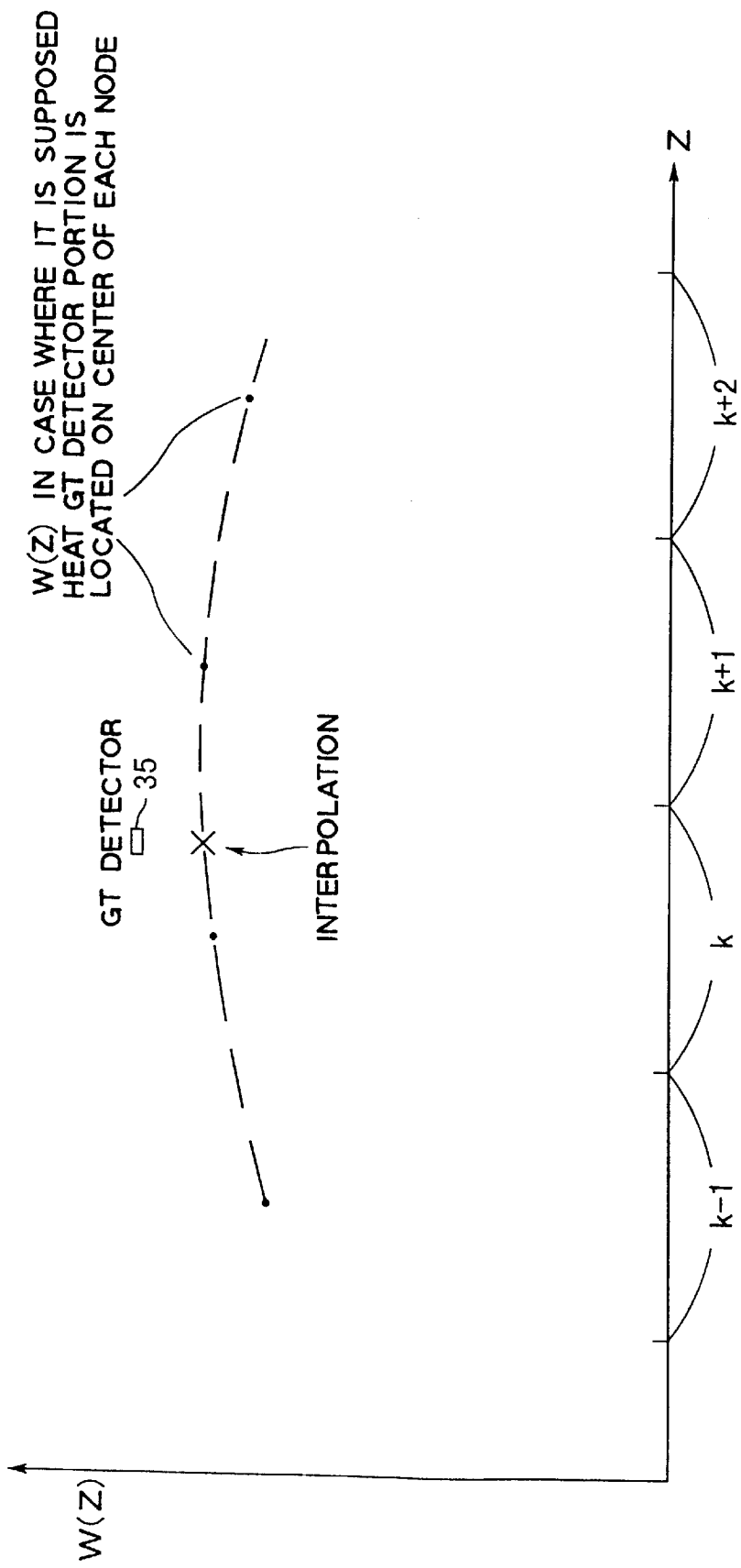
FIG. 25 is a view to explain how to make a GT response in the case where the gamma thermometer assembly (GT) is not located on the center of a fuel axial node.
Figure 26:
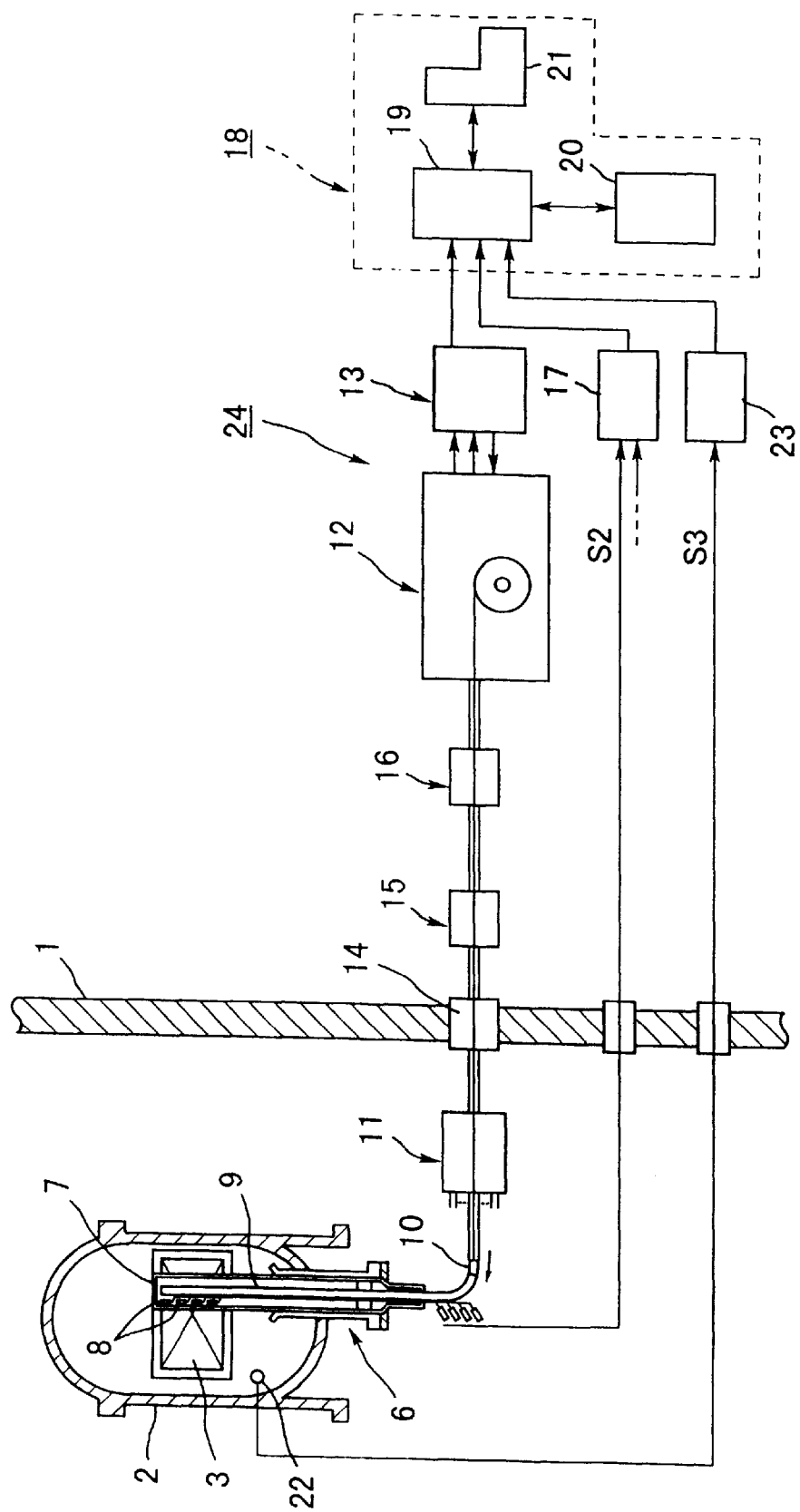
FIG. 26 is a block diagram showing a configuration of a conventional reactor power distribution monitor system.
Figure 27:
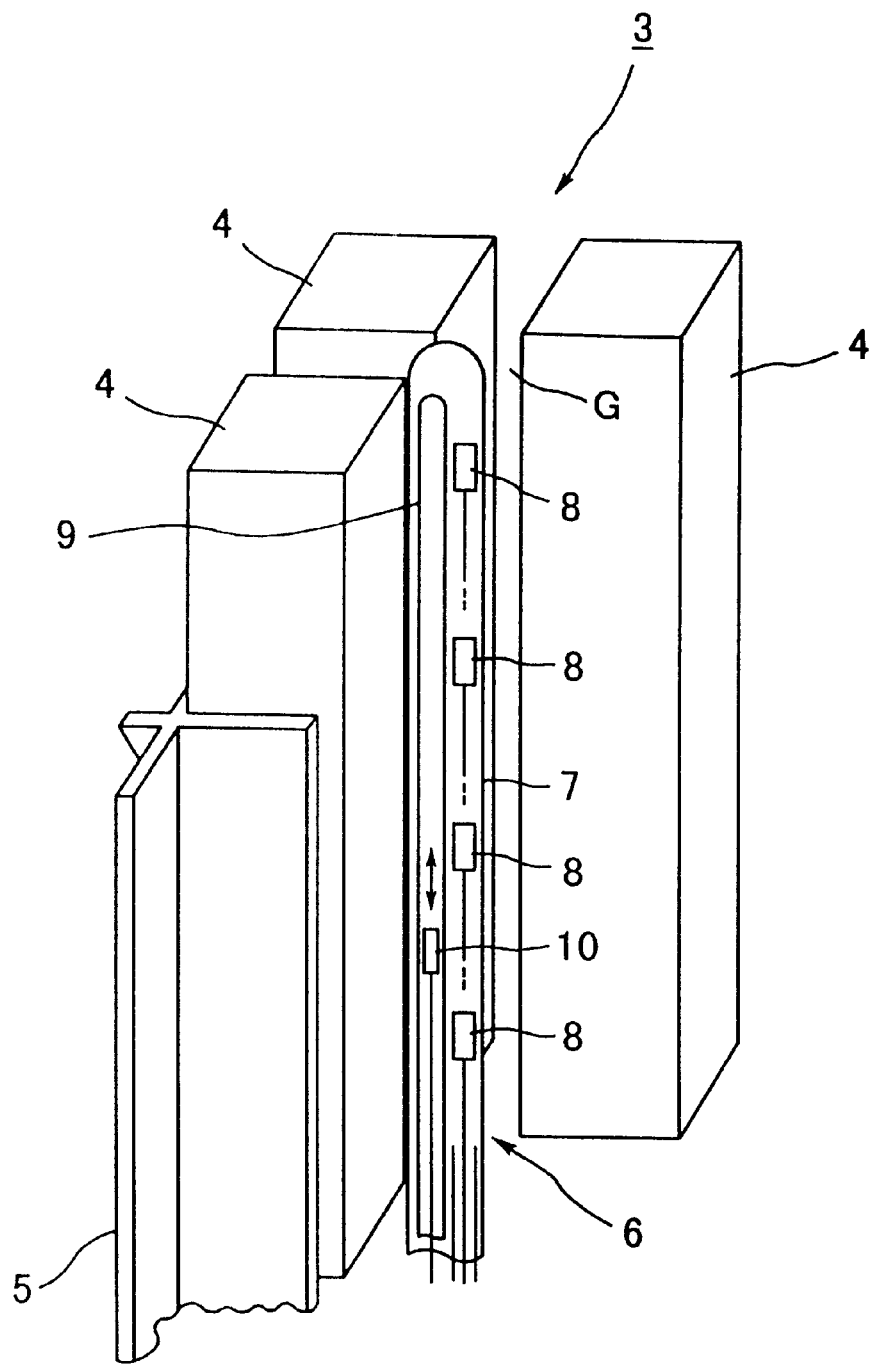
FIG. 27 is a view showing a combination of a fixed type neutron detector assembly (LPRM) and a movable neutron detector which functions as a reactor power distribution measurement detector included in the conventional reactor power distribution monitor system.
Figure 28:
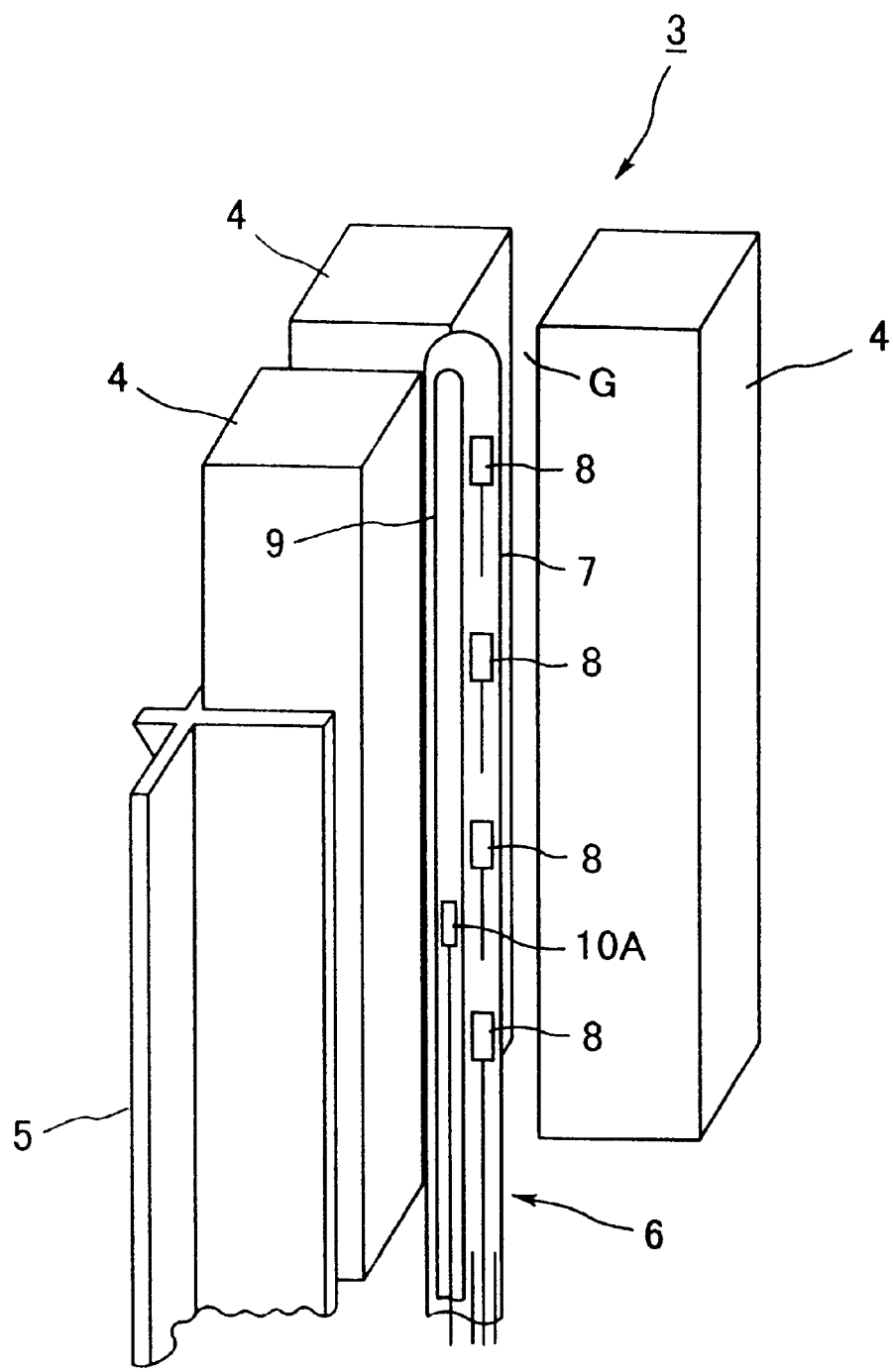
FIG. 28 is a view showing a combination of a fixed type neutron detector assembly and a movable γ-ray detector which functions as a reactor power distribution measurement detector included in the conventional reactor power distribution monitor system.

On the contrary, in the case where the fixed type γ-ray heat detector (GT detector) 35 which is a GT sensor portion of the fixed type gamma thermometer (GT) 44, is not situated at the center of the axial node of the reactor core 3, as shown in FIG. 24, an influence of γ-ray heating value W other than adjacent nodes is given to the γ-ray heat detector 35. Therefore, as shown in FIG. 25, a sensor reading value on the center of the axial node is temporarily computed, and then, is interpolated to an actual sensor position reading value. By making a comparison, when the γ-ray heat detector 35 is situated at the center of the axial node, it is possible to readily calculate the γ-ray heating value.

According to this seventh embodiment, the core axial position of the γ-ray heat detector 35 (GT sensor portion) of the fixed type gamma thermometer 44 is coincident with the center of the axial node, and thereby, it is possible to make a simple polynomial of the node having the γ-ray detector 35 and a node mean power of upper and lower nodes adjacent to each other.

[Mathematical expression 29]

$$Wc_{k,m} = \frac{1}{4} \times \sum_{n=1}^{4} \left\{ R_{k,m,n} P_{k,m,n} + \sum_{k'=k-1}^{k+1} R_{k',m,n}(P_{k',m,n} - P_{k,m,n}) \int_{Zk'-1}^{Zk'} dz' \frac{e^{-|z-z'|/\lambda}}{2\lambda} \right\} \qquad (17)$$

$$= \frac{1}{4} \times \sum_{n=1}^{4} \{c_{k-1 \to k,m,n} \Delta P_{k-1,m,n} + c_{k,m,n} P_{k,m,n} + c_{k+1 \to k,m,n} \Delta P_{k+1,m,n}\}$$

where, $Wc_{k,m}$: computation value of γ-ray heating value (read value) of the GT sensor located on the axial center of k node situated at the nuclear instrumentation tube position m $P_{k,m,n}$: axial k node average power of the fuel assembly n in four fuel assemblies around the nuclear instrumentation tube position m $\Delta P_{k-1}$: $P_{k-1} - P_k$ $\Delta P_{k+1}$: $P_{k+1} - P_k$ c: correlation function from node power to γ-ray heating value m: nuclear instrumentation tube position n: number of four assemblies located around nuclear instrumentation tube In the case where the core axial position of the fuel spacer is coincident with the center of the axial node, a concave portion of the core axial neutron flux by the fuel spacer affects only the computed result of the node average neutron flux and the node average power distribution. Therefore, it is very convenient because there is no need of preparing an influence to adjacent nodes as a correlation equation used in the three-dimensional BWR simulation computing code.

In the reactor power distribution monitor system of this seventh embodiment, the fixed type neutron detector 34 and the γ-ray heat detector 35 of the incore nuclear instrumentation assembly 32 constituting the reactor nuclear instrumentation system are situated at the center of the node divided in the fuel axial direction. In the case where the fixed type neutron detector 34 is not situated at the center of node, a correction is made by interpolating the axial distribution of the read calculation value of the fixed type neutron detector of the core axial adjacent node, thus being very troublesome.

Moreover, the γ-ray heat detector 35 is a γ-ray source contributing to the detector position, that is, the power distribution advantageously contributes within a range of 15 cm. Thus, even if the γ-ray heat detector 35 is situated on the center of the axial node with a height of 15 cm, the γ-ray heat detector 35 receives the influence of power distribution of the up and down (vertical) adjacent nodes. The influence of power distribution from the adjacent nodes is attenuated in series by a function near to an exponential of the locating position z from the γ-ray heat detector 35. Therefore, in the case where the γ-ray heat detector 35 is not situated at the center of the axial node, there is a need of computing a reading value by an axial non-symmetrical weight distribution of the axial power distribution in the node having the γ-ray heat detector 35 and the adjacent nodes. Conversely, in the case of converting the reading value of the γ-ray heat detector 35 into a peripheral power distribution, interpolation or extrapolation is made in the axial direction so as to make the computation easy, and thus, the read value need to be computed.

In the reactor nuclear instrumentation system of this seventh embodiment, the γ-ray heat detector 35 is coincident with the center of the axial node, and thereby, the same weight of the adjacent node is used in the correlation equation with respect to locating positions of all γ-ray heat detectors 35, so that the computation can be made simple, and also, a precision can be improved.

Further, the axial position of the fuel spacer is coincident with the center of the axial node, and hence, an axial distortion of the neutron flux in the three-dimensional nuclear hydrothermal simulation computing model becomes maximum at the node center. By only converting the node into a substantially average node data, it is possible to consider the axial effect of the fuel spacer, so that a computation precision can be improved in the axial distortion of the neutron flux of the three-dimensional nuclear thermal-hydraulics simulation computing model.

It is finally to be noted that the present invention is not limited to the described embodiments and many other changes and modifications may be made without departing from the scopes of the appended claims.

What is claimed is:

1. A nuclear reactor instrumentation system, comprising:
    a plurality of in core nuclear instrumentation assemblies arranged in a gap between a number of fuel assemblies charged in a reactor core,
    said in core nuclear instrumentation assemblies each including a fixed type neutron detector assembly and a fixed type gamma thermometer assembly,
    wherein said fixed type neutron detector assembly comprises N fixed neutron detectors dispersively arranged in a core axial direction with a predetermined interval L, where N is an integer greater than and equal to four, and
    said fixed type gamma thermometer assembly comprises at least 2N−1 fixed type gamma ray heat detectors arranged in the core axial direction such that N of the at least 2N−1 fixed type gamma ray heat detectors are arranged at the same core axial position as the fixed type neutron detectors and a reminder N−1 of the fixed type gamnma ray heat detectors are arranged at an intermediate position in the core axial direction between said fixed type neutron detectors;
    a power range detector signal processing device operatively connected to said fixed type neutron detector assemblies through signal cables; and
    a gamma thermometer signal processing device operatively connected to said fixed type gamma thermometer assembly of the in core nuclear instrumentation assembly through a signal cable.

2. The system according to claim 1, wherein one of said fixed type gamma ray heat detectors of the fixed type gamma thermometer assembly is arranged at a position L/4 above the lowest fixed type neutron detector.

3. The system according to claim 1, wherein in a case where the effective fuel portion of the reactor core is divided into several nodes in the core axial direction, each of core axial positions of said fixed type neutron detector and the fixed type gamma ray heat detector are coincident with a center of each of the nodes.

4. The system according to claim 1, wherein said fixed type neutron detectors constituting the fixed type neutron detector assembly is arranged so as to be calibrated respectively by said fixed type gamma ray heat detectors located on the same core axial position and each of said fixed type neutron detectors is calibrated so as to be coincident with a converted gamma ray heating value obtained from the gamma ray heat detector located on the same core axial position.

* * * * *